(12) United States Patent
Wahl et al.

(10) Patent No.: US 10,885,113 B2
(45) Date of Patent: Jan. 5, 2021

(54) EXPANDABLE DATA OBJECT MANAGEMENT AND INDEXING ARCHITECTURE FOR INTERSYSTEM DATA EXCHANGE COMPATIBILITY

(71) Applicant: Slack Technologies, Inc., San Francisco, CA (US)

(72) Inventors: Matthew Wahl, San Francisco, CA (US); Hubert Florin, Vancouver (CA); Roland Schemers, Woodside, CA (US); Brian Elliott, San Francisco, CA (US); Lydia Han, San Francisco, CA (US); James McPhail, Alameda, CA (US)

(73) Assignee: Slack Technologies, Inc., San Francisco, CA (US)

( * ) Notice: Subject to any disclaimer, the term of this patent is extended or adjusted under 35 U.S.C. 154(b) by 139 days.

(21) Appl. No.: 16/366,866

(22) Filed: Mar. 27, 2019

(65) Prior Publication Data
US 2020/0311138 A1   Oct. 1, 2020

(51) Int. Cl.
*G06F 16/901* (2019.01)
*G06F 16/903* (2019.01)
(Continued)

(52) U.S. Cl.
CPC .......... *G06F 16/901* (2019.01); *G06F 16/908* (2019.01); *G06F 16/90335* (2019.01);
(Continued)

(58) Field of Classification Search
CPC .. G06F 16/901; G06F 16/90335; G06F 16/93; G06F 16/908; G06Q 10/101;
(Continued)

(56) References Cited

U.S. PATENT DOCUMENTS

| 7,644,144 | B1 | 1/2010 | Horvitz et al. |
| 8,255,871 | B1 * | 8/2012 | Kompella ................. G06F 8/61 717/108 |

(Continued)

OTHER PUBLICATIONS

Ingham, David, et al., "The Informed Traveller: A Case Study in Building Internet Brokering Services", WIAPP 1999, San Jose, CA, Jul. 26-27, 1999, pp. 44-52.*

(Continued)

*Primary Examiner* — Robert Stevens
(74) *Attorney, Agent, or Firm* — Erise IP, P.A.

(57) ABSTRACT

A group-based communication platform is configured to ascertain the relatedness of various work objects shared among users of the group-based communication platform. Moreover, the group-based communication platform may further receive and process work objects originating from non-users of the group-based communication platform, thereby further expanding the utility of the determined relatedness between work objects. These work objects (or encrypted representations of these work objects) may be indexed and stored in association with the group-based communication platform, thereby enabling users to search for and retrieve work objects originating from a plurality of work object sources simultaneously, and based on various characteristics of those work objects and the determined interrelatedness between various work objects.

30 Claims, 17 Drawing Sheets

(51) Int. Cl.
*G06F 16/93* (2019.01)
*G06F 16/908* (2019.01)
*G06Q 10/10* (2012.01)
*H04L 12/18* (2006.01)
*H04L 12/58* (2006.01)
*H04L 29/06* (2006.01)

(52) U.S. Cl.
CPC ........... *G06F 16/93* (2019.01); *G06Q 10/101* (2013.01); *G06Q 10/103* (2013.01); *H04L 12/1831* (2013.01); *H04L 51/36* (2013.01); *H04L 65/1096* (2013.01); *H04L 65/403* (2013.01)

(58) Field of Classification Search
CPC ... G06Q 10/103; H04L 12/1831; H04L 51/36; H04L 65/1096; H04L 65/403
USPC ......................................................... 707/673
See application file for complete search history.

(56) References Cited

U.S. PATENT DOCUMENTS

| | | | |
|---|---|---|---|
| 9,171,083 | B2 | 10/2015 | Blumenfeld et al. |
| 9,317,609 | B2 | 4/2016 | Blumenfeld et al. |
| 9,323,860 | B2* | 4/2016 | Beaver ................ G06F 16/9574 |
| 9,762,553 | B2* | 9/2017 | Ford ..................... G06F 21/602 |
| 9,940,394 | B1 | 4/2018 | Grant et al. |
| 10,776,441 | B1* | 9/2020 | Echeverria .............. H04L 67/36 |
| 2007/0261102 | A1 | 11/2007 | Spataro et al. |
| 2008/0104665 | A1 | 5/2008 | Naldurg et al. |
| 2013/0060796 | A1* | 3/2013 | Gilg ................... G06Q 30/0605 707/756 |
| 2013/0275429 | A1* | 10/2013 | York ..................... G06F 16/435 707/737 |
| 2015/0019480 | A1* | 1/2015 | Maquaire ................ G06F 16/23 707/609 |
| 2015/0163206 | A1* | 6/2015 | McCarthy ............... G06F 21/10 713/171 |
| 2017/0169800 | A1 | 6/2017 | Greco et al. |
| 2017/0255681 | A1* | 9/2017 | Giunio-Zorkin .......................... G06F 16/24573 |
| 2018/0025021 | A1* | 1/2018 | Jain ..................... H04L 67/1095 707/626 |
| 2018/0047072 | A1* | 2/2018 | Chow ................ G06Q 30/0282 |
| 2018/0121420 | A1* | 5/2018 | Onusko ................ G06F 16/248 |
| 2018/0212903 | A1 | 7/2018 | Rose et al. |
| 2018/0287982 | A1 | 10/2018 | Draeger et al. |
| 2019/0266572 | A1* | 8/2019 | Foss ..................... G06F 16/164 |

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.
Robert Hof, "Stewart Butterfield on How Slack Became a $2.8 Billion Unicorn", Forbes, Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.
Rebecca Walberg, "Email biggest office waste of time: survey", National Post, at FP10, Lexisnexis, https://advance.lexis.com/api/permalink/96268e3f-26ad-48ac-a98f-6c39804ebded/?context=1000516, (dated Mar. 4, 2014) 2 pages.
Oikarinen, J. & Reed, D., "Internet Relay Chat Protocol", Request for Comments: 1459, Network Working Group, Retrieved from the Internet: <URL: https://www.rfc-editor.org/rfc/rfc1459.txt>. (dated May 1993), 32+25=57 pages.
Mike Issac, "Slack, a Start-Up With an App to Foster Business Collaboration, is Valued at $1.1 Billion", the New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.
Michael Carney, "Slack is thriving on a cocktail of whimsy and great timing", Pandodaily, Lexisnexis, https://advance.lexis.com/api/permalink/dd2d4ee5-2ddf-4d3a-ald9-3bcee5e38b74/?context=1000516, (dated Feb. 6, 2015, 2:12 AM) 3 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Internet Relay Chat, Wikipedia, , Retrieved from the Internet: <URL: https://en.wikipedia.org/wiki/Internet_Relay_Chat>. (dated May 28, 2019), 20 pages.
Ernie Smith, "Picking Up the Slack", Tedium, Retrieved from the Internet: <URL: https://tedium.co/2017/10/17/irc-vs-slack-chat-history/>. (dated Oct. 17, 2017), 13 pages.
David Auberbach, "Re-Animator. How Stewart Butterfield created Flickr and Slack out of the ashes of failed projects" Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.
"How Slack changed the way we work by putting the customer experience first", Repeat Customer Podcast, Episode 3, Retrieved from the Internet: <URL: https://www.zendesk.com/resources/slack-customer-experience/, (2019) 13 pages.
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.
Matsumoto, T. et al., "Chocoa Communicator—a New Communication System Based on Awareness and Text Communications—", Fujitsu Sci. Tech. J., 36, 2, (Dec. 2000) 154-161.

* cited by examiner

Call Declined
You declined this call

Call Back

Missed Call
You missed this call

Call Back

Daily Standup
Started 1 min ago · 2 people joined

EXPANDABLE DATA OBJECT MANAGEMENT AND INDEXING ARCHITECTURE FOR INTERSYSTEM DATA EXCHANGE COMPATIBILITY

BACKGROUND

Systems have been provided for facilitating communications among a plurality of individuals via message exchange across client devices connected with a centralized messaging system. However, historical systems have generally provided limited compatibility for communication among individuals utilizing discrete lines of communication.

Through applied effort, ingenuity, and innovation many deficiencies of such systems have been solved by developing solutions that are in accordance with the embodiments of the present invention, many examples of which are described in detail herein.

BRIEF SUMMARY

Certain embodiments are directed to communication platform functionality—specifically group-based communication platform functionality—configured for inter-system operation with other communication platforms. Via the inter-system functionality, the group-based communication platform may grant users easy access to work objects exchanged via any of a plurality of communication platforms. Moreover, in certain embodiments the group-based communication platform may be configured to index various work objects (or encrypted representations of work objects), thereby further facilitating user access to such work objects, for example, via search functionalities. In certain embodiments, the group-based communication platform may be configured to generate and append supplemental metadata to each work object received thereby, and the supplemental metadata may further facilitate user identification of potentially relevant work objects. For example, topics may be assigned to particular work objects. Moreover, the group-based communication platform may be configured to generate a work object work graph to store data indicative of determined relationships between various work objects. Thus, when a user seeks work objects relevant to a particular search query, work objects that directly match that search query may be returned, as well as work objects deemed sufficiently related to the search term (or deemed sufficiently related to other work objects satisfying the search query).

One embodiment is directed to a group-based communication platform configured for generating cache objects for local storage and local access by a client device. The group-based communication platform of certain embodiments comprises: one or more memory storage areas; and one or more processors collectively configured to: receive one or more work objects from a validated external resource for distribution to one or more client devices via a group-based communication channel, wherein the one or more work objects comprise metadata and body content data; generate, based at least in part on the metadata, supplemental metadata identifying the group-based communication channel and the one or more client devices; extract the body content data from the one or more work objects; generate one or more cache objects each comprising at least a portion of the body content data and at least a portion of the supplemental metadata for a corresponding work object; and disseminate the one or more cache objects to the one or more client devices identified based at least in part on the supplemental metadata for storage and access by the one or more client devices.

In various embodiments, generating one or more cache objects comprises: identifying, for each of the one or more work objects and based at least in part on the metadata for a corresponding work object, a cache object template applicable to the corresponding work object; and populating at least a portion of the cache object template with at least a portion of the body content data and the at least a portion of the supplemental metadata for the corresponding work object.

In various embodiments, generating one or more cache objects comprises: generating a summary cache object comprising a first quantity of data associated with the work object, wherein the summary cache object is disseminated to the one or more client devices in real time; and generating an expanded cache object comprising a second quantity of data associated with the work object, wherein the expanded cache object is disseminated to the one or more client devices in response to a request received from a client device of the one or more client devices.

Moreover, in certain embodiments, the one or more processors are further configured to index each of the one or more work objects within a database storage area. In various embodiments, the one or more processors are further configured to execute a query function based at least in part on a query request received from a client device of the one or more client devices, wherein the query function comprises: querying indexed content data, metadata, and supplemental data for a plurality of work objects based at least in part on the query request; rank one or more work objects based on relevance to the query request; and transmit cache objects to the requesting client device indicative of the ranked work objects identified during the search query.

In various embodiments, generating supplemental metadata comprises assigning a topic to each of the one or more work objects. Moreover, in certain embodiments, disseminating the one or more cache objects comprises: providing the one or more cache objects to a validated external resource for distribution to one or more client devices via communication mechanisms of the validated external resource. In various embodiments, providing the one or more cache objects to a validated external resource for distribution to one or more client devices comprises providing an email comprising the one or more cache objects to an email platform for disseminating as individual emails to the one or more client devices.

In certain embodiments, the one or more work objects comprise event work objects received from a validated external resource. Moreover, body content data of the one or more event work objects may comprise recording data.

Another embodiment is directed to a computer-implemented method for generating cache objects for local storage and local access by a client device, the method comprising: receiving one or more work objects from a validated external resource for distribution to one or more client devices via a group-based communication channel, wherein the one or more work objects comprise metadata and body content data; generating, based at least in part on the metadata, supplemental metadata identifying the group-based communication channel and the one or more client devices; extracting the body content data from the one or more work objects; generating one or more cache objects each comprising at least a portion of the body content data and at least a portion of the supplemental metadata for a corresponding work object; and disseminating the one or more cache objects to the one or more client devices identified based at least in part on the supplemental metadata for storage and access by the one or more client devices.

In various embodiments, generating one or more cache objects comprises: identifying, for each of the one or more work objects and based at least in part on the metadata for a corresponding work object, a cache object template applicable to the corresponding work object; and populating at least a portion of the cache object template with at least a portion of the body content data and the at least a portion of the supplemental metadata for the corresponding work object.

In various embodiments, generating one or more cache objects comprises: generating a summary cache object comprising a first quantity of data associated with the work object, wherein the summary cache object is disseminated to the one or more client devices in real time; and generating an expanded cache object comprising a second quantity of data associated with the work object, wherein the expanded cache object is disseminated to the one or more client devices in response to a request received from a client device of the one or more client devices. Moreover, the method may further comprise indexing each of the one or more work objects within a database storage area.

In certain embodiments, the method may comprise executing a query function based at least in part on a query request received from a client device of the one or more client devices, wherein the query function comprises: querying indexed content data, metadata, and supplemental data for a plurality of work objects based at least in part on the query request; rank one or more work objects based on relevance to the query request; and transmit cache objects to the requesting client device indicative of the ranked work objects identified during the search query.

In certain embodiments, generating supplemental metadata comprises assigning a topic to each of the one or more work objects. In various embodiments, disseminating the one or more cache objects comprises: providing the one or more cache objects to a validated external resource for distribution to one or more client devices via communication mechanisms of the validated external resource.

In certain embodiments, providing the one or more cache objects to a validated external resource for distribution to one or more client devices comprises providing an email comprising the one or more cache objects to an email platform for disseminating as individual emails to the one or more client devices. In various embodiments, the one or more work objects comprise event work objects received from a validated external resource. Moreover, body content data of the one or more event work objects may comprise recording data.

Another embodiment is directed to a computer program product comprising at least one non-transitory computer-readable storage medium having computer-readable program code portions stored therein, the computer-readable program code portions comprising an executable portion configured to cause a computer processor to: receive one or more work objects from a validated external resource for distribution to one or more client devices via a group-based communication channel, wherein the one or more work objects comprise metadata and body content data; generate, based at least in part on the metadata, supplemental metadata identifying the group-based communication channel and the one or more client devices; extract the body content data from the one or more work objects; generate one or more cache objects each comprising at least a portion of the body content data and at least a portion of the supplemental metadata for a corresponding work object; and disseminate the one or more cache objects to the one or more client devices identified based at least in part on the supplemental metadata for storage and access by the one or more client devices.

In certain embodiments, generating one or more cache objects comprises: identifying, for each of the one or more work objects and based at least in part on the metadata for a corresponding work object, a cache object template applicable to the corresponding work object; and populating at least a portion of the cache object template with at least a portion of the body content data and the at least a portion of the supplemental metadata for the corresponding work object.

In various embodiments, generating one or more cache objects comprises: generating a summary cache object comprising a first quantity of data associated with the work object, wherein the summary cache object is disseminated to the one or more client devices in real time; and generating an expanded cache object comprising a second quantity of data associated with the work object, wherein the expanded cache object is disseminated to the one or more client devices in response to a request received from a client device of the one or more client devices.

In certain embodiments, the executable portion is further configured to cause the processor to index each of the one or more work objects within a database storage area. Moreover, the executable portion is may be further configured to cause the processor to execute a query function based at least in part on a query request received from a client device of the one or more client devices, wherein the query function comprises: querying indexed content data, metadata, and supplemental data for a plurality of work objects based at least in part on the query request; rank one or more work objects based on relevance to the query request; and transmit cache objects to the requesting client device indicative of the ranked work objects identified during the search query.

In various embodiments, generating supplemental metadata comprises assigning a topic to each of the one or more work objects.

Moreover, in certain embodiments, disseminating the one or more cache objects comprises: providing the one or more cache objects to a validated external resource for distribution to one or more client devices via communication mechanisms of the validated external resource.

In various embodiments, providing the one or more cache objects to a validated external resource for distribution to one or more client devices comprises providing an email comprising the one or more cache objects to an email platform for disseminating as individual emails to the one or more client devices.

In certain embodiments, the one or more work objects comprise event work objects received from a validated external resource. Moreover, body content data of the one or more event work objects may comprise recording data.

Another embodiment is directed to a group-based communication platform configured for assigning a user expertise to a user identifier, the group-based communication platform comprising: one or more memory storage areas; and one or more processors collectively configured to: receive one or more work objects from a validated external resource, wherein the one or more work objects comprise metadata and body content data; assign one or more topics to each of the one or more work objects based at least in part on the metadata and body content data; determine a subset of the one or more work objects associated with a user identifier for a user; determine a level of relationship between the user and each of the one or more event objects; and establish topical expertise associated with the user identifier based at least in part on the topics of work objects associated with the user identifier and the level of relationship between the user and each of the event objects.

In certain embodiments, the one or more work objects comprise event work objects, and wherein determining a level of relationship between the user and each of the event work objects comprises determining whether the user participated in each of the one or more event work objects. Moreover, the one or more work objects comprise email work objects, and wherein determining a level of relationship between the user and each of the email work objects comprises determining whether the user was a sending user of the email work objects. In various embodiments, the one or more work objects comprise message work objects, and wherein determining a level of relationship between the user and each of the message work objects comprises determining whether the user was a sending user of the message work objects.

In various embodiments, assigning a topic to each of the one or more work objects comprises utilizing Term frequency-inverse document frequency (Tf-Idf) analysis to identify one or more topics relevant to each work object.

In various embodiments, each of the one or more work objects are event objects, and wherein the Tf-Idf analysis is performed on a recording associated with the work object.

Moreover, in certain embodiments, the one or more processors are further configured to generate a work graph identifying relationships between each of the plurality of work objects, and wherein determining a level of relationship between a user identifier and each of the one or more work objects comprises identifying relationships between work objects associated with the user identifier.

Another embodiment is directed to a computer-implemented method for assigning a user expertise to a user identifier, the method comprising: receiving one or more work objects from a validated external resource, wherein the one or more work objects comprise metadata and body content data; assigning one or more topics to each of the one or more work objects based at least in part on the metadata and body content data; determining a subset of the one or more work objects associated with a user identifier for a user; determining a level of relationship between the user and each of the one or more event objects; and establishing topical expertise associated with the user identifier based at least in part on the topics of work objects associated with the user identifier and the level of relationship between the user and each of the event objects.

In certain embodiments, the one or more work objects comprise event work objects, and wherein determining a level of relationship between the user and each of the event work objects comprises determining whether the user participated in each of the one or more event work objects. Moreover, the one or more work objects may comprise email work objects, and wherein determining a level of relationship between the user and each of the email work objects comprises determining whether the user was a sending user of the email work objects.

In certain embodiments, the one or more work objects comprise message work objects, and wherein determining a level of relationship between the user and each of the message work objects comprises determining whether the user was a sending user of the message work objects. Moreover, assigning a topic to each of the one or more work objects may comprise utilizing Term frequency-inverse document frequency (Tf-Idf) analysis to identify one or more topics relevant to each work object.

In various embodiments, each of the one or more work objects are event objects, and wherein the Tf-Idf analysis is performed on a recording associated with the work object. Moreover, the method may further comprise generating a work graph identifying relationships between each of the plurality of work objects, and wherein determining a level of relationship between a user identifier and each of the one or more work objects comprises identifying relationships between work objects associated with the user identifier.

Another embodiment is directed to a computer program product comprising at least one non-transitory computer-readable storage medium having computer-readable program code portions stored therein, the computer-readable program code portions comprising an executable portion configured to cause a computer processor to: receive one or more work objects from a validated external resource, wherein the one or more work objects comprise metadata and body content data; assign one or more topics to each of the one or more work objects based at least in part on the metadata and body content data; determine a subset of the one or more work objects associated with a user identifier for a user; determine a level of relationship between the user and each of the one or more event objects; and establish topical expertise associated with the user identifier based at least in part on the topics of work objects associated with the user identifier and the level of relationship between the user and each of the event objects.

In various embodiments, the one or more work objects comprise event work objects, and wherein determining a level of relationship between the user and each of the event work objects comprises determining whether the user participated in each of the one or more event work objects.

Moreover, in certain embodiments, the one or more work objects comprise email work objects, and wherein determining a level of relationship between the user and each of the email work objects comprises determining whether the user was a sending user of the email work objects. In various embodiments, the one or more work objects comprise message work objects, and wherein determining a level of relationship between the user and each of the message work objects comprises determining whether the user was a sending user of the message work objects.

In various embodiments, assigning a topic to each of the one or more work objects comprises utilizing Term frequency-inverse document frequency (Tf-Idf) analysis to identify one or more topics relevant to each work object. Moreover, each of the one or more work objects are event objects, and wherein the Tf-Idf analysis is performed on a recording associated with the work object. In certain embodiments, the executable portion is further configured to cause the processor to generate a work graph identifying relationships between each of the plurality of work objects, and wherein determining a level of relationship between a user identifier and each of the one or more work objects comprises identifying relationships between work objects associated with the user identifier.

Another embodiment is directed to a group-based communication platform configured for generating a work graph based on one or more work objects, the group-based communication platform comprising: one or more memory storage areas; and one or more processors collectively configured to: intake one or more work objects from a validated external resource for distribution to one or more client devices via at least one of one or more group-based communication channels, wherein the one or more work objects comprise metadata and body content data; determine a work object type for each of the one or more objects; extract work object data from each of the one or more work objects, wherein the work object data extracted from each of the one or more work objects is identified based at least in part on the work object type, and wherein the work object data is extracted from the metadata and the body content data; identify, based at least in part on the work object data, relationships established via each of the one or more work objects; establish, based at least in part on the relationships established via each of the one or more work objects; a work graph data structure interrelating one or more work objects shared via the group-based communication platform.

In various embodiments, the one or more processors are further configured to identify, based at least in part on the metadata and the content data, one or more topics assigned to each of the one or more work objects. Moreover, identifying one or more topics assigned to each of the one or more work objects may comprise analyzing the metadata and the body content data of each of the one or more work objects using a term-frequency, inverse-document frequency analysis to identify relevant terms to be assigned as topics to each of the one or more work objects.

In certain embodiments, identifying relationships established via each of the one or more work objects comprises at least one of: identifying a plurality of user identifiers associated with each of the one or more work objects and identifying relationships among the plurality of user identifiers associated with each of the one or more work objects, and wherein establishing the work graph data structure comprises interrelating user identifiers based at least in part on relationships established via the one or more work objects; identifying a plurality of channel identifiers associated with each of the one or more work objects and identifying relationships among the plurality of channel identifiers associated with each of the one or more work objects, and wherein establishing the work graph data structure comprises interrelating channel identifiers based at least in part on relationships established via the one or more work objects; or identifying a plurality of topics associated with each of the one or more work objects and identifying relationships among the plurality of topics associated with each of the one or more work objects, and wherein establishing the work graph data structure comprises interrelating topics based at least in part on relationships established via the one or more work objects.

In various embodiments, the work graph establishes relationships among a plurality of work objects of different work object types. Moreover, the one or more processors may be further configured to intake one or more work objects received from one or more client devices for distribution via the group-based communication platform.

In certain embodiments, the one or more processors are further configured to execute a query function based at least in part on a query request received from a client device of the one or more client devices, wherein the query function comprises: querying work objects based at least in part on the query request; rank one or more work objects based on relevance to the query request and based on relatedness between work objects as established within the work graph; and transmit cache objects to the requesting client device indicative of the ranked work objects identified during the search query. Moreover, the one or more processors may be further configured to generate a neural network for executing a search query based at least in part on the work graph.

Another embodiment is directed to a computer-implemented method for generating a work graph based on one or more work objects, the method comprising: intaking one or more work objects from a validated external resource for distribution to one or more client devices via at least one of one or more group-based communication channels, wherein the one or more work objects comprise metadata and body content data; determining a work object type for each of the one or more objects; extracting work object data from each of the one or more work objects, wherein the work object data extracted from each of the one or more work objects is identified based at least in part on the work object type, and wherein the work object data is extracted from the metadata and the body content data; identifying, based at least in part on the work object data, relationships established via each of the one or more work objects; establishing, based at least in part on the relationships established via each of the one or more work objects; a work graph data structure interrelating one or more work objects shared via the group-based communication platform.

In various embodiments, the method may further comprise identifying, based at least in part on the metadata and the content data, one or more topics assigned to each of the one or more work objects. Moreover, identifying one or more topics assigned to each of the one or more work objects may comprise analyzing the metadata and the body content data of each of the one or more work objects using a term-frequency, inverse-document frequency analysis to identify relevant terms to be assigned as topics to each of the one or more work objects.

In certain embodiments, identifying relationships established via each of the one or more work objects comprises at least one of: identifying a plurality of user identifiers associated with each of the one or more work objects and identifying relationships among the plurality of user identifiers associated with each of the one or more work objects, and wherein establishing the work graph data structure comprises interrelating user identifiers based at least in part on relationships established via the one or more work objects; identifying a plurality of channel identifiers associated with each of the one or more work objects and identifying relationships among the plurality of channel identifiers associated with each of the one or more work objects, and wherein establishing the work graph data structure comprises interrelating channel identifiers based at least in part on relationships established via the one or more work objects; or identifying a plurality of topics associated with each of the one or more work objects and identifying relationships among the plurality of topics associated with each of the one or more work objects, and wherein establishing the work graph data structure comprises interrelating topics based at least in part on relationships established via the one or more work objects.

In various embodiments, the work graph establishes relationships among a plurality of work objects of different work object types. Moreover, the method may further comprise intaking one or more work objects received from one or more client devices for distribution via the group-based communication platform.

In certain embodiments, executing a query function based at least in part on a query request received from a client device of the one or more client devices, wherein the query function comprises: querying work objects based at least in part on the query request; ranking one or more work objects based on relevance to the query request and based on relatedness between work objects as established within the work graph; and transmit cache objects to the requesting client device indicative of the ranked work objects identified during the search query.

According to certain embodiments, the method further comprises generating a neural network for executing a search query based at least in part on the work graph.

Another embodiment is directed to a computer program product comprising at least one non-transitory computer-readable storage medium having computer-readable program code portions stored therein, the computer-readable program code portions comprising an executable portion configured to cause a computer processor to: intake one or more work objects from a validated external resource for distribution to one or more client devices via at least one of one or more group-based communication channels, wherein the one or more work objects comprise metadata and body content data; determine a work object type for each of the one or more objects; extract work object data from each of the one or more work objects, wherein the work object data extracted from each of the one or more work objects is identified based at least in part on the work object type, and wherein the work object data is extracted from the metadata and the body content data; identify, based at least in part on the work object data, relationships established via each of the one or more work objects; establish, based at least in part on the relationships established via each of the one or more work objects; a work graph data structure interrelating one or more work objects shared via the group-based communication platform.

In various embodiments, the executable portion is further configured to cause the computer processor to identify, based at least in part on the metadata and the content data, one or more topics assigned to each of the one or more work objects. In certain embodiments, identifying one or more topics assigned to each of the one or more work objects comprises analyzing the metadata and the body content data of each of the one or more work objects using a term-frequency, inverse-document frequency analysis to identify relevant terms to be assigned as topics to each of the one or more work objects. Moreover, identifying relationships established via each of the one or more work objects may comprise at least one of: identifying a plurality of user identifiers associated with each of the one or more work objects and identifying relationships among the plurality of user identifiers associated with each of the one or more work objects, and wherein establishing the work graph data structure comprises interrelating user identifiers based at least in part on relationships established via the one or more work objects; identifying a plurality of channel identifiers associated with each of the one or more work objects and identifying relationships among the plurality of channel identifiers associated with each of the one or more work objects, and wherein establishing the work graph data structure comprises interrelating channel identifiers based at least in part on relationships established via the one or more work objects; or identifying a plurality of topics associated with each of the one or more work objects and identifying relationships among the plurality of topics associated with each of the one or more work objects, and wherein establishing the work graph data structure comprises interrelating topics based at least in part on relationships established via the one or more work objects.

In certain embodiments, the work graph establishes relationships among a plurality of work objects of different work object types. Moreover, the executable portion may be further configured to cause the processor to intake one or more work objects received from one or more client devices for distribution via the group-based communication platform.

In certain embodiments, the executable portion is further configured to cause the processor to executing a query function based at least in part on a query request received from a client device of the one or more client devices, wherein the query function comprises: querying work objects based at least in part on the query request; ranking one or more work objects based on relevance to the query request and based on relatedness between work objects as established within the work graph; and transmitting cache objects to the requesting client device indicative of the ranked work objects identified during the search query.

In certain embodiments, the executable portion is further configured to cause the processor to generate a neural network for executing a search query based at least in part on the work graph.

Another embodiment is directed to a group-based communication platform configured for indexing personal work objects within a database storage area, the group-based communication platform comprising: one or more memory storage areas; and one or more processors collectively configured to: intake one or more personal work objects from a client device associated with a specific user identifier, wherein the one or more personal work objects comprise content data and metadata designating each of the one or more personal work objects as personal to the specific user identifier; extract work object data from each of the one or more personal work objects; define links for each of the one or more personal work objects within an existing work graph data structure interrelating the one or more personal work objects with other work objects represented within the existing work graph data structure; and index the one or more personal work objects for retrieval by the client device associated with the specific user identifier based at least in part on characteristics of the one or more personal work objects identified by the defined links.

In certain embodiments, the one or more processors are further configured to represent the one or more personal work objects as encrypted work objects within the work graph data structure. In various embodiments, the characteristics of the one or more personal work objects may be determined based at least in part on a term-frequency, inverse-document frequency analysis to identify relevant terms to be assigned as topics for each of the one or more personal work objects. Moreover, the one or more personal work objects may comprise tasks. In certain embodiments, the links are defined between work objects of differing work object types.

In various embodiments, the one or more processors are further configured to execute a query function based at least in part on a query requested received from the client device associated with the specific user identifier, wherein the query function comprises: querying work objects based at least in part on the query request; rank one or more work objects based on relevance to the query request and based on relatedness between work objects as established within the work graph, wherein the one or more ranked work objects comprise at least one of the one or more personal work objects; and transmit cache objects to the requesting client device indicative of the one or more ranked work objects identified during the search query.

In certain embodiments, the one or more processors are further configured to generate a neural network for executing a search query based at least in part on the work graph.

Another embodiment is directed to a computer-implemented method for indexing personal work objects within a database storage area, the method comprising: intaking one or more personal work objects from a client device associated with a specific user identifier, wherein the one or more personal work objects comprise content data and metadata designating each of the one or more personal work objects as personal to the specific user identifier; extracting work object data from each of the one or more personal work objects; defining links for each of the one or more personal work objects within an existing work graph data structure interrelating the one or more personal work objects with other work objects represented within the existing work graph data structure; and indexing the one or more personal work objects for retrieval by the client device associated with the specific user identifier based at least in part on characteristics of the one or more personal work objects identified by the defined links.

In certain embodiments, the method further comprises representing the one or more personal work objects as encrypted work objects within the work graph data structure.

In various embodiments, the characteristics of the one or more personal work objects may be determined based at least in part on a term-frequency, inverse-document frequency analysis to identify relevant terms to be assigned as topics for each of the one or more personal work objects. In certain embodiments, the one or more personal work objects comprise tasks. Moreover, the links may be defined between work objects of differing work object types.

In certain embodiments, the method further comprises executing a query function based at least in part on a query requested received from the client device associated with the specific user identifier, wherein the query function comprises: querying work objects based at least in part on the query request; rank one or more work objects based on relevance to the query request and based on relatedness between work objects as established within the work graph, wherein the one or more ranked work objects comprise at least one of the one or more personal work objects; and transmit cache objects to the requesting client device indicative of the one or more ranked work objects identified during the search query.

In certain embodiments, the method further comprises generating a neural network for executing a search query based at least in part on the work graph.

Another embodiment is directed to a computer program product comprising at least one non-transitory computer-readable storage medium having computer-readable program code portions stored therein, the computer-readable program code portions comprising an executable portion configured to cause a computer processor to: intaking one or more personal work objects from a client device associated with a specific user identifier, wherein the one or more personal work objects comprise content data and metadata designating each of the one or more personal work objects as personal to the specific user identifier; extracting work object data from each of the one or more personal work objects; defining links for each of the one or more personal work objects within an existing work graph data structure interrelating the one or more personal work objects with other work objects represented within the existing work graph data structure; and indexing the one or more personal work objects for retrieval by the client device associated with the specific user identifier based at least in part on characteristics of the one or more personal work objects identified by the defined links.

In certain embodiments, the computer program product is further configured to cause the computer processor to represent the one or more personal work objects as encrypted work objects within the work graph data structure.

In various embodiments, the characteristics of the one or more personal work objects may be determined based at least in part on a term-frequency, inverse-document frequency analysis to identify relevant terms to be assigned as topics for each of the one or more personal work objects.

Moreover, the one or more personal work objects comprise tasks. In various embodiments, the links are defined between work objects of differing work object types. In certain embodiments, the executable portion is further configured to cause the processor to execute a query function based at least in part on a query requested received from the client device associated with the specific user identifier, wherein the query function comprises: querying work objects based at least in part on the query request; rank one or more work objects based on relevance to the query request and based on relatedness between work objects as established within the work graph, wherein the one or more ranked work objects comprise at least one of the one or more personal work objects; and transmit cache objects to the requesting client device indicative of the one or more ranked work objects identified during the search query. In various embodiments, the executable portion is further configured to cause the processor to generate a neural network for executing a search query based at least in part on the work graph.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
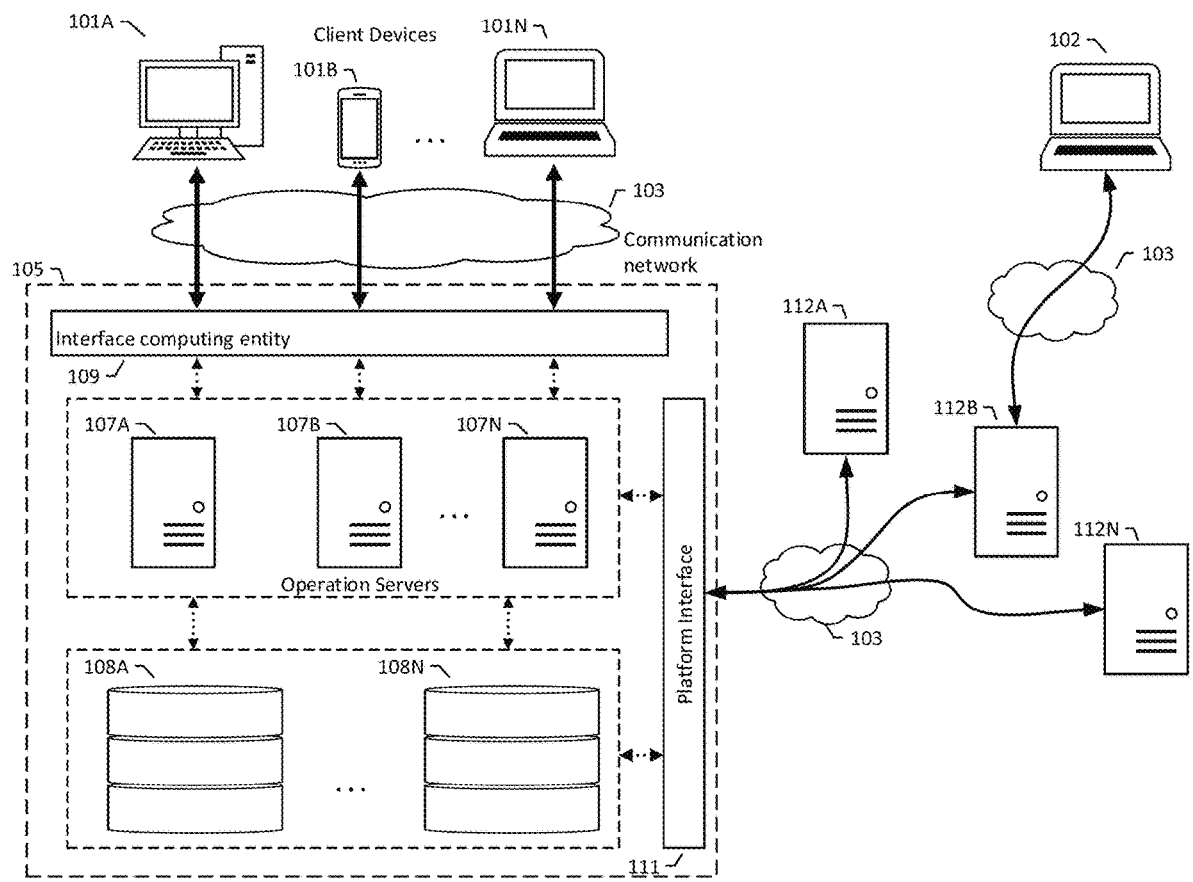
FIG. 1 shows an example environment in which various embodiments operate.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

Various embodiments provide data object management and indexing architectures provided in association with work object exchange platforms, such as group-based communication platforms or external resources (such as validated external resources), that are capable of seamlessly exchanging specific data objects (specifically, work objects, discussed herein) among a plurality of otherwise incompatible communication platforms, thereby facilitating communication between individuals (e.g., users of one or more of these communication platforms) and creating a work-object-agnostic indexing system enabling users to quickly and easily locate needed work objects, regardless of their type or primary communication pathway. As specific examples, emails, events (including calls, video-calls, VoIP calls, in-person meetings, single-user appointments, and/or other events), messages, files, and/or other work objects may be transitioned between communication platforms or other platforms (e.g., from a group-based communication platform to an email platform, or vice versa; from a group-based communication platform to an event calendar platform, or vice versa; and/or the like) seamlessly, thereby expanding the potential universe of communication platform users that may be contacted and expanding the potential universe of work objects that may be searched and/or utilized to construct one or more work graphs, which may be illustrative of relationships between and/or among various work objects. Such a work graph may be leveraged via machine-learning and/or artificial-intelligence configurations to present users with expansive, relevant results to search queries (e.g., with an integrated ranking hierarchy to indicate levels of relevance to the user's search query), to automatically connect or introduce users of one or more communication platforms with other users and/or with automatically curated topical content, and/or the like.

Certain embodiments provide an integrated work object exchange platform—also referred to herein as a group-based communication platform for exchanging one or more specific work object types (e.g., messages, files, and/or the like) between users of the group-based communication platform (e.g., via client devices operated by each user). Work objects exchanged through the integrated work object exchange platform may be naturally indexed through internal methodologies such that these work objects may be easily retrieved in response to relevant queries. Other work objects, such as work objects primarily exchanged via third party communication platforms may be received into the work object exchange platform via one or more intake mechanisms configured to ensure proper work object routing (e.g., to ensure the received work object is disseminated to appropriate client devices and/or external communication networks) and indexing to facilitate work object searching and usage for identifying relationships among various work objects for generating a work graph.

Definitions

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like. Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like. Moreover, data may be transmitted, received, or otherwise exchanged as individual "data objects" comprising interrelated data. Data objects may constitute single bits of data or large quantities of interrelated data, such as substantive data (e.g., the underlying content to be conveyed through a communication) and associated metadata (e.g., data not otherwise considered to be substantive data, encompassing characteristics of the substantive data and/or the relevant exchange (e.g., the identity of the user sending the data, the identity of the user receiving the data, the time/date when the data was sent, formatting to be associated with the exchanged substantive data, the file type of the data object, and/or the like).

Data objects may be take many forms, including as work objects, as user profile objects, as channel profile objects, and/or the like. As utilized herein, "work objects" are embodied as electronic data objects specifically executable and/or otherwise accessible via the group-based communication platform 105 and/or at least one validated external resource 112A-112N. Work objects may be received at the group-based communication platform 105 by receiving those work objects conveyed to (pushed to) the group-based communication platform 105, or the group-based communication platform 105 may retrieve (pull to) various work objects stored within accessible storage areas of one or more client devices 101A-101N, 102, validated external resources 112A-112N, and/or the like. The work objects may convey human-readable representations of information and/or computer-executable content that causes a particular client device 101A-101N, 102 to operate in a particular way. Specifics of certain work objects examples are discussed herein, however it should be understood that in certain embodiments, work objects may be embodied as emails, events, audio files, video files, document files, spreadsheet files, presentation files, tasks, and/or the like; as well as any contextual data corresponding therewith. Work objects may thus be non-personal (alternatively referred to as public) as they are exchanged between a plurality of users or otherwise made available to a plurality of users. Alternatively, work objects may be personal in nature (e.g., as defined by a portion of metadata associated with the work object), such that access to the content of the work object is limited to a single user (or a limited number of defined users). For example, work objects personal to a single user may encompass tasks or task lists defined personally by and for a particular user. Access to personal work objects may be limited to access requests associated with defined user identifiers. In certain embodiments, personal work objects may be represented as encrypted data when indexed in database storage areas and/or when included within work graph data structures including personal and non-personal work objects.

The term "work object contextual data" refers to data that is extracted or derived from a work object that may affect how the work object is determined to relate to other work objects. As discussed herein, work object contextual data comprises metadata, such as title/subject information, date and time information, work object owner/creator information, work object type information (e.g., file, email, call, image, ticket, task, etc.), work object detail information that comprises text, images, audio, and file attachments, objects attached to the event (e.g., audio, file, video, tasks) and/or one or more predefined work object data fields. The work object contextual data may further include a validated external resource identifier, a user identifier, one or more group-based communication channel identifiers associated with group-based communication channels that the user has been granted access to, one or more group identifiers for groups with which the user is associated, message identifier, event identifier, or external work object identifier. The group-based communication system may be configured to further facilitate indexing the work object contextual data.

In certain embodiments, work objects include external work objects and/or internal work objects. The terms "external work object" or "remote work object" refer to a data structure or a dataset that is received from a validated external resource (defined below) to a group-based communication platform for representing files, calls, tasks, events, notifications, calendar events, emails, contacts, directories (or directory entries), and/or the like that a validated external resource transmits, posts, or shares for rendering to a group-based communication interface. An external work object is associated with a user of a client device (either communicating directly with a group-based communication platform or communicating within and/or through a validated external resource).

The terms "internal work object" or "group-based communication work object" refer to a data structure or a dataset created by the group-based communication platform and reflects data about files, calls, tasks, events, messages, notifications, calendar events, contacts, directories (or directory entries), and/or emails posted by a group-based communication channel member to a group-based communication interface. An internal work object comprises a file object, a call object, a task object, an event object, a message object, a notification object, an internal calendar event, an internal contact object, an internal directory object, an internal directory entry object, and/or the like. The internal work object is associated with one or more of a group-based communication channel member, a group-based communication message, a group-based communication channel, and another external or internal work object.

A "work graph" is a graph-based knowledge representation data structure applied to the group-based communication platform data corpus that comprises relationships between users, between various data objects, such as between work objects, between users and work objects, between group-based communication channels and work objects, between topics and work objects, between users and group-based communication channels, between users and topics, between group-based communication channels and topics, between group-based communication channels, between topics, and/or the like. Attributes of work graph data may be represented as nodes while associations between such attributes are represented as edges. Work graph data may be used as machine learning (ML) structure inputs for training and/or utilizing ML structures (e.g., logistic regressions, neural networks, etc.). The group-based communication system may utilize work object metadata, channel metadata, and/or ML structures to rank work objects, users, channels, and/or the like for a variety of applications. For example, such applications may include prioritizing the most relevant work objects to a user's search query and presenting those most relevant work objects in response to a search query.

The term "user" should be understood to refer to an individual, a group of individuals, business, organization, and the like. Users may access a group-based communication platform (and/or other platform, such as a validated external resource) using client devices. "Group-based" is used herein to refer to a system, channel, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group identifiers (defined below) are used to associate data, information, messages, etc., with specific groups.

The terms "user profile," "user account," and "user account details" refer to information associated with a user, including, for example, a user identifier, one or more communication channel identifiers associated with communication channels that the user has been granted access to, one or more group identifiers for groups with which the user is associated, an indication as to whether the user is an owner/administrator of any communication channels, an indication as to whether the user is an owner/administrator of any groups, an indication as to whether the user has any communication channel restrictions, a plurality of messages, a plurality of emojis, a plurality of conversations, a plurality of conversation topics, an avatar, an email address, a real name (e.g., John Doe), a username (e.g., jdoe), a password, a time zone, a status, and the like. The user account details can include a subset designation of user credentials, such as, for example, login information for the user including the user's username and password. As noted above, user profiles may be one type of data object.

The term "client device" refers to computer hardware(s) and/or software(s) that is/are configured to access one or more services made available by one or more servers. The server(s) is/are often (but not always) on another computer system, in which case the client device accesses the service by way of a network. A client device may be associated with a unique user identifier, which may be referenced in one or more data tables providing an electronic indication that suggests a group (e.g., a user group) and/or communication channel to which the user of the client device belongs to. Client devices may include, without limitation, smart phones, tablet computers, laptop computers, desktop computers, wearable devices, personal computers, enterprise computers, and the like.

The term "group-based communication platform" refers to a collection of computing services that are accessible to one or more client devices, and that are operable to provide access to a plurality of software applications related to operations of databases. In some examples, the group-based communication platform may take the form of one or more central servers disposed in communication with one or more additional servers running software applications, and having access to one or more databases storing digital content items, application-related data, and/or the like.

The term "communication pathway" refers to an information route and associated circuitry that is used for data exchange between and among systems and parts of systems. For example, a communication pathway may be established between and among various client devices, allowing these client devices to communicate and share data between and among each other. Communication pathways may be intra-system communication pathways enabling communication only between users of the same communication platform (e.g., email between one or more email users; group-based messaging between one or more group-based communication platform users; and/or the like) or inter-system communication pathways enabling communication between and/or among one or more distinct communication platforms.

As a specific example, a communication pathway of certain embodiments encompasses a "communication channel," which refers to an information route and associated circuitry that is used for data exchange between and among client devices via a group-based communication platform. Work objects may be exchanged over a communication channel exclusively, or via other communication pathways. Where a communication channel is utilized to exchange work objects, specific processes may be utilized for disseminating work objects to user-members of the communication channel (e.g., to the users' client devices 101A-101N). Moreover, specific processes may be utilized for further disseminating work objects to client devices 102 that do not have direct access to the data exchanged within the communication channel, if applicable. These communication channels may be "group-based communication channels" established between and among a select group of client devices (and their respective users) for sharing messages among all users of the group. The communication channels may also and/or alternatively be one-to-one, direct message communication channels established between and among two client devices (and their respective users) for sharing messages among only those two users. Communication channels may be embodied as a portion of intra-system communication pathways in certain instances.

The term "channel settings" refers to various defined or definable parameters of a group-based communication channel. The channel settings may comprise a channel identifier, a channel name string, and a channel purpose string. Moreover, the channel settings may be indicative of whether a particular communication channel is an intra-system communication pathway or an inter-system communication pathway.

Multiple communication channels may operate on each of one or more computing devices having access to the group-based communication platform, and therefore a "communication channel identifier" or "channel identifier" may be assigned to a communication channel, which indicates the physical address in a database where related data of that communication channel is stored and which is utilized to identify client devices that participate within the communication channel to receive data exchanged on the communication channel. The communication channel identifier therefore ensures communication channels remain distinct and separate even on computing devices associated with a plurality of communication channels. In other embodiments, other communication pathways may be accessed via discrete portals, apps (e.g., computer programs) and/or the like, each with their own identifying characteristics.

The channel name string refers to a data structure containing a string of alphanumerical characters for identifying a channel in non-technical terms. The channel name string may be identical to a channel identifier, however this is not required in certain embodiments. A channel purpose string refers to a data structure containing a string of alphanumerical characters that indicates to a group-based communication platform and/or a user a purpose of the group-based communications channel. In some examples, a channel purpose string may contain a channel purpose such as "to work on project Nucleus." Channel settings may also include a message retention window that indicates a period of network time during which messages associated with a group-based communication channel are retained within a group-based communication repository. Upon expiration of the period of network time (i.e., the message retention window), a message or file associated with the message retention window may be deleted from a group-based communication repository.

Channel settings may also indicate the number and/or identity of groups (or users) authorized to access the particular group-based communication channel; and, when applicable one or more group identifier values that indicate the group identifier(s) of one or more groups authorized to access the group-based communication channel. In some embodiments, if a user associated with a client device attempts to access a group-based communication channel and the user capacity has been reached, the client device may not be permitted to access the group-based communication channel. The channel settings may also include one or more authorized application identifiers that indicate to a group-based communication platform which applications are authorized to be downloaded and utilized in the group-based communication channel. In embodiments, if an application attempts to access a group-based communication channel and the application is not associated with an authorized application identifier, the application may not be granted access to the group-based communication channel.

A communication channel may be "public," which may allow any client device to join and participate in the information sharing through the communication channel. Public communication channels may still be access limited, for example, to user identifiers associated with a particular group identifier. Thus, in the context of a large organization, public communication channels may be accessible to all employees of the organization, but those same public communication channels may not be accessible to non-employees of the organization (associated with user identifiers that are not associated with the identifier of the large organization). A communication channel may be "private," which may restrict data communications in the communication channel to certain client devices and/or users.

The term "viewing interface" refers to a virtual communications environment, feed, and/or display configured to display work objects exchanged via a communication platform. For example, a viewing interface may be embodied as and/or accessible via an email client (e.g., Gmail, Microsoft Outlook, Hotmail, and/or the like). As another example, a viewing interface may be an electronic calendar (e.g., Google Calendar, iCal, Microsoft Outlook, and/or the like).

As a specific example, a viewing interface may be embodied as a "communication channel interface," which refers to a virtual communications environment or feed accessible to users of the group-based communication platform that is configured to display messaging communications (and/or other work objects) posted/shared/transmitted by channel members (e.g., validated users accessing the environment using client devices) that are viewable only to the members of the group. The format of the communication channel interface may appear differently to different members of the group-based communication channel; however, the content of the communication channel interface (i.e., messaging communications) will be displayed to each member of the group-based communication channel. For instance, a common set of group-based messaging communications will be displayed to each member of the respective group-based communication channel such that the content of the communication channel interface (i.e., messaging communications) will not vary per member of the group-based communication channel.

As used herein, the terms "messaging communication" and "message" refer to any electronically generated work object provided by a user using a client device and that is configured for display within a communication channel interface. Message communications may include any text, image, video, audio, or combination thereof provided by a user (using a client device). For instance, the user may provide a messaging communication that includes text as well as an image and a video within the messaging communication as message contents. In such a case, the text, image, and video would comprise the messaging communication or digital content object. Each message sent or posted to a communication channel (e.g., a group-based communication channel) of the group-based communication platform includes metadata comprising the following: a sending user identifier, a message identifier, message contents, an object identifier, a group identifier and/or a communication channel identifier. Each of the foregoing identifiers may comprise ASCII text, a pointer, a memory address, and the like.

"Groups" or "teams" refer to particular organizations, collections of users, or other defining characteristics utilized to associate a plurality of users. Groups or teams may be distinguished based on "group identifiers" or "team identifiers" that refer to one or more items of data by which a group within a group-based communication platform may be identified. As an example, a group identifier may comprise ASCII text, a pointer, a memory address, and the like. These group identifiers may be stored within group profiles. A group profile may comprise a unique group identifier for each group, a group name for each group, a date/time at which a particular group was created, a unique user identifier having administrative user privileges for a particular group, and/or the like. As discussed herein, groups or teams may extend to encompass both users of the group-based communication platform and users of alternative communication platforms (e.g., email users).

A "sending user identifier" is associated with a collection of work objects that are sent by a particular user (i.e., a client device associated with the particular user). These messages may be analyzed to determine context regarding the user (e.g., the user's topical expertise or interest in a topic may be determined based on the frequency of mention of the topic or key words associated with the topic within such messages, and the user's topical expertise may be assigned to the user identifier).

The term "private communication channel" refers to a communication channel with restricted access such that it is not generally accessible and/or searchable by other members of the group-based communication platform. For example, only those users or administrators who have knowledge of and permission to access (e.g., the user identifier of a particular user is associated with a communication channel identifier for the private communication channel after the user has been validated/authenticated) the private communication channel may view content of the private communication channel.

"Interface computing entities" as discussed herein with reference to various embodiments are computing devices (or portions of computing devices) for maintaining communication connections with various client devices. Specifically, interface computing entities may be configured for maintaining data connections (e.g., websocket connections) initiated by each of a plurality of client devices for transmitting messages (e.g., object updates) and corresponding metadata (e.g., comprising object identifiers) in real time between operation servers of the group-based communication platform and respective client devices. In certain embodiments, the interface computing entities generate and maintain back-end connections with one or more operation servers as discussed herein for obtaining messages to be disseminated to the various client devices.

"Operation servers" as discussed herein with reference to certain embodiments are computing devices configured for interacting with various client devices (e.g., via an interface computing entity) for receiving and/or disseminating work objects among client devices. Operation servers may be configured to receive, generate, store (in an associated database), and/or direct messages received from and/or disseminated to users (e.g., via corresponding client devices). The functionality of the operation servers may be provided via a single server or collection of servers having a common functionality, or the functionality of the operation servers may be segmented among a plurality of servers or collections of servers performing subsets of the described functionality of the operation servers. For example, a first subset of operation servers—gateway servers—may be configured for receiving messages from client devices and/or for transmitting messages to client devices via an interface computing entity. These gateway servers may be in communication with a second subset of operation servers—channel servers—configured for collecting messages distributed within communication channels and for storing those messages within a message repository database for indexing and archiving. In certain embodiments, the channel servers may be in communication with the interface computing entities to provide various messages to client devices. Moreover, a third subset of operation servers—interoperation servers—may be specifically configured for ensuring seamless communication of work objects received from and disseminated to one or more validated external resources.

The terms "validated external resource," "validated external resources," or "validated remote resource" refer to a software program, application, platform, or service that is configured to communicate with the group-based communication platform for providing service to a client device (e.g., via a group-based communication interface). The validated external resource operates on a compiled code base or repository that is separate and distinct from that which supports the group-based communication platform. The validated external resources of some embodiments generate work objects (specifically, external work objects, discussed herein) executable or otherwise usable by features of the validated external resource. In other embodiments, the group based communication platform passes work objects (e.g., internal work objects, discussed herein) to the validated external resources. In some embodiments, the validated external resource may communicate with the group-based communication platform, and vice versa, through one or more application program interfaces (APIs). For example, the group-based communication platform may subscribe to an API of the validated external resource that is configured to transmit one or more external work objects. In some embodiments, the validated external resource receives tokens or other authentication credentials that are used to facilitate secure communication between the validated external resource and the group-based communication platform in view of group-based communication platform network security layers or protocols (e.g., network firewall protocols).

The term "external resource entity identifier" refers to one or more items of data by which a user of an external resource may be uniquely identified by a group-based communication platform. For example, an external resource entity identifier may comprise American Standard Code for Information Interchange (ASCII) text, a pointer, a memory address, and the like. One or more external resource entity identifiers may be stored to a limited profile of a group-based communication platform along with other identifiers (e.g., user identifier, group identifiers, group-based communication channel identifiers, etc.). The external resource entity identifier may be embodied in a format native to the external resource to which it is associated or may be structured in a format designated by the group-based communication platform. In certain embodiments, the external resource entity identifier further identifies the validated external resource to which the external resource entity identifier applies. Correlating one or more external resource entity identifiers to a user account or user identifier of the group-based communication platform allows the group-based communication platform to link accounts from disparate external resources with a selected group-based communication platform user account.

The term "event occurrence," "event object," or "event" refers to a data object, a data structure, a data set, or collection of data and instructions that collectively represents a work object of an validated external resource (in which case an event occurrence is an external event occurrence embodied as an external work object) or of the group-based communication platform (in which case an event occurrence is an internal event occurrence embodied as an internal work object) providing scheduling features. Each event occurrence encompasses contextual data comprising metadata and/or content data associated with the event occurrence. The form and use of the contextual data of the event occurrence may vary between different validated external resources. One example of a standard defining data structure for event occurrence data objects and calendar data exchange is the iCalendar standard, known more formally as the Internet Calendaring and Scheduling Core Object Specification, RFC 2445. In the iCalendar standard, calendar data is stored in the top-level object, known as the Calendaring and Scheduling Core Object.

The contextual data comprises an event identifier that uniquely identifies a particular created event occurrence. The contextual data of an event occurrence of certain embodiments is embodied as an event occurrence data structure comprising a plurality of event occurrence parameters, including the event identifier. Each event occurrence parameter may be one of an event occurrence timestamp, an event occurrence location identifier, an event occurrence start time identifier, an event occurrence run time identifier, an event occurrence completion indicator, an event occurrence creator identifier, an event occurrence invite identifier, an event occurrence acceptance identifier, an event occurrence decline identifier, an event occurrence acceptance identifier, and event occurrence title. In embodiments, an event occurrence is an electronic representation of a live in-person event during which one or more attendees gather or collaborate for a particular duration of time. In various embodiments, the live in-person event occurs at one or more physical locations and/or involves audio and/or video connections for said collaboration. As discussed herein, the context data may be supplemented with supplemental metadata, for example, upon generation of a recording for a particular event.

The term "event identifier" refers to one or more items of data by which an event occurrence may be uniquely identified. For example, an event identifier may comprise ASCII text, a pointer, a memory address, and/or the like.

The term "event occurrence data structure" or "event data structure" refers to a collection of data associated with an event occurrence capable of being transmitted, received, and/or stored. In various embodiments, the event occurrence data structure may comprise a plurality of event occurrence parameters. In various embodiments, the event occurrence data structure may be associated with one or more group-based communication channel identifiers.

The term "event occurrence parameter" or "event parameter" refers to a collection of data that defines one or more aspects of an event occurrence. In various embodiments, an event occurrence parameter may be one of an event identifier, an event occurrence timestamp, an event occurrence location identifier, an event occurrence start time identifier, an event occurrence run time identifier, an event occurrence completion indicator, an event occurrence invitee identifier, an event occurrence invitation acceptance identifier, an event occurrence invitation decline identifier, or event occurrence attendee/participant identifier, an event occurrence title, an event occurrence attachment, and/or the like.

The term "event occurrence timestamp" or "event timestamp" refers to a digital representation of network time associated with at least one of the receipt, commencement, conclusion or run time of an event occurrence. The event occurrence timestamp may comprise a digital representation of one or more of the network time at which the event occurrence was created by the event occurrence creator, the network time at which the event occurrence was scheduled to begin, the network time at which the event was scheduled to end, the network time at which the event occurrence actually began, the network time at which the event occurrence actually ended, and the actual event occurrence run time. The timestamp may be analyzed to determine context regarding the event occurrence (e.g., the exact moment at which the event occurrence concluded and the proximity of that moment to the group-based communication message timestamp of a group-based communication message that was sent in a group-based communication channel). The event occurrence timestamp may be associated with an event identifier. The timestamp may be analyzed to determine context regarding the event (e.g., the exact moment at which the event started and/or ended, as well as the corresponding event run time). In various embodiments, the event timestamp may be an event occurrence parameter.

The term "event occurrence creator identifier" or "event creator identifier" refers to one or more items of data by which an event occurrence creator that creates an event occurrence may be uniquely identified. For example, an event occurrence creator identifier may comprise a validated external resource identifier (as discussed herein) or a user identifier. In various embodiments, the event occurrence creator identifier may be associated with a client device and a user profile within a group-based communication system.

The term "event occurrence invitee identifier" or "event invitee identifier" refers to one or more items of data by which an event occurrence invitee may be uniquely identified. An event occurrence invitee identifier may be associated with a user who receives an invitation to participate in an event occurrence and has the option to either accept or decline the invitation. For example an event occurrence invitee identifier may comprise a validated external resource identifier (as discussed herein) or a user identifier. In various embodiments, the event occurrence invitee identifier may be an event occurrence parameter.

The term "event occurrence invitation acceptance identifier" or "event invitation acceptance identifier" refers to one or more items of data by which an event occurrence invitation acceptance may be uniquely identified. An event occurrence invitation acceptance identifier may be associated with a user (i.e., an event occurrence invitee associated with an event occurrence invitee identifier) who receives an invitation to participate in an event occurrence associated with an event occurrence creator identifier and accepts the invitation. Accordingly, an event occurrence invitation acceptance identifier is associated with an event occurrence invitee identifier. For example an event occurrence invite acceptance identifier may comprise ASCII text, a pointer, a memory address, and the like. In various embodiments, the event occurrence invite acceptance identifier may be an event occurrence parameter.

The term "event occurrence invitation decline identifier" or "event invitation decline identifier" refers to one or more items of data by which an event occurrence invitation decline may be uniquely identified. An event occurrence invitation decline identifier may be associated with a user (i.e., an event occurrence invitee associated with an event occurrence invitee identifier) who receives an invitation to participate in an event occurrence associated with an event occurrence creator identifier and declines the invitation. Accordingly, an event occurrence invitation decline identifier is associated with an event occurrence invitee identifier. For example an event occurrence invite decline identifier may comprise ASCII text, a pointer, a memory address, and the like. In various embodiments, the event occurrence invite decline identifier may be an event occurrence parameter.

The term "event occurrence attendee identifier," "event occurrence participant identifier," "event attendee identifier" or "event participant identifier" refers to one or more items of data by which an event occurrence attendee may be uniquely identified. An event occurrence attendee may be a user (i.e., an event occurrence invitee associated with an event occurrence invitee identifier) who actually attends/participates in an event occurrence associated with an event occurrence creator identifier. Accordingly, an event occurrence attendee identifier is associated with an event occurrence invitee identifier. In embodiments, an event occurrence attendee identifier is distinct from and independent of both an event occurrence invitation acceptance identifier and an event occurrence invitation decline identifier. That an event occurrence invitee either accepts or declines an event occurrence invite is a digital representation of the invitee's intention or lack thereof to participate in the event occurrence; such an acceptance or decline does not necessarily affect whether or not that invitee actually participates in the event occurrence. For example an event occurrence attendee identifier may comprise ASCII text, a pointer, a memory address, and the like. In various embodiments, the event occurrence attendee identifier may be an event occurrence parameter.

The term "event occurrence title" or "event title" refers to an event occurrence creator designated title associated with an event occurrence. In various embodiments, the event occurrence title may be representative of a purpose or topic associated with the event occurrence. In various embodiments, the event occurrence title may be analyzed to determine its relation to a conversation topic or a content topic for the purposes of detecting conversations and content associated with an event occurrence. For example, the event occurrence title may comprise one or more strings of text or other characters (e.g., emojis).

In certain embodiments, one or more of the interface computing entities and/or the operation servers may be geographically distributed, for example, to service client devices located geographically proximate the one or more computing entities. However, in certain embodiments the various computing entities (including the interface computing entities and/or the operation servers) may be centrally-located.

Example System Architecture

Methods, apparatuses, and computer program products of the present invention may be embodied by any of a variety of devices. For example, the method, apparatus, and computer program product of an example embodiment may be embodied by a network device, such as a server or other network entity, configured to communicate with one or more devices, such as one or more client devices. In some preferred and non-limiting embodiments, the computing device may include fixed computing devices, such as a personal computer or a computer workstation. Still further, example embodiments may be embodied by any of a variety of mobile devices, such as a portable digital assistant (PDA), mobile phone, smartphone, laptop computer, tablet computer, wearable device, or any combination of the aforementioned devices.

FIG. 1 illustrates an example computing environment within which various embodiments may operate. Users may access, share, and/or retrieve data objects (e.g., work objects) associated with the group-based communication platform 105 via a communication network 103 using client devices 101A-101N having direct access to the group-based communication platform 105, and/or using client devices 102 having access to one or more validated external resources 112A-112N, such as email systems, calendar systems, and/or the like.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 802.11, 802.16, 802.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. As discussed herein, the networking protocol is configured to enable data transmission via websocket communications. For instance, the networking protocol may be customized to suit the needs of the group-based communication platform. In some embodiments, the protocol is a custom protocol of JSON objects sent via a websocket channel. In some embodiments, data may be transmitted via a plurality of protocols, such as JSON over RPC, JSON over REST/HTTP, and the like.

In the illustrated embodiment, the group-based communication platform 105 includes a plurality of operation servers 107A-107N configured for disseminating work objects via an interface computing entity 109 and/or a platform interface 111. Collectively, the operation servers 107A-107N are configured for receiving work objects transmitted from one or more client devices 101A-101N, 102 (primarily through the group-based communication platform 105 and/or primarily through one or more validated external resources 112A-112N), storing the work objects within database storage areas 108A-108N for dissemination and indexing, and/or for transmitting messages to appropriate client devices 101A-101N, 102 via an interface computing entity 109 and/or platform interface 111 via one or more validated external resources 112A-112N.

Similarly, the interface computing entity 109 (or plurality of interface computing entities 109) may be embodied as a computer or computers as known in the art. In the illustrated embodiment of FIG. 1, the interface computing entity 109 provides for receiving electronic data from various sources, including, but not limited to the client devices 101A-101N (e.g., via websocket communications over the communications network 103) and/or the operation servers 107A-107N (e.g., via backend communications). Moreover, the interface computing entity 109 of the illustrated embodiment is also configured to parse metadata provided as a portion of one or more electronic work objects (e.g., messages), and to direct incoming electronic work objects to one or more operation servers 107A-107N based at least in part on the content of the metadata associated with the electronic work objects and/or to direct outbound electronic messages to one or more client devices 101A-101N based at least in part on the content of the metadata associated with the electronic work objects.

Platform interface 111 may similarly provide work object distribution and receiving functionality, however platform interface 111 may be specifically configured for communicating with validated external resources 112A-112N, such as email platforms, calendar platforms, and/or the like. Accordingly, platform interface 111 may be configured for generating and/or maintaining various Application Program Interfaces (APIs) (e.g., Representational state Transfer (REST) APIs), one or more proxy endpoints accessible via defined URLs to specific ones of the plurality of validated external resources 112A-112N, and/or the like, such that data objects—specifically work objects—may be seamlessly shared between users of the group-based communication platform 105 (e.g., via their respective client devices 101A-101N) and users of one or more validated external resources 112A-112N (e.g., via their respective client devices 102).

The client devices 101A-101N, 102 may be any computing device as defined above. Work objects exchanged between the operation servers 107A-107N and the client devices 101A-101N via the interface computing entity 109 may be provided in various forms and via various methods.

In some preferred and non-limiting embodiments, one or more of the client devices 101A-101N, 102 are mobile devices, such as smartphones or tablets. One or more of the client devices 101A-101N, 102 interact with the group-based communication platform 105 and/or one or more validated external resources (or other third party systems) via an "app" executable on the client devices 101A-101N, 102. For example, an app may be provided that executes on mobile device operating systems such as Apple Inc.'s iOS®, Google Inc.'s Android®, or Microsoft Inc.'s Windows 10 Mobile®. A client device 101A-101N, 102 may store a plurality of apps each stored in memory and executable thereon. Each of the plurality of apps may correspond to a particular platform. For example, a first app stored on a client device is utilized to communicate with the group-based communication platform 105 and a second app stored on the client device is utilized to communicate with a first validated external resource 112A.

In certain embodiments, client devices 101A-101N interacting directly with the group-based communication platform 105 execute an app to interact with the operation servers 107A-107N and/or interface computing entity 109. Those client devices 102 interacting directly with validated external resources 112A-112N may similarly execute an app to interact with the respective validated external resources 112A-112N. Such apps are typically designed to execute on mobile devices, such as smartphones or tablets. For example, an app may be provided that executes on mobile device operating systems such as Apple Inc.'s iOS®, Google Inc.'s Android®, or Microsoft Inc.'s Windows 10 Mobile®. These platforms typically provide frameworks that allow apps to communicate with one another, and with particular hardware and software components of mobile devices. For example, the mobile operating systems named above each provides frameworks for interacting with location services circuitry, wired and wireless network interfaces, user contacts, and other applications. Communication with hardware and software modules executing outside of the app is typically provided via application programming interfaces (APIs) provided by the mobile device operating system. Thus, via the app executing on the client devices 101A-101N, these client devices 101A-101N are configured for communicating with the group-based communication platform 105 via one or more websockets.

In some preferred and non-limiting embodiments, the client devices 101A-101N may interact with the operation servers 107A-107N and/or interface computing entity 109 via a web browser. The client devices 101A-101N may also include various hardware or firmware designed to interact with the operation servers 107A-107N and/or interface computing entity 109. Again, via the browser of the client devices 101A-101N, the client devices 101A-101N are configured for communicating with the group-based communication platform 105 via one or more websockets.

Similarly, client devices 102 may interact with the validated external resources 102A-102N via a web browser. The client devices 102 may also include various hardware or firmware designed to interact with the validated external resources 102A-102N (e.g., via websockets or other communication protocols).

Example Apparatuses Utilized with Various Embodiments

Figure 2:
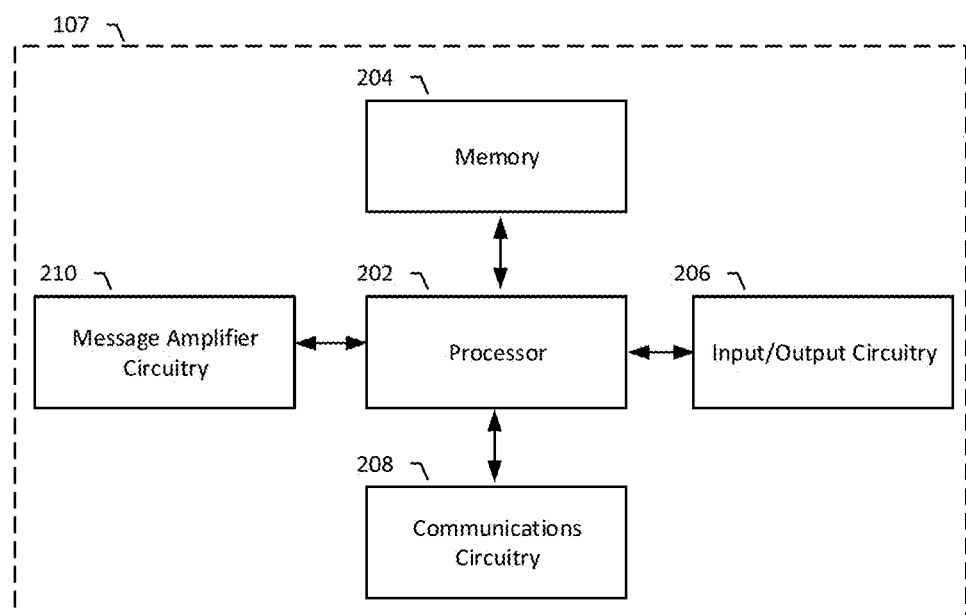
FIG. 2 shows an example schematic configuration of an operation server according to one embodiment.

Each operation server 107 may be embodied by one or more computing systems, such as apparatus 200 shown in FIG. 2. The apparatus 200 may include processor 202, memory 204, input/output circuitry 206, communications circuitry 208, and message amplifier circuitry 210. The apparatus 200 may be configured to execute the operations described herein with respect to FIGS. 1-15. Although these components 202-210 are described with respect to functional limitations, it should be understood that the particular implementations necessarily include the use of particular hardware. It should also be understood that certain of these components 202-210 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-101N to enable work object sharing/dissemination therebetween. The processor 202 ensures that work objects (e.g., messages) intended for exchange between the client devices 101A-101N within the particular communication channel are properly disseminated to those client devices 101A-101N for display within respective display windows provided via the client devices 101A-101N. Moreover, with reference to FIG. 1, the processor 202 may be configured to appropriately cause one or more work objects to be disseminated to one or more client device 102 communicating via one or more validated external resources 112A-112N (e.g., email, external messaging systems, and/or the like), through platform interface 111.

Moreover, the processor 202 may be configured to synchronize work objects exchanged on a particular communication channel with one or more database storage areas 108A-108N for storage and/or indexing of work objects therein. Collectively, the plurality of work objects (e.g., both internal work objects and external work objects) define a work object corpus that may be utilized to perform various search query functions and/or as historical data that may be utilized in accordance with machine learning and/or artificial intelligence algorithms for classifying new work objects. The work object corpus of certain embodiments is limited in applicability to a particular group/team or other grouping of users that may access the work objects. Thus, a plurality of work object corpuses may be stored and isolated from one another at the group-based communication platform to maintain privacy between data exchanged within individual groups/teams. Each work object corpus of certain embodiments is subdivided into sub-corpuses for reach work object type. The database storage areas 108A-108N may utilize any of a variety of database storage and indexing methodologies, such as those associated with MySQL, Vitess, and/or the like (which may be sharded into discrete data storage areas, to provide additional security against unauthorized/incidental disclosure of information within work objects to unauthorized individuals). In certain embodiments, the processor 202 may provide stored and/or indexed work objects (e.g., indexed based on key data corresponding to the work objects and associated database shard to which the message is indexed) to the interface computing entity 109 for dissemination to client devices 101A-101N and/or to platform interface 111 for dissemination to client devices 102 via applicable validated external resources 112A-112N. The processor 202 may additionally be configured to maintain a reference (e.g., a data table) for indicating where messages relating to particular communication channels are stored. Because data may be sharded to a plurality of discrete storage locations (e.g., based on a channel identifier), the processor 202 may be configured to direct work objects to the appropriate storage location once received, and to direct work objects from particular database shards to appropriate client devices 101A-101N, 102 to disseminate work objects exchanged within a particular communication channel.

A database may be embodied as a plurality of physically discrete database storage areas 108A-108N (e.g., each database storage area may define one or more database shards in certain embodiments). For example, each physical discrete database storage area 108A-108N may have an associated physical location, an associated unique identifier, and/or the like. These physically discrete database storage areas 108A-108N may be configured for operating as a cohesive storage unit that may be accessed, for example, by one or more operation servers 107A-107N. Moreover, the group-based communication platform 105 may be configured for storing related data, such as work objects exchanged in association with a common communication channel, within a common discrete data storage device.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Message amplifier circuitry 210 includes hardware configured to copy and amplify electronic messages (or other work objects) and associated metadata received from one or more client devices 101A-101N, 102 to other client devices 101A-101N, 102. The message amplifier circuitry 210 may utilize processing circuitry, such as the processor 202, to perform these actions. However, it should also be appreciated that, in some embodiments, the message amplifier circuitry 210 may include a separate processor, specially configured Field Programmable Gate Array (FPGA), or Application Specific Integrated Circuit (ASIC) for performing the functions described herein (e.g., for providing messages to various validated external resources, where applicable). The message amplifier circuitry 210 may be implemented using hardware components of the apparatus configured by either hardware or software for implementing these planned functions.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Figure 3:
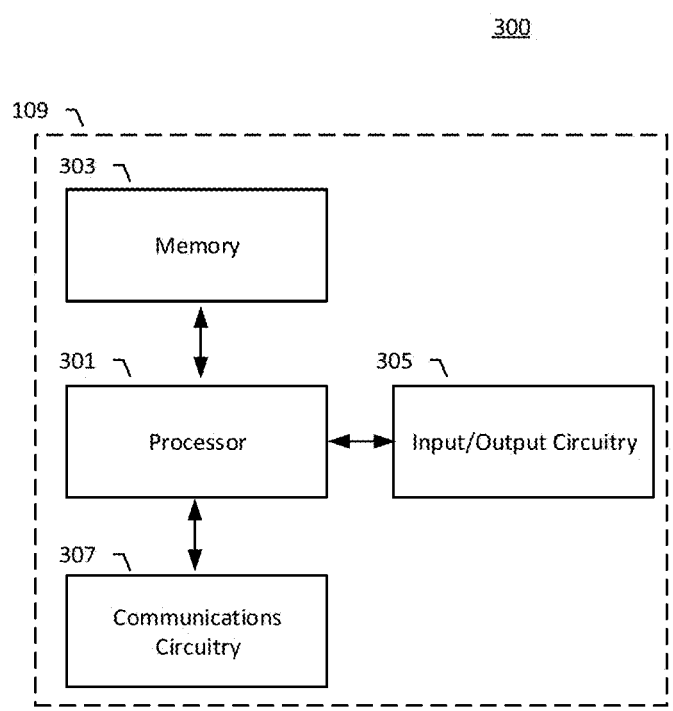
FIG. 3 shows an example schematic configuration of an interface computing interface according to one embodiment.

In the illustrated embodiment of FIG. 3, the interface computing entity 109 is embodied by one or more computing systems encompassing apparatus 300. The illustrated apparatus 300 includes processor 301, memory 303, input/output circuitry 305, and communications circuitry 307. The apparatus 300 may be configured to execute the operations described herein with respect to FIGS. 1-15. Although these components 301-307 are described with respect to functional limitations, it should be understood that the particular implementations necessarily include the use of particular hardware. It should also be understood that certain of these components 301-307 may include similar or common hardware. For example, two sets of circuitries may both leverage use of the same processor, network interface, storage medium, or the like to perform their associated functions, such that duplicate hardware is not required for each set of circuitries.

In some embodiments, the processor 301 (and/or co-processor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present invention. For example, the memory 303 may be configured to cache work objects exchanged on one or more group-based communication channels, such that the processor 301 may provide various messages to client devices (e.g., on an as needed or as requested basis).

In some preferred and non-limiting embodiments, the processor 301 may be configured to execute instructions stored in the memory 303 or otherwise accessible to the processor 301. In some preferred and non-limiting embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present invention while configured accordingly. Alternatively, as another example, when the processor 301 is embodied as an executor of software instructions, the instructions may specifically configure the processor 301 to perform the algorithms and/or operations described herein when the instructions are executed.

In some embodiments, the apparatus 300 may include input/output circuitry 305 that may, in turn, be in communication with processor 301 to provide output to the user and, in some embodiments, to receive an indication of a user input. The input/output circuitry 305 may comprise a user interface and may include a display, and may comprise a web user interface, a mobile application, a client device, a kiosk, or the like. In some embodiments, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communication network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Moreover, although the interface computing entity 109 is shown within the bounds of the group-based communication platform 105, it should be understood that the interface computing entity 109 may be embodied as an edge-based computing device in communication with aspects of the group-based communication platform 105 via a communication network 103. Such embodiments may comprise a plurality of interface computing entities 109 that are geographically distributed, and such interface computing entities 109 may be configured for communicating with client devices 101A-101N within a geographic range proximate a respective interface computing entity 109.

Figure 4:
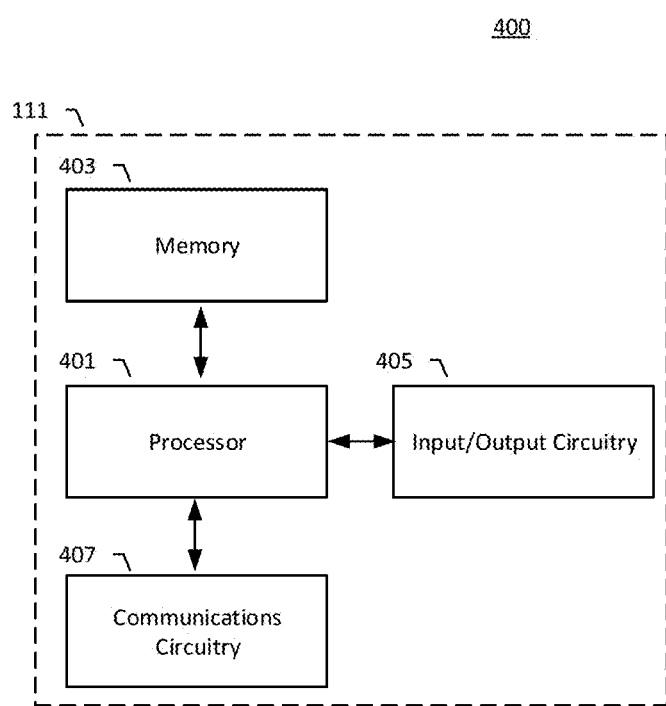
FIG. 4 shows an example schematic configuration of a platform interface according to one embodiment.

In the illustrated embodiment of FIG. 4, the platform interface 111 is embodied by one or more computing systems encompassing apparatus 400. The illustrated apparatus 400 includes processor 401, memory 403, input/output circuitry 405, and communications circuitry 407. The apparatus 400 may be configured to execute the operations described herein with respect to FIGS. 1-15. Although these components 401-407 are described with respect to functional limitations, it should be understood that the particular implementations necessarily include the use of particular hardware. It should also be understood that certain of these components 401-407 may include similar or common hardware. For example, two sets of circuitries may both leverage use of the same processor, network interface, storage medium, or the like to perform their associated functions, such that duplicate hardware is not required for each set of circuitries.

In some embodiments, the processor 401 (and/or co-processor or any other processing circuitry assisting or otherwise associated with the processor) may be in communication with the memory 403 via a bus for passing information among components of the apparatus. The memory 403 is non-transitory and may include, for example, one or more volatile and/or non-volatile memories. In other words, for example, the memory 403 may be an electronic storage device (e.g., a computer-readable storage medium). The memory 403 may be configured to store information, data, content, applications, instructions, or the like for enabling the apparatus 400 to carry out various functions in accordance with example embodiments of the present invention. For example, the memory 403 may be configured to store access addresses (e.g., URLs) utilized by one or more validated external resources 112A-112N for sharing work objects between the group-based communication platform 105 and those validated external resources 112A-112N.

In some preferred and non-limiting embodiments, the processor 401 may be configured to execute instructions stored in the memory 403 or otherwise accessible to the processor 401. In some preferred and non-limiting embodiments, the processor 401 may be configured to execute hard-coded functionalities. As such, whether configured by hardware or software methods, or by a combination thereof, the processor 401 may represent an entity (e.g., physically embodied in circuitry) capable of performing operations according to an embodiment of the present invention while configured accordingly. Alternatively, as another example, when the processor 401 is embodied as an executor of software instructions, the instructions may specifically configure the processor 401 to perform the algorithms and/or operations described herein when the instructions are executed.

In some embodiments, the apparatus 400 may include input/output circuitry 405 that may, in turn, be in communication with processor 401 to provide output to the user and, in some embodiments, to receive an indication of a user input. The input/output circuitry 405 may comprise a user interface and may include a display, and may comprise a web user interface, a mobile application, a client device, a kiosk, or the like. In some embodiments, the input/output circuitry 405 may also include a keyboard, a mouse, a joystick, a touch screen, touch areas, soft keys, a microphone, a speaker, or other input/output mechanisms.

The communications circuitry 407 may be any means such as a device or circuitry embodied in either hardware or a combination of hardware and software that is configured to receive and/or transmit data from/to a network and/or any other device, circuitry, or module in communication with the apparatus 400. In this regard, the communications circuitry 407 may include, for example, a network interface for enabling communications with a wired or wireless communication network. For example, the communications circuitry 407 may include one or more network interface cards, antennae, buses, switches, routers, modems, and supporting hardware and/or software, or any other device suitable for enabling communications via a network. Additionally or alternatively, the communications circuitry 407 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 400. In some embodiments, one or more external systems (such as a remote cloud computing and/or data storage system) may also be leveraged to provide at least some of the functionality discussed herein.

Moreover, although the platform interface 111 is shown within the bounds of the group-based communication platform 105, it should be understood that the platform interface 111 may be embodied as an edge-based computing device in communication with aspects of the group-based communication platform 105 via a communication network 103. Such embodiments may comprise a plurality of platform interfaces 111 that are geographically distributed, and such platform interfaces 111 may be configured for communicating with validated external resources 112A-112N within a geographic range proximate a respective platform interface 111.

The term "circuitry" should be understood broadly to include hardware and, in some embodiments, software for configuring the hardware. With respect to components of each apparatus 200, 300, 400, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 301 may provide processing functionality, the memory 303 may provide storage functionality, the communications circuitry 307 may provide network interface functionality, and the like. Similar concepts may be embodied with apparatus 400.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Examples of electronic information exchange among one or more client devices 101A-101N, 102 the group-based communication platform 105, and one or more validated external resources 112A-112N are described herein with reference to FIG. 1.

As shown in FIG. 1, the group-based communication platform 105 enables individual client devices 101A-101N, 102 to exchange work objects with one another via the group-based communication platform 105 and/or via one or more validated external resources 112A-112N, if necessary. For client devices 101A-101N to exchange such work objects, individual client devices 101A-101N transmit work objects (e.g., messages, emails, files, events, and/or the like) to an interface (e.g., interface computing entity 109) via a communication protocol (e.g., via a websocket, a non-RTM messaging protocol, and/or the like). Those work objects are ultimately provided to one or more operation servers 107A-107N, which indexes the messages within database storage areas 108A-108N and distributes those work objects to the intended recipients (e.g., client devices 101A-101N, 102). The distributed work objects are provided to the recipient client devices 101A-101N, 102 via the interface computing entity 109 (or interface entity 111 and one or more validated external resources 112A-112N, if applicable), which maintains websocket connections with individual recipient client devices 101A-101N of the work object, and maintains one or more backend connections with the various operation servers 107A-107N. Work objects may be similarly distributed from client devices 102, by disseminating those work objects through applicable validated external resources 112A-112N to the group-based communication platform 105, which disseminates work objects in a matter as discussed above.

Work Objects

Work objects may be exchanged among one or more users (via respective client devices 101A-101N, 102) through the group-based communication platform 105 and/or one or more validated external resources 112A-112N. Work objects need not be limited to execution via one or more apps (either local or browser based) corresponding to the communication platform utilized for exchange. For example, a work object embodied as a message in accordance with certain embodiments is natively displayed via apps specifically configured for use with the group-based communication platform 105, however these messages may be readable by apps configured for use with validated external resources 112A-112N. As a specific example, the group-based communication platform 105 generates cache objects specifically configured for use with one or more validated external resources. Certain work objects however, may be tied to usage with a particular third party app or a particular type of app (which may have direct integration with a communication platform app, or may be accessible only outside of the communication platform app). For example, work objects embodied as audio files may only be executable via one or more apps configured for parsing audio files.

In certain embodiments, reading of particular work objects may be limited by encryption methodologies tied into those work objects. For example, certain encrypted work objects may only be readable through a specific app instance operating on and/or in association with a particular client device 101.

Moreover, as discussed herein, the operation servers 107A-107N may be configured for establishing one or more cache objects to be disseminated as a representation of an underlying work object. Such cache objects may provide preliminary data regarding the work object in a format that is easily and quickly rendered at a client device 101A-101N, 102. Thus, a user may determine whether additional information is needed regarding the underlying work object that justifies requesting the entirety of the underlying work object from an indexed storage location. In certain embodiments, the configuration of these cache objects is determined based at least in part on the work object type, an associated validated external resource (if any), and/or the like, as discussed herein.

Although the final representation of a cache object may be at least partially dependent on the type of work object represented, these cache objects may be generated utilizing a common cache object template, providing varying levels of detail for display regarding a particular work object. The cache object templates may be general, such that the templates are applicable to all (or at least a plurality of) work object types, or the cache object templates may be specific to particular work object types (both for summary cache objects and expanded cache objects, both of which are discussed herein), may provide an icon area (configured for displaying an icon indicative of the type of work object represented by the cache object, a source area (e.g., configured to provide data indicative of a source of a particular work object, such as via email, via message, via external application, and/or the like), a work object name area, a date and time area (e.g., a date and time of generation, a date and time of the occurrence of an event underlying a particular work object, and/or the like), a duration area (e.g., for events), a creator area, an other people/users area (e.g., invitees, intended recipients, and/or the like), content of the work object area (e.g., a short summary, a short clip, the entirety of the work object, and/or the like), an action area comprising one or more actions available for the work object (e.g., providing attendance data for events, answering a call, ending a call, replying to an email, and/or the like), an attachment area (e.g., providing an indication of attachments provided with a work object), and/or the like.

Moreover, cache objects may be provided at various levels of detail, and interaction with a cache object may cause a client device 101A-101N to retrieve and display a more detailed cache object relating to the same underlying work object. For example, cache objects may encompass summary cache objects (also referred to herein as first-level cache objects) providing extremely basic details regarding a work object, designed to enable a user to identify what the work object is (e.g., an email with a particular subject line, a file with a particular file name, and/or the like). In certain embodiments, the summary cache objects may encompass a limited quantity of content of the underlying work object (e.g., the first 2-4 lines of an email) to provide additional context for the user. The summary cache objects may be displayed via a client device 101A-101N within a visual container corresponding to a particular cache object. Moreover, as discussed herein, these summary cache objects may be passed to the client device 101A-101N for local storage and caching in real-time. In various embodiments, the underlying work object may be retained for storage at the group-based communication platform 105 (e.g., within one or more database storage areas 108).

The cache objects may further encompass expanded cache objects (also referred to herein as second-level cache objects). These expanded cache objects provide detailed content data from the underlying work object, however these expanded cache objects may omit formatting or other metadata of the underlying work objects. These expanded cache objects may be accessed by interacting (e.g., clicking) on a summary cache object displayed to a user via a client device 101A-101N. The expanded cache objects may be configured for display in a separate display window (e.g., a pop-up interface), or the expanded cache objects may visually unfurl for display in-line with messages and/or other work objects exchanged and displayed in the same display, for example, via mechanisms and processes as discussed in co-pending U.S. patent application Ser. No. 15/655,981, filed Jul. 21, 2017, the contents of which are incorporated herein by reference in their entirety.

In various embodiments, the expanded cache objects may be stored at the group-based communication platform 105, and may be retrieved and transmitted to a requesting client device 101 only upon receipt of an indication that a user interacted with a related summary cache object at the client device 101. In other embodiments, the expanded cache-objects may be provided to the client devices 101A-101N in real-time, however the expanded cache objects may not be displayed to a user until and unless the user interacts with the related summary cache object.

Moreover, in embodiments in which work objects are shared with client devices 102 via one or more validated external resources 112A-112N, both the summary cache object and the expanded cache object corresponding to a particular work object may be passed to the client devices 102 in real-time (or according to other defined work object transmission protocol). The cache object passed to client device 101A-101N and to validated external resources may be identical, or separate cache objects may be generated for distribution to the client devices 101A-101N and each of the validated external resources. For example, formatting data and/or other configuration data of cache objects may be specially defined for operating with various validated external resources. In such embodiments, the summary cache object may be presented to the client device 102 as a portion of a transmission (e.g., within the body of an email message), and the expanded cache object may be presented to the user as an attachment to the transmission (e.g., a separate file attachment). In other embodiments, the full work object (discussed below) may be attached to the transmission instead of the expanded cache object. Alternatively, the summary cache object may be an interactive hyperlink, which directs a client device 102 to a URL that causes the client device 102 to display (e.g., via a browser) or download the expanded cache object and/or the full work object.

In certain embodiments, the full work object may be accessed by a client device 101A-101N by interacting with the expanded cache object. Such an interaction at the client device 101A-101N may cause the client device to generate and transmit a request to the group-based communication platform 105 to provide the full work object to the client device 101A-101N (including formatting and/or any other underlying metadata). In certain embodiments, providing the full work object to the client device 101A-101N may cause the client device 101A-101N to initiate an external application operating on the client device 101A-101N for natively displaying the work object (e.g., an email may cause the client device 101A-101N to display the email work object within an email viewer application; a video file may cause the client device 101A-101N to initialize a video player application such that the video file executes via the video play application; and/or the like). Similar configurations may be provided for work objects provided to client devices 102 accessing the work objects via one or more validated external resources 112A-112N.

In yet other embodiments, full work objects may be displayable within object-specific containers either in-line or within modals of the group-based communication interface. These modals of certain embodiments provide an area within a display of a client device for displaying the entirety of the work object. When a work object is accessed from within the group-based communication interface (at client devices 101A-101N), the modals occur within the group-based communication interface. Thus, users seeking to view a full work object need not open a separate application or to be directed outside of the group-based communication interface to view full work objects. It should be understood that such functionality for viewing full work objects within the group-based interface may be provided for all work objects in certain embodiments, or may be provided for only a subset of work objects for which the group-based communication interface is capable of executing, reading, or using the work object. In such embodiments, the receiving client device 101A-101N need not initialize a separate application for viewing the work object. In certain embodiments, modals or other containers may be provided for executing an instance of an external application (e.g., a full version of an external application or a limited version of an external application) within the displayed modal, such that other work objects may be displayed within the group-based communication interface, even while accessing executable portions of an external application.

Moreover, upon a client device 101A-101N requesting a full work object, the client device 101A-101N may be configured to locally store the work object thereon for later access without a network connection. In other embodiments, the client device 101A-101N may be configured to store the full work object in short-term cache memory for display during the current interaction session, and may thereafter remove the work object from local memory once the user is no longer interacting with the work object. In the latter embodiments, later requests to access the full work object would be fulfilled by again transmitting the full work object to the client device 101A-101N from the group-based communication platform 105 in response to an access request generated at the client device 101A-101N.

Messages

In some embodiments of an exemplary group-based communication platform 105, a message, messaging communication, or other internal work object may be sent from a client device 101A-101N to a group-based communication platform 105. In various implementations, messages may be sent to the group-based communication platform 105 over communication network 103 directly by one of the client devices 101A-101N. The messages may be sent to the group-based communication platform 105 via an intermediary. For example, a client device 101A-101N may be a desktop, a laptop, a tablet, a smartphone, and/or the like that is executing a client application (e.g., a group-based communication app). In one implementation, the message may include data such as a message identifier, sending user identifier, a group identifier, a group-based communication channel identifier, message contents (e.g., text, emojis, images, links), attachments (e.g., files or other work objects), message hierarchy data (e.g., the message may be a reply to another message), third party metadata, and/or the like. In one embodiment, the client device 101A-101N may provide the following example message, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123 </password >
            //OPTIONAL <cookie>cookieID</cookie>
            //OPTIONAL <digital_cert_link>www.mydigitalcertificate.com/
    JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
    AppleWebKit/537.51.2 (KHTML, like Gecko) Version/7.0 Mobile/11D201
    Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version >7.1.1 </client_OS_version >
        <client_app_type>app with webkit</client_app_type>
        <app_installed_flag>true</app_installed_flag>
        <app_name>MSM.app</app_name>
        <app_version>1.0 </app_version>
        <app_webkit_name>Mobile Safari</client_webkit_name>
        <client_version>537.51.2</client_version>
    </client_details>
    <client_details>//iOS Client with Webbrowser
        <client_IP>10.0.0.123</client_IP>
        <user_agent_string>Mozilla/5.0 (iPhone; CPU iPhone OS 7_1_1 like Mac OS X)
    AppleWebKit/537.51.2 (KHTML, like Gecko) Version/7.0 Mobile/11D201
    Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version >7.1.1 </client_OS_version >
        <client_app_type>web browser</client_app_type>
        <client_name>Mobile Safari</client_name>
        <client_version>9537.53</client_version>
    </client_details>
    <client_details>//Android Client with Webbrowser
        <client_IP>10.0.0.123</client_IP>
        <user_agent_string>Mozilla/5.0 (Linux; U; Android 4.0.4; en-us; Nexus S
    Build/IMM76D) AppleWebKit/534.30 (KHTML, like Gecko) Version/4.0 Mobile
    Safari/534.30</user_agent_string>
        <client_product_type>Nexus S</client_product_type>
        <client_serial_number>YXXXXXXXXZ</client serial number>
        <client_UDID>FXXXXXXXXX-XXXX-XXXX-XXXX-
    XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details>//Mac Desktop with Webbrowser
        <client_IP>10.0.0.123</client_IP>
        <user_agent_string>Mozilla/5.0 (Macintosh; Intel Mac OS X 10_9_3)
    AppleWebKit/537.75.14 (KHTML, like Gecko) Version/7.0.3
    Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-
    XXXXXXXXXXXXX</client_UDID>
        <client_OS>Mac OS X</client_OS>
        <client_OS_version>10.9.3</client_OS_version>
        <client_app_type>web browser</client_app_type>
```

```xml
    <client_name>Mobile Safari</client_name>
    <client_version>537.75.14</client_version>
  </client_details>
  <message>
    <message_identifier>ID_message_10</message_identifier>
    <team_identifier>ID_team_1</team_identifier>
    <channel_identifier>ID_channel_1</channel_identifier>
    <contents>That is an interesting invention. I have attached a copy our patent
policy. </contents >
    <attachments>patent_policy.pdf</attachments>
  </message>
</auth_request>
```

In the illustrated embodiment, the group-based communication platform 105 comprises a plurality of operation servers 107A-107N configured to receive and/or disseminate messages transmitted between and/or to a plurality of client devices 101A-101N within a channel identified by a channel identifier and/or a group identifier; to facilitate indexing of those messages as discussed herein; and/or to facilitate dissemination of those messages among client devices 101A-101N that collectively form the membership of the communication channel and client devices 102 having access to work objects shared within the communication channel via one or more validated external resources 112A-112N.

In some embodiments, data indicating responses may be associated with a message. For example, responses to the message by other users may include reactions (e.g., selection of an emoji associated with the message, selection of a "like" button associated with the message), clicking on a hyperlink embedded in the message, replying to the message (e.g., posting a message to the communication channel interface in response to the message), downloading a file associated with the message, sharing the message from one group-based communication channel to another group-based communication channel, pinning the message, starring the message, and/or the like. In one implementation, data regarding responses to the message by other users may be included with the message, and the message may be parsed (e.g., using PHP commands) to determine the responses. In another implementation, data regarding responses to the message may be retrieved from a database. For example, data regarding responses to the message may be retrieved via a Vitess database command, or a MySQL database command similar to the following:

```
SELECT messageResponses
FROM MSM_Message
WHERE messageID = ID_message_10.
```

For example, data regarding responses to the message may be used to determine context for the message (e.g., a social score for the message from the perspective of some user). In another example, data regarding responses to the message may be analyzed to determine context regarding the user (e.g., the user's expertise in a topic may be determined based on the responses to the user's message regarding the topic, and the user's expertise may be assigned to the user identifier).

In embodiments, attachments may be included with the message. These attachments may, in certain circumstances, constitute separate work objects (e.g., files, event invitations, and/or the like), which may be received and processed by the operation servers 107A-107N in accordance with their respective work object type. In one implementation, the message may be parsed (e.g., using PHP commands) to determine file names of the attachments. For example, file contents may be analyzed to determine context for the message (e.g., a patent policy document may indicate that the message is associated with the topic "patents").

In embodiments, a conversation primitive may be associated with the message. In one implementation, a conversation primitive is an element used to analyze, index, store, and/or the like messages and/or other work objects. For example, the message may be analyzed by itself, and may form its own conversation primitive. In another example, the message may be analyzed along with other messages that make up a conversation (e.g., together with other relevant work objects), and the messages that make up the conversation may form a conversation primitive. In one implementation, the conversation primitive may be determined as the message, a specified number (e.g., two) of preceding messages and a specified number (e.g., two) of following messages. In another implementation, the conversation primitive may be determined based on analysis of topics discussed in the message and other messages (e.g., in the channel) and/or proximity (e.g., message send order proximity, message send time proximity) of these messages relative to one another and/or relative to other work objects.

As discussed herein, work object context data, such as metadata and/or the contents of the message may be used to index the message (e.g., using the conversation primitive), to facilitate various facets of searching (i.e., search queries that return results from the operation servers 107A-107N), and/or or to otherwise establish one or more relationships with other work objects (e.g., other messages or other work objects). Metadata associated with the message may be determined and the message may be indexed in the database storage areas 108A-108N. In one embodiment, the message may be indexed such that messages shared within a particular communication channel are stored separately. In one implementation, messages may be indexed at a plurality of separate distributed repositories (e.g., to facilitate scalability). If there are attachments associated with the message, file contents of the associated files may be used to index such files and messages in the operation servers 107A-107N to facilitate searching.

Message Intake and Distribution

Figure 5:
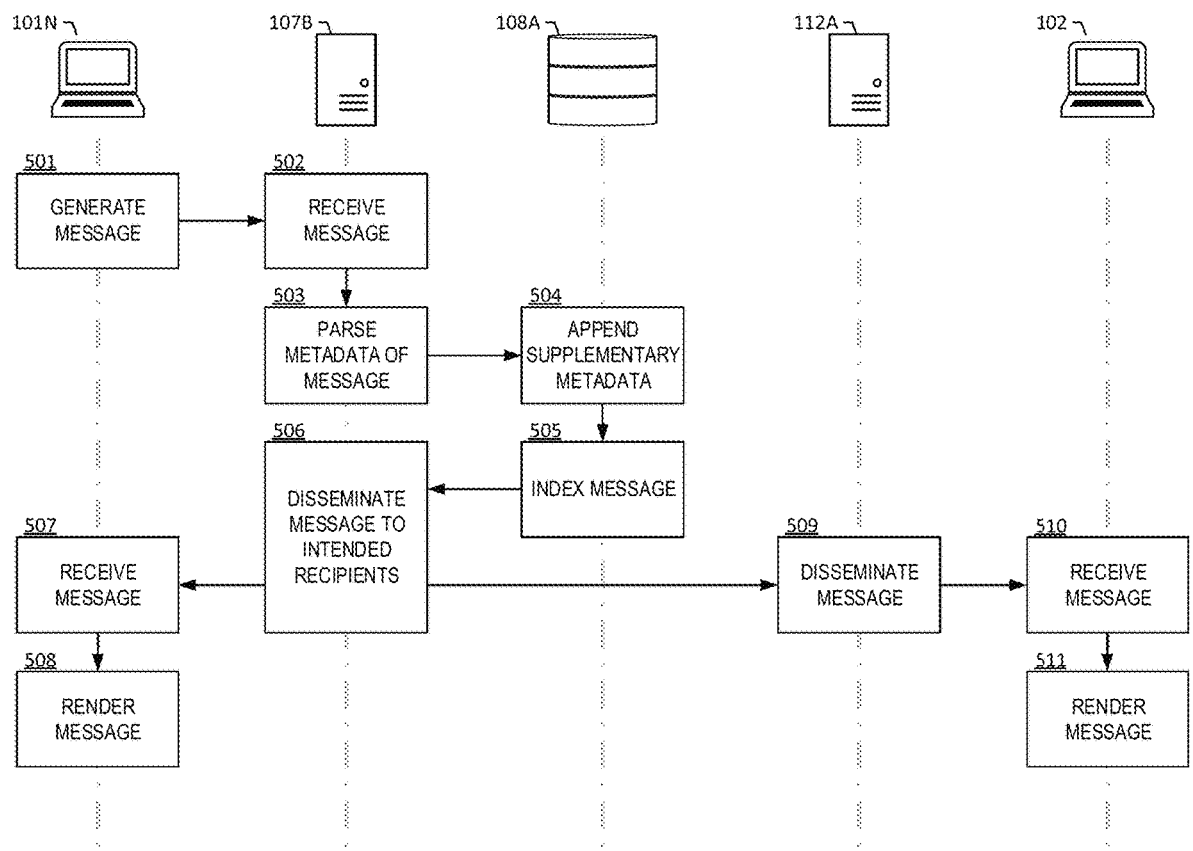
FIG. 5 shows an example data flow attributable to a message work object according to one embodiment.

Messages are generated by and received from client devices 101A-101N interacting directly with the group-based communication platform 105. FIG. 5 illustrates various processes performed by various computing entities discussed herein with respect to message intake and distribution. As mentioned, messages are initially generated at client devices 101A-101N, as shown at Block 501. Messages are generated in response to user input received at the generating client device 101A-101N, and are indicative of the content the user intended to convey to others by way of the generated message (e.g., the user may provide user input of "Howdy Group!" to be conveyed to others via the message). As should be understood, messages may contain alphanumeric text, emojis, and/or other input provided by the user. The content generated by the user (e.g., via user input) is combined with other context data generated by and/or relating to the client device 101A-101N and applicable to the message. This context data comprises metadata (as reflected in the sample message above) to enable the message to be appropriately parsed and disseminated via the group-based communication platform 105. As discussed in greater detail herein, users may also attach other work objects (e.g., files) to messages as well.

The generated messages are passed to the group-based communication platform 105, specifically to one or more of the operation servers 107A-107N, via the interface computing entity 109. The operation servers 107A-107N receive the generated message (as shown at Block 502) and prepare the message for distribution to the appropriate recipients of the message. The operation servers 107A-107N determine appropriate recipients of the message (e.g., other users of the group-based communication platform 105 that are accessible via message-based distribution and/or other potential recipients that are accessible via validated external resources 112A-112N) by parsing the message metadata, as indicated at Block 503. As discussed above, the message metadata may be indicative of a group-based communication channel in which the message is to be exchanged. As discussed, the channel may have one or more other members, which may be determined to be intended recipients of the message. Moreover, the channel data may indicate that messages are also to be disseminated to users outside of the group-based communication platform 105. As a specific example, data associated with the channel may indicate that a particular email address is designated to receive messages exchanged within the group-based communication channel. Based on the parsed metadata, the operation servers 107A-107N determine the appropriate route of dissemination of the message (e.g., via one or more existing communication channels and/or one or more inter-system communication pathways). In certain embodiments, the group-based communication platform 105 determines the most appropriate process for distribution based at least in part on the validated external resource to be utilized for communication of the message to one or more client devices 102.

Moreover, in certain embodiments, the operation servers 107A-107N may pass the message to one or more database storage areas 108A-108N for indexing. The databases may generate and append supplemental metadata to the message after review of the context data, as indicated at Block 504. Such supplemental metadata may comprise metadata indicative of a topic assigned to the message. Moreover, such supplemental metadata may be generated in accordance with one or more artificial intelligence and/or machine-learning algorithms configured to review the context data, such as the substantive contents of the message and/or the metadata associated with the message to determine an appropriate topic to be assigned to the message. In certain embodiments, the topics available for assignment may be established manually by user input, and the database storage areas 108A-108N may be configured to select a most-appropriate topic (or multiple topics) from the established listing. In other embodiments, the artificial intelligence and/or machine learning algorithms may be configured for automatically generating a topic in instances in which previously generated topics are deemed too tenuous for description of the message.

As a specific example, the database storage areas 108A-108N may utilize context data of the message, such as the message content (which may be reviewed utilizing a term-frequency, inverse document frequency (Tf-idf) algorithm in light of a larger dataset of messages to identify relevant topics), message metadata (e.g., reviewing topics assigned to threads in which the message is a part. The databases may also and/or alternatively identify a sending user identifier and determine the sending user identifier's assigned subject matter expertise to weigh the potential topics that may be assigned to the message), and/or the like to determine an appropriate topic.

Ultimately, the database storage areas 108A-108N index the message, as shown at Block 505, which may make the message available for later search/retrieval (e.g., for queries satisfying message access requirements, such as meeting authorization prerequisites to view the message (e.g., a private message may be searchable by the sender and receiver, but no one else)).

The operation servers 107A-107N disseminate the message to intended recipients (e.g., the originally received message or the indexed message including the supplemental metadata) as shown at Block 506. Recipient client devices 101A-101N accessible directly via the group-based communication platform may receive messages via distribution through the interface computing entity 109 (as indicated by Block 507) and may render those messages (e.g., using style guides stored locally on those client devices 101A-101N) as indicated at Block 508.

To disseminate messages (or other internal work objects) to other users utilizing client devices 102 to access data provided via one or more validated external resources, the operation servers 107A-107N determine appropriate validated external resources to be utilized for message dissemination. Those validated external resources may be identified based at least in part on data identifying intended recipients (e.g., validated external resource identifiers). Based at least in part on the identified validated external resources to receive the messages, the operation servers 107A-107N construct work object data and/or cache objects that may be usable by the validated external resources and/or client devices configured for operating in conjunction with the identified validated external resources. Recipients reachable via one or more validated external resources 112A-112N may receive messages disseminated from the group-based communication platform 105 by receipt at the applicable validated external resource 112A-112N (as indicated at Block 509), which may then disseminate the message to client devices 102 (e.g., with an appropriate style guide applicable to work objects common to the validated external resource 112A-112N). The client device 102 may then receive the message and render the message for display, as indicated at Blocks 510-511.

Because the validated external resources 112A-112N may utilize separate style guides for work object display, the group-based communication platform 105 may be configured to transmit the messages to the validated external resources 112A-112N via one or more formatting agnostic data transmission protocols. For example, the group-based communication platform 105 may pass message data to validated external resources 112A-112N via one or more APIs, via one or more proxy endpoints providing message data in a format discernable to the validated external resource 112A-112N to automatically identify various components of the message data (e.g., XML formatting providing various labeled containers of data), and/or the like. The validated external resource 112A-112N may then apply self-imposed formatting guides to the messages and/or may automatically omit various portions of the message data, as needed to comply with the self-imposed formatting.

Emails

Emails are a type of external work object for exchanging data between multiple client device 102 users. Emails may contain alphanumeric text only (ASCII format emails) or additional data contents (e.g., Multipurpose Internet Mail Extensions (MIME) format, rich text format, and/or the like), such as data indicative of desired formatting of text, various work objects included as attachments, and/or the like. Emails may be disseminated in accordance with included email addresses, which are indicative of a domain of a user (e.g., a recipient's domain or a sending user's domain)—thereby providing email systems with sufficient data to direct the email to the appropriate domain system (e.g., which may be a type of validated external resource 112 as discussed herein); and a local portion—thereby providing the domain with sufficient information to identify the user associated with the message (e.g., the intended recipient or the sending user). Thus, an entire email address provides sufficient data to direct email work objects between users.

Emails may comprise context data, such as content data indicative of the content a user desires to provide to another user, and metadata indicative of various characteristics of the email. Context data of emails is generally different (e.g., in content and/or formatting) than context data of messages and other internal work objects and may vary between email systems utilized to generate the emails. For example, certain metadata may be unique to particular sending email systems. Metadata such as the sending user email address, the recipient(s) user email address(es), the sent time/date, the received time/data, email size, email subject, whether the email is flagged as private/public, whether the email is flagged as important/low importance/and/or the like; or other characteristics of the email may be reflected within the metadata. Moreover, metadata associated with the email may be indicative of the type of formatting applied to the email (which, as discussed herein, may be utilized later for formatting other work objects generated based on the email).

Emails may be generated at client devices 102, and dissemination therefrom may pass through one or more validated external resources 112A-112N (including, for example, a domain host computing entity of the sending user identifier and one or more domain host computing entities of the recipient(s) of the email). As discussed herein, the group-based communication platform 105 may be configured to operate as a recipient and/or a sending domain host for emails to enable inter-platform communication therewith.

Email Intake and Dissemination

As discussed above, emails may be provided to the group-based communication platform 105 from one or more validated external resources 112A-112N. Emails are provided via a defined communication pathway leading to/through the group-based communication platform 105, such as a communication pathway established specifically for providing emails to the group-based communication platform 105. In certain embodiments, the group-based communication platform 105 may be configured to generate and/or host one or more email addresses to act as recipients for emails generated via the one or more validated external resources 112A-112N. These email addresses hosted by the group-based communication platform 105 may be channel email addresses, wherein each group-based communication channel is assigned (either automatically or manually) a channel email address such that emails directed to the channel email address may be disseminated to members of the channel, for example, as a part of a communication interface provided to client devices 101A-101N having access to the channel via the group-based communication platform 105. As just one example, upon generation of a channel (or after generation of a channel and in response to a trigger event, such as a user request) the group-based communication platform 105 may automatically generate an email address to be assigned to the channel. The email address may comprise a randomly assigned string of alphanumeric characters representing the local portion of the email address, and may be hosted at a defined domain corresponding to the group-based communication platform 105. As an example, an email address assigned to a particular channel may be "w94kxetuu4234dkfr@slack.com."

In other embodiments, the local portion of the email address may be indicative of the identity of the channel and/or group to which it is assigned. For example, an email address for Company Corp's channel entitled "fat cats" may be embodied as "fat_cats.company_corp@slack.com." It should be understood that other formats and/or domains may be provided/utilized.

In other embodiments, a general email address or other communication pathway (not specific to any one communication channel) may be utilized and context data of emails may be utilized to direct the email to particular intended recipients and/or to a particular communication channel.

Figure 6:
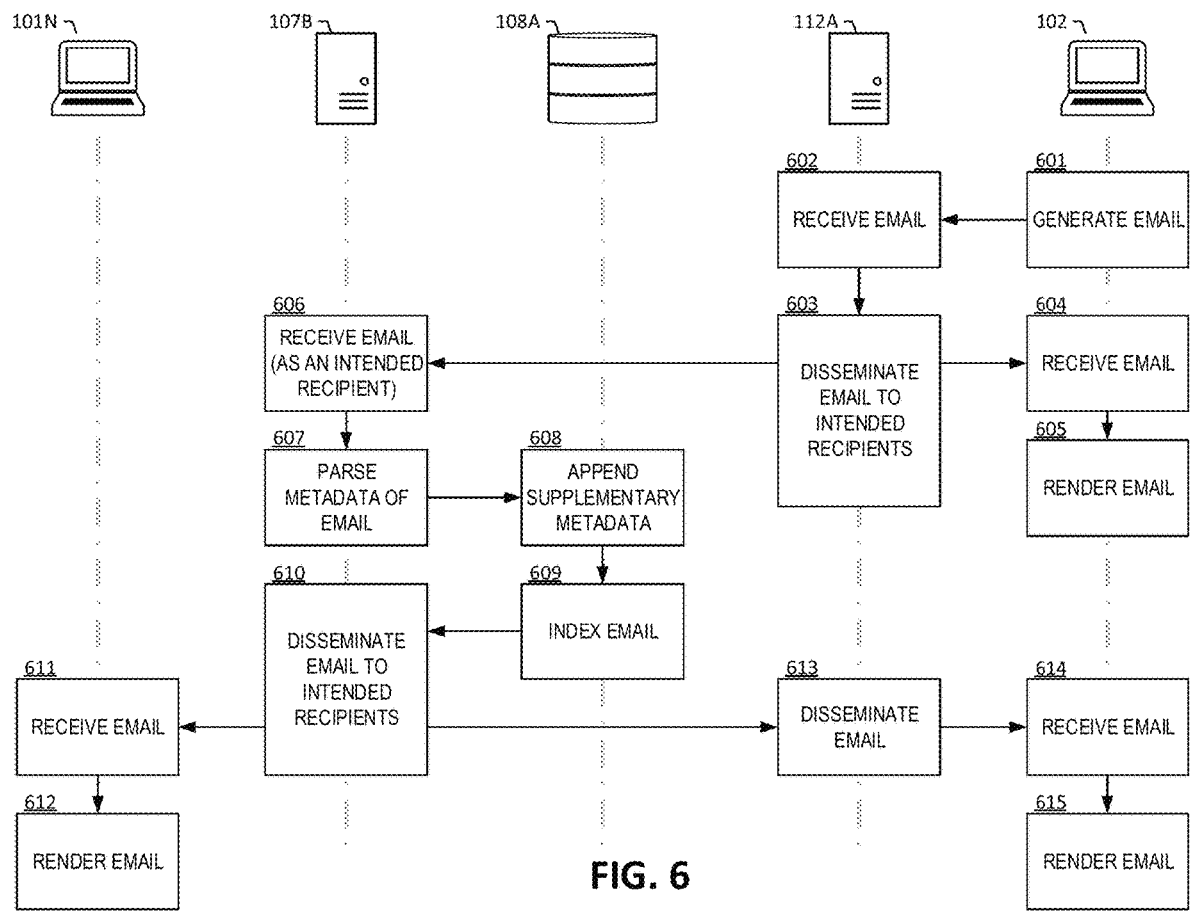
FIG. 6 shows an example data flow attributable to an email work object according to one embodiment.

Once received at the group-based communication platform 105, emails may be processed for indexing/storage and for dissemination to any other identified intended recipients not otherwise provided for with the initial email transmission. FIG. 6 illustrates an example process for intake processing of emails into the group-based communication platform 105. As shown at Block 601 a client device 102 generates an email to be disseminated to one or more users. The email is sent to a validated external resource 112A-112N (e.g., a sending user domain), which receives the email, as indicated at 602, and may forward the email along to a separate validated external resource 112A-112N (e.g., a recipient domain validated external resource, not separately shown in FIG. 6), as a part of disseminating the email to intended recipients and as indicated at Block 603. Emails transmitted to other email recipients are then provided to client devices 102, as indicated at Block 604, which render the emails for digestion by the user, as indicated at Block 605.

As indicted at Block 606, the email may be further disseminated to the group-based communication platform 105 (e.g., by sending the email to an email address associated with a particular group-based communication channel). The group-based communication platform 105 (e.g., via the operation servers 107A-107N) first identifies what type of work object is received (e.g., based at least in part on the communication pathway utilized to receive the work object, and/or other characteristics of the work object). The type of work object received is utilized to determine how to parse the received work object, as different parsing methods are utilized to extract relevant data within different work object types. The group-based communication platform 105 then parses the context data of the email, as indicated at Block 607, and provides the email to the database storage areas 108A-108N. While parsing the email, the operation servers 107A-107N identifies content of the email, and may identify one or more other characteristics of the email that may be integrated with the messaging configuration of the group-based communication platform 105. For example, the operation servers 107A-107N may identify formatting data for the email, and the operation servers 107A-107N may ascertain appropriate formatting corollaries for the group-based communication platform 105 (which may utilize a unique style guide for messages). Such identified characteristics may be utilized when disseminating the email to client devices 101A-101N as a part of the group-based communication platform (e.g., as summary cache objects discussed herein).

While parsing the email, the group-based communication platform 105 retrieves the substantive content of the email (e.g., portions of the email generated manually by the sending user), which may be utilized for searching and/or classification of the email. Moreover, the group-based communication platform 105 parses various portions of the metadata included with the email to identify relevant characteristics of the email usable for indexing the email, for classifying the email, and/or otherwise for providing the email to various intended recipients. For example, characteristics unique to emails may inform how to combine newly received emails with previously received emails, and/or for establishing appropriate topics for newly received emails.

In certain embodiments, the group-based communication platform 105 identifies a sender of an email by parsing the metadata received with the email. The sender may be identified by a sending email address. The group-based communication platform may then determine whether the sender matches any profiles or other user-identifying data stored at the group-based communication platform 105 (e.g., stored within databases 108A-108N). Determining whether the sender matches existing user profiles may be utilized to identify a sender's expertise, which may be relevant for establishing appropriate topics for the email.

Moreover, the group-based communication platform 105 identifies intended recipients of the email. The intended recipients may be identified as members of a particular communication channel identified as an intended recipient and/or as other email addresses identified as intended recipients of the email. In certain embodiments, the group-based communication platform 105 is configured to cross-reference specifically enumerated intended recipients (e.g., identified by email address) against intended recipients within a particular communication channel to identify duplicate recipients. As noted above in identifying whether a sending user matches any user profiles within the group-based communication platform 105, the group-based communication platform 105 determines whether any intended recipient email addresses match user profiles known to the group-based communication platform 105. If a particular intended recipient is identified as matching a known user profile, the group-based communication platform 105 determines whether the known user profile is reflected as a member of a communication channel also indicated as an intended recipient of the email. If a match is identified, the group-based communication platform 105 determines the email address is a duplicate. The group-based communication platform 105 may then take one or more remedial measures upon identifying a duplicate recipient, such as delivering the email (as a message) to the user's group-based communication interface without denoting the work object as "new." In other embodiments, the group-based communication platform 105 does not take any remedial actions.

The group-based communication platform 105 may further parse the received email to determine whether the email is directly related to any other existing emails. For example, the group-based communication platform 105 may determine whether the email is a part of an email thread (e.g., whether the email is sent in response to another existing email). If the group-based communication platform 105 determines that the newly received email is associated with an existing email thread, the group-based communication platform 105 may be configured to associate the email with the previously existing email, such that graphical display of the newly received email (e.g., at client devices 101A-101N) places the email in a container generated for the previously existing and related email. The container may be flagged as containing a new email for the user. However, if the email is not identified as related to an existing email, the group-based communication platform 105 may be configured to generate entirely new work object and/or cache object data for generating a new cache object for display at group-based communication interfaces of client devices 101A-101N.

The group-based communication platform 105 may further determine whether there are any security and/or sharing concerns applicable to the email while parsing the same. The group-based communication platform 105 determines what client devices 101A-101N, users, groups, and/or the like may access the email, which may dictate how the email is utilized and/or indexed (e.g., the security and/or sharing determination may establish which work object corpus the email is to be added to).

Moreover, the group-based communication platform may determine whether any other characteristics exist that are unique to the email. For example, particular email source hosts (e.g., hosts associated with the sender) may provide specific metadata content in emails that may be utilized by the group-based communication platform 105 in establishing supplemental metadata for the email (as discussed herein). For example, specific formatting data may be utilized for identifying appropriate formatting corollaries for use with the cache objects.

As yet another example, while parsing the email, the operation servers 107A-107N may determine whether the email is a reply to or is otherwise related to an already existing message reflected within the databases 108A-108N. The group-based communication platform 105 may be configured to support email threading, such that identification of an email as being related to an already existing email may cause the group-based communication platform 105 to append the newly received email onto an existing email reflected within the databases 108A-108N Similarly, rather than rendering the newly received email as an entirely separate new email work object, upon passing the newly received email to one or more client devices 101A-101N for rendering thereon (as discussed in greater detail herein), the email may be passed with an indication of relation to an existing, previously displayed email message. The client devices 101A-101N may then simply append the newly received email to an existing email work object displayed at the client devices 101A-101N. In certain embodiments, a summary cache object relating to the email message may be highlighted (e.g., with a flag or other indicator) to reflect the receipt of a new email message), however a new summary cache object need not be generated for display relating to the newly received email work object. However, if an email is determined to not be in reply to any existing email, the new email may be disseminated for display as a new work object (e.g., with a corresponding new summary cache object) as discussed herein.

Figure 7A:
FIGS. 7A-7B show example cache objects attributable to an email work object according to one embodiment.
Figure 7B:

Moreover, while parsing the email, the operation servers 107A-107N may generate a lightweight summary cache object representative of the email for rendering within visual containers by client devices 101A-101N that ultimately receive the email as a work-object via the group-based communication platform 105. The summary cache object may be constructed from portions of the context data of the email, which may be inserted into a summary cache object template. Other portions of the template may be selected and/or populated with data generated by the group-based communication platform 105. The summary cache object may comprise at least a portion of the content of the email (e.g., the title, the first defined number of lines, words, characters, and/or the like). In certain embodiments, the summary cache object may omit formatting data, and may instead rely on local formatting mechanisms stored locally on the client devices 101A-101N for rendering the summary cache object. Examples of such email summary cache objects as may be displayed via a client device 101A-101N are shown at FIGS. 7A-7B.

Moreover, the operation servers 107A-107N may generate an expanded cache object having additional detail of the email (e.g., the entirety of the email content), certain formatting characteristics, attachments, and/or the like) to be associated with the email and the summary cache object. The summary cache object may then be configured to be interactive for the receiving client devices 101A-101N, such that clicking/selecting the summary cache object may cause the client device 101A-101N to request the expanded cache object from the group-based communication platform 105. Likewise, the expanded cache object may be similarly interactive, and clicking/selecting the expanded cache object may cause the client device 101A-101N to request the full email from the group-based communication platform 105.

The databases may generate and append supplemental metadata to the email after review of the same, as indicated at Block 608. Such supplemental metadata may comprise metadata indicative of a topic assigned to the email. Moreover, such supplemental metadata may be generated in accordance with one or more artificial intelligence and/or machine-learning algorithms configured to review the context data, such as the substantive contents of the email and/or the metadata associated with the email to determine an appropriate topic to be assigned to the email. Certain emails from particular host systems may already include a corollary to topic data (e.g., email labels), which may be utilized as a factor in assigning a topic to the email work object. In certain embodiments, the topics available for assignment may be established manually by user input, and the database storage areas 108A-108N may be configured to select a most-appropriate topic (or multiple topics) from the established listing. In other embodiments, the artificial intelligence and/or machine learning algorithms may be configured for automatically generating a topic in instances in which previously generated topics are deemed too tenuous for description of the email.

As a specific example, the database storage areas 108A-108N may utilize context data of the email, such as the email content (which may be reviewed utilizing a Tf-idf algorithm in light of a larger dataset of work objects to identify relevant topics), email metadata (e.g., reviewing topics assigned to threads in which the email is a part; identifying a sending user and determining the sending user's assigned subject matter expertise to weigh the potential topics that may be assigned to the email), and/or the like to determine an appropriate topic.

Ultimately, the database storage areas 108A-108N index the email, as shown at Block 609, which may make the email available for later search/retrieval (e.g., for queries satisfying email access requirements, such as meeting authorization prerequisites to view the message).

In certain embodiments, the operation servers 107A-107N may disseminate the email (e.g., as a summary cache object) to intended recipients, as indicated at Block 610. In various embodiments, the group-based communication platform may disseminate the summary cache object to client devices 101A-101N. Those client devices 101A-101N may receive the email (e.g., the lightweight summary cache work object), as indicated at Block 611, and may render the email for display, as indicated at Block 612. Rendering the email (e.g., the lightweight summary cache work object may comprise rendering the email to appear as a native work object of the group-based communication platform). Such renders may appear as objects disseminated to the user, which may provide certain data regarding the work object for the user of the client device 101A-101N. In certain embodiments, emails may be rendered at the client devices 101A-101N with one or more additional action-related buttons that may be utilized to further interact with the emails. For example, a user may be provided with options to reply, reply-all, forward, and/or the like the email from within a group-based communication interface.

To disseminate emails to other users utilizing client devices 102 to access data provided via one or more validated external resources, the operation servers 107A-107N determine appropriate validated external resources to be utilized for email dissemination. Those validated external resources may be identified based at least in part on data identifying intended recipients (e.g., validated external resource identifiers). Based at least in part on the identified validated external resources to receive the emails, the operation servers 107A-107N construct work object data and/or cache objects that may be usable by the validated external resources and/or client devices configured for operating in conjunction with the identified validated external resources. Moreover, the operation servers 107A-107N disseminate the email (e.g., as a summary cache object, as the full email, and/or the like) to intended recipients accessing the communication exchange via validated external resources 112A-112N as shown at Blocks 613-615. However, it should be understood that the group-based communication platform 105 may be configured to recognize whether intended recipients were included within the recipient list of the original email (as determined based on the email metadata), and the group-based communication platform 105 may refrain from sending content-duplicate emails to those recipients who have already received a particular email. In the specific circumstances of the group-based communication platform 105 transmitting the email to validated external resources via email-based communication pathways, the group-based communication platform 105 may utilize formatting data originally provided with the received email to send the email along to recipient validated external resources, thereby effectively forwarding the email (e.g., together with any supplemental metadata generated for the email) to the intended recipients.

Recipients reachable via one or more validated external resources 112A-112N may receive emails disseminated from the group-based communication platform 105 by receipt at the applicable validated external resource 112A-112N (as indicated at Block 613), which may then disseminate the emails to client devices 102 (e.g., with an appropriate style guide applicable to work objects common to the validated external resource 112A-112N). The client device 102 may then receive the email and render the email for display, as indicated at Blocks 614-615.

Because the validated external resources 112A-112N may utilize separate style guides for work object display, the group-based communication platform 105 may be configured to transmit the emails to the validated external resources 112A-112N via one or more formatting agnostic data transmission protocols. For example, the group-based communication platform 105 may pass email data to validated external resources 112A-112N via one or more APIs, via one or more proxy endpoints providing email data in a format discernable to the validated external resource 112A-112N to automatically identify various components of the email data (e.g., XML formatting providing various labeled containers of data), and/or the like. The validated external resource 112A-112N may then apply self-imposed formatting guides to the emails and/or may automatically omit various portions of the email data, as needed to comply with the self-imposed formatting.

Events

Events, event occurrences, or event objects may constitute one of a plurality of work object types (internal work objects and/or external work objects) having scheduling parameters, including, for example, calls (e.g., audio calls, video calls, and/or the like), appointments (which may be single-user appointments or multi-user meetings), reminders, dated tasks, objects having associated time constraints, and/or the like. Events represented as work objects may encompass real-time communication pathways (which may be duration limited) for enabling real-time audio and/or video discussions between two or more client devices 101A-101N, 102. These real-time communication pathways may be established according to one of a plurality of communication protocols, which may be exclusive to particular call providers (e.g., Skype® calls, Zoom® calls, Google Hangouts, WebEx® meetings, and/or the like). However, it should be understood that various events need not encompass real-time communication pathways. For example, events may be scheduled as single-person appointments (no communication between users necessary), as "in-person" meetings at a defined location, as traditional teleconference meetings using traditional telephone connectivity, as reminders set by a user, and/or the like.

In addition to data indicative of a communication pathway utilized for a particular event (if applicable) events comprise additional contextual data, such as event metadata indicative of an event identifier, an event occurrence title, an event location (which may be indicative of the communication pathway utilized in certain embodiments), an event timestamp, an event runtime identifier, an event date (e.g., an event start date and an event end date), an event time (e.g., an event start time and an event end time), event invitees (e.g., identified by user-identifying data, such as a unique user identifier, an email address, and/or the like), an event occurrence acceptance identifier, an event occurrence decline identifier, alert or reminder timing and settings (e.g., when an alert should be triggered for the event, what type of alert should be triggered, and/or the like), and/or the like. The event may additionally comprise event content, which may encompass alphanumeric text, event attachments (e.g., other work objects attached to an event, such as files, emails, messages, and/or the like). Moreover, events may be automatically supplemented during and/or after completion of any corresponding real-time communication component with one or more recordings (e.g., audio recordings, video recordings, transcripts, and/or the like) as may be generated in accordance with various call providers.

In various embodiments, events may be generated at client devices 101A-101N, 102 and/or at validated external resources 112A-112N (e.g., third party call provider cloud services) and/or may be disseminated from client devices 101A-101N, 102 and/or validated external resources 112A-112N. In certain embodiments, events may be generated via a calendaring application executable locally on a client device 101A-101N, 102. The calendaring application may be associated with and/or integrated with an application of the group-based communication platform 105 and/or a validated external resource 112A-112N. Examples of third-party calendaring applications that may be utilized in accordance with various embodiments are iCal®, Microsoft Outlook®, GCal®, and/or the like. Moreover, events may originate from non-traditional event generators, such as task generators, work flow programs, triaging programs, and/or the like. These non-traditional event generators may generate events and/or reminders for users as output, to be represented within separate calendaring applications. The non-traditional event generators may also generate objects specifically usable within the generating program, but which includes specific timing data (e.g., a due date) that may be extracted by the group-based communication platform 105 and utilized to construct event data. Context data of events may vary substantially between event types, the sources of the events, and/or the like.

Particularly when intaking events generated at and/or in association with client devices 102 operating with validated external resources, the group-based communication platform 105 may be configured to accept event invitations as a proxy for particular users having access to the group-based communication platform 105 via client devices 101A-101N. Similarly, the group-based communication platform 105 may be configured to operate as an originator to disseminate events for use by client devices 102 (e.g., via validated external resources 112A-112N) to enable inter-platform communication therewith.

Moreover, certain embodiments are configured for backfilling a user's calendar (e.g., when a new user begins utilizing the group-based communication platform 105), such that events that have been previously formed and/or events that have occurred in the past but are not yet known/reflected at the group-based communication platform 105 may be retrieved by the group-based communication platform 105 (e.g., from the client device 101A-101N, and/or from a validated external resource 112A-112N). Backfilled events may comprise future events (or current events) that were not previously provided to the group-based communication platform 105, and/or past events (e.g., those with date and/or timestamp data occurring prior to the current time and/or those with an event completion indicator indicating the event has been completed). In certain embodiments, these backfilled events may be retrieved in response to a request provided by the group-based communication platform 105 for backfilled events that is provided to the client device 101A-101N and/or a validated external resource 105.

A process similar to the backfill process may be utilized to retrieve any events generated while a client device 101A-101N and/or validated external resource 112A-112N is disconnected from the group-based communication platform 105. In such instances, a delta sync process may be utilized to retrieve any events generated previously but not yet received and reflected at the group-based communication platform 105. In other words, the delta sync process updates and incorporates any changes to data not present during a previous sync.

Event Intake and Dissemination

As discussed above, events may be provided to the group-based communication platform 105 via client devices 101A-101N interacting directly with the group-based communication platform 105 and/or from one or more validated external resources 112A-112N. In certain embodiments, the group-based communication platform 105 may be configured to generate and/or host one or more events (e.g., encompassing audio and/or video calls). Moreover, the group-based communication platform 105 may be configured to disseminate events to identified users, for example, by identifying intended recipients and for directing events to client devices 101A-101N corresponding to the intended recipients.

Figure 8:
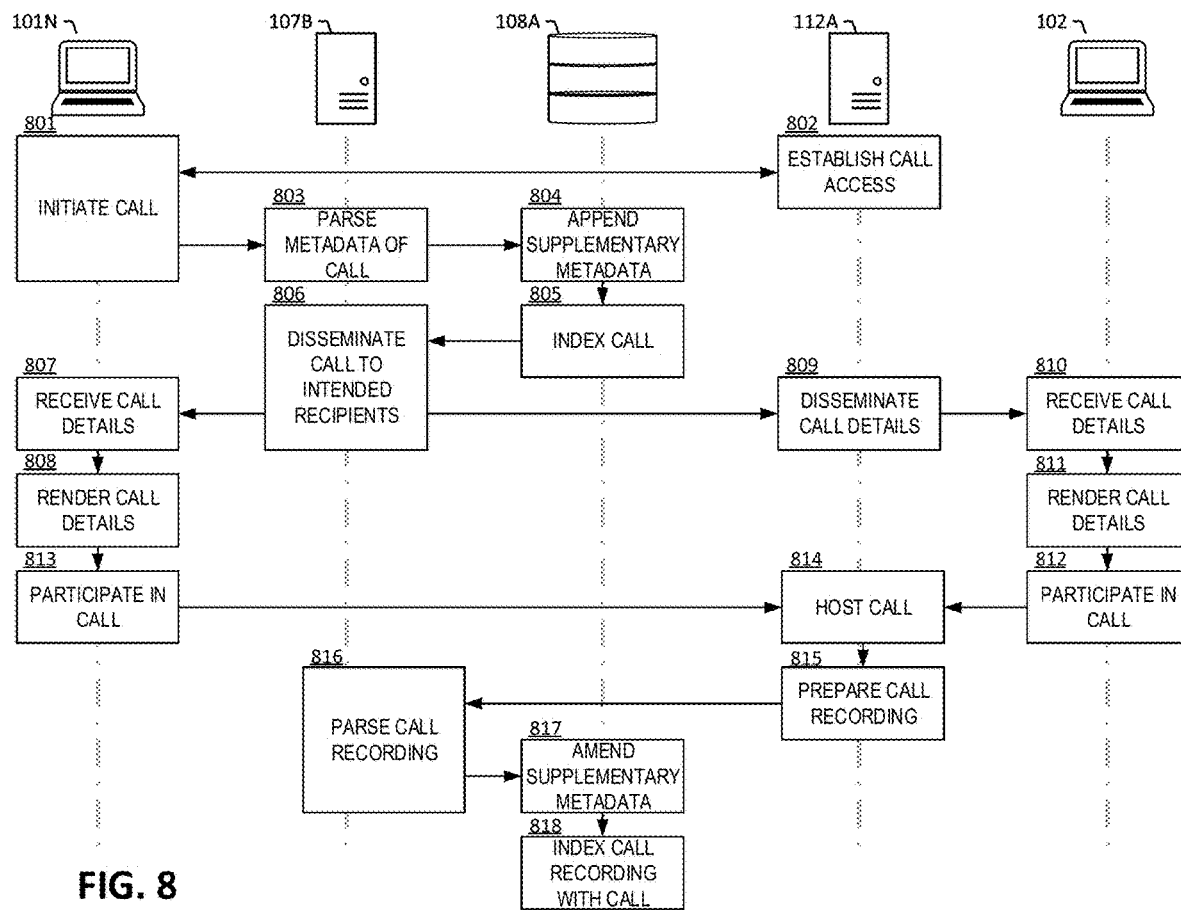
FIGS. 8-9 show example data flows attributable to a call work object according to various embodiments.

Events may constitute internal work objects or external work objects, and the group-based communication platform 105 may utilize different intake procedures for each work object type. FIG. 8 illustrates an example process for intake processing of internal work object events into the group-based communication platform 105, particularly for calls originating at client devices 101A-101N. As shown therein, it should be understood that in certain instances—particularly when utilizing a validated external resource 112A-112N for call (audio or video) hosting, set-up of relevant calls may encompass various data transmissions between client devices 101A-101N, aspects of the group-based communication platform 105, and external computing platforms 112A-112N.

As shown in FIG. 8, the client device 101 initiates a call as shown at Block 801. Initiating a call may entail generating a calendar object within a native calendaring application on the client device 101 for initiating a meeting, and/or establishing that the generated meeting is to be conducted via a particular call provider (e.g., Zoom®, WebEx®, and/or the like). The user of the client device 101 may enter such details as a call title, one or more requested participants (and may designate such participants as "required," "optional," or some other designation). The user may additionally select a call date and time (both start day/time and end day/time).

As shown at Block 802, the client device 101 may communicate with a validated external resource 112 corresponding to the call provider to establish details necessary for enabling the call to proceed at the scheduled day time. For example, the validated external resource 112 may establish a secure real-time communication protocol to be utilized for the call, to prevent unauthorized access to the call. Details of the call, as established at the validated external resource 112, may be communicated to the client device 101 and are reflected within the context data provided to the group-based communication platform 105 from the client device 101 and/or may be generated directly within the group-based communication platform 105.

Once the user is ready to disseminate the call, the client device 101 transmits call details (including details as provided by the user and/or details generated and provided by the external computing entity 112) to the group-based communication platform 105, to be received by the operation servers 107A-107N. Alternatively, the validated external resource 112 may directly provide call details to the group-based communication platform 105, and the group-based communication platform 105 may match up call details received from the client device 101 and the validated external resource 112.

The group-based communication platform 105 (e.g., via the operation servers 107A-107N) identifies what type of work object is reflected by the event. The group-based communication platform 105 need not conduct such an identification step if the type of work object is already known (e.g., where the internal event work object is generated locally at the group-based communication platform 105). The identity of the work object type may be utilized to determine an appropriate methodology for parsing the work object and/or for identifying data to be retrieved from the work object during parsing. Thereafter, the group-based communication platform 105 parses context data of the event work object corresponding to the call, as indicated at Block 803, and provides the event to the database storage areas 108A-108N. While parsing the event, the operation servers 107A-107N identifies content of the event (e.g., based on data provided by the user at the client device 101), and may identify one or more other characteristics of the event that may be integrated with the messaging configuration of the group-based communication platform 105. Such identified characteristics may be utilized when disseminating the event to client devices 101A-101N as a part of the group-based communication platform (e.g., as summary cache objects discussed herein).

When parsing the event, the group-based communication platform 105 retrieves the substantive content of the event (if applicable), which may be utilized for searching and/or classification of the event. Moreover, the group-based communication platform 105 parses various portions of the metadata included with the event to identify relevant characteristics of the event usable for indexing the event, for classifying the event, and/or otherwise for providing the event to various intended recipients. For example, characteristics unique to events may inform how to integrate newly received events with an existing user calendar, including whether any alerts should be provided to one or more users based on existing calendar conflicts with the newly received event.

In certain embodiments, the group-based communication platform 105 identifies a sender/generator of an event by parsing the metadata received with the event. The sender may be identified by a sending email address, a sending user identifier (particularly applicable for internal work objects). The group-based communication platform may then determine whether the sender matches any profiles or other user-identifying data stored at the group-based communication platform 105, if not already identified based on the user identifier (e.g., stored within databases 108A-108N). Determining whether the sender matches existing user profiles may be utilized to identify a sender's expertise, which may be relevant for establishing appropriate topics for the event.

Moreover, the group-based communication platform 105 identifies intended recipients/participants of the event. The intended recipients may be identified as members of a particular communication channel identified as an intended recipient and/or as other recipients (e.g., identified by validated external resource identifiers) identified as intended recipients of the event. In certain embodiments, the group-based communication platform 105 is configured to cross-reference specifically enumerated intended recipients (e.g., identified by validated external resource identifiers) against intended recipients within a particular communication channel to identify duplicate recipients. As noted above in identifying whether a sending user matches any user profiles within the group-based communication platform 105, the group-based communication platform 105 determines whether any intended recipient validated external resource identifiers match user profiles known to the group-based communication platform 105. If a particular intended recipient is identified as matching a known user profile, the group-based communication platform 105 determines whether the known user profile is reflected as a member of a communication channel also indicated as an intended recipient of the event. If a match is identified, the group-based communication platform 105 determines the recipient is a duplicate. The group-based communication platform 105 may then take one or more remedial measures upon identifying a duplicate recipient, such as refraining from delivering the event to the duplicate user identifier, if it is determined that the event would show up in a user's calendar based on receipt of the event based on the validated external resource identifier. In other embodiments, the group-based communication platform 105 does not take any remedial actions.

In certain embodiments, the group-based communication platform 105 determines how distribution to validated external resources should be handled. In certain embodiments, the group-based communication platform 105 parses the event to identify various characteristics of the event that may be utilized to retrieve appropriate distribution rules stored within the databases 108A-108N for distribution of the particular event. In certain embodiments, the group-based communication platform 105 may utilize discrete distribution rules for events based on event type, and accordingly the group-based communication platform 105 is configured to identify the event type, and utilize the identified event type to retrieve applicable rules for disseminating the event to various intended recipients. As just one example, events generated to rely on certain real-time communication protocols (e.g., utilizing calls with a particular call provider) may be disseminated automatically through the real-time communication protocol, and accordingly separate distribution processes are not needed by the group-based communication platform 105; however, events generated utilizing other real-time communication protocols may not have automatic dissemination features through the real-time communication protocol, and accordingly the group-based communication platform 105 may separately disseminate events to intended participants.

In certain embodiments, due to the time-specific nature of certain events, the group-based communication platform 105 may establish various time-based delivery, reminder, alert, or other configurations for providing information to users identified as intended recipients of the events. For example, the group-based communication platform 105 may be configured to generate delayed delivery messages for dissemination to one or more of the intended recipients at established times (e.g., a specified time prior to the start of a scheduled event). Characteristics of these delayed delivery messages (or other alerts, reminders, and/or the like) may be generated in accordance with various characteristics of the event, such as a defined start time, start date, and/or the like for the event.

The group-based communication platform 105 may be further configured to add various events to calendars of intended recipients (at least for those recipients for which calendars are accessible to the group-based communication platform 105). Such processes may comprise inserting data reflective of the event within calendar data existing for a particular user. Moreover, the group-based communication platform 105 may be configured to compare timing aspects of the event against timing data of existing events within a user's calendar to determine whether any timing conflicts exist. In various embodiments, based on identified timing conflicts (e.g., the newly added event at least partially overlaps in time with an existing event on a user's calendar), the group-based communication platform 105 may be configured to generate messages (or other work objects) to the receiving user's client device 101A-101N and/or the sending user's client device 101A-101N informing the user(s) of the potential timing conflict. In certain embodiments, the group-based communication platform 105 may further review calendars and/or user statuses (which may be determined based at least in part on one or more validated external resources 112A-112N determining whether a particular user is currently using one or more features of the one or more validated external resources 112A-112N) of intended recipients to identify alternative times available (with no conflicts or minimal conflicts) for the event.

The group-based communication platform 105 may further determine whether there are any security and/or sharing concerns applicable to the event while parsing the same. The group-based communication platform 105 determines what client devices 101A-101N, users, groups, and/or the like may access the event, which may dictate how the event is utilized and/or indexed (e.g., the security and/or sharing determination may establish which work object corpus the event is to be added to).

Moreover, the group-based communication platform may determine whether any other characteristics exist that are unique to the event. For example, particular event-based validated external resources may provide specific metadata content in events that may be utilized by the group-based communication platform 105 in establishing supplemental metadata for the event (as discussed herein). For example, specific formatting data may be utilized for identifying appropriate formatting corollaries for use with the cache objects.

Moreover, while parsing the event, the operation servers 107A-107N may generate a lightweight summary cache object representative of the event for rendering within visual containers by client devices 101A-101N that ultimately receive the event as a work-object via the group-based communication platform 105. The summary cache object may be constructed from portions of the context data of the event, which may be inserted into a summary cache object template. Other portions of the template may be selected and/or populated with data generated by the group-based communication platform 105. The summary cache object may comprise at least a portion of the content of the event (e.g., the title, time, location/call platform, and/or the like). Examples of such event summary cache objects as may be displayed via a client device 101A-101N are shown at FIGS. 10A-10G. As shown therein, in certain embodiments the summary cache objects may include an interactive element to interact with the underlying calendar event in real-time. For example, the interactive element may be utilized to open lines of communication associated with the event, to provide data back to a validated external resource, and/or the like. For example, the interactive element may be utilized to join the scheduled call. In certain embodiments, the interactive element for joining the scheduled call may only be available during the scheduled time for the call (and/or shortly before and/or shortly after the scheduled call time). Interactive elements for accepting or ignoring a call may only be available while another user is calling the user, and interactive elements for ending a call may only be available while a call is ongoing. During other time periods, the summary cache object may only include information about the call.

Moreover, the operation servers 107A-107N may generate an expanded cache object having additional detail of the event (e.g., the entirety of the event content, a listing of participants (together with RSVP details for each participant), attachments, and/or the like) to be associated with the event and the summary cache object. In certain embodiments, the expanded cache object may comprise an interactive portion having functionality similar to that described in relation to the summary cache object. In various embodiments, interactive elements for joining a call may only become available at or shortly before the scheduled start time of the call.

The summary cache object may then be configured to be interactive for the receiving client devices 101A-101N, such that clicking/selecting the summary cache object may cause the client device 101A-101N to request the expanded cache object from the group-based communication platform 105 for the event. Likewise, the expanded cache object may be similarly interactive, and clicking/selecting the expanded cache object may cause the client device 101A-101N to request the full event details from the group-based communication platform 105 (e.g., in a format native to the calendaring application initiating the event).

The databases may generate and append supplemental metadata to the event after review of the same, as indicated at Block 804. Such supplemental metadata may comprise metadata indicative of a topic assigned to the event. Moreover, such supplemental metadata may be generated in accordance with one or more artificial intelligence and/or machine-learning algorithms configured to review the context data, such as the substantive contents of the event and/or the metadata associated with the event to determine an appropriate topic to be assigned to the event. Certain events from particular validated external resources may already include a corollary to topic data (e.g., event labels), which may be utilized as a factor in assigning a topic to the event work object. In certain embodiments, the topics available for assignment may be established manually by user input, and the database storage areas 108A-108N may be configured to select a most-appropriate topic (or multiple topics) from the established listing. In other embodiments, the artificial intelligence and/or machine learning algorithms may be configured for automatically generating a topic in instances in which previously generated topics are deemed too tenuous for description of the event.

As a specific example, the database storage areas 108A-108N may utilize context data of the event, such as the event content (which may be reviewed utilizing a Tf-idf algorithm in light of a larger dataset of work objects to identify relevant topics), event metadata (e.g., reviewing topics assigned to threads in which the event is disseminated; identifying a sending user and determining the sending user's assigned subject matter expertise to weigh the potential topics that may be assigned to the event), and/or the like to determine an appropriate topic.

Ultimately, the database storage areas 108A-108N index the event, as shown at Block 805, which may make the event available for later search/retrieval (e.g., for queries satisfying email access requirements, such as meeting authorization prerequisites to view the message).

In certain embodiments, the operation servers 107A-107N may disseminate the event (e.g., as a summary cache object) to intended recipients, as indicated at Block 806. In various embodiments, the group-based communication platform may disseminate the summary cache object to client devices 101A-101N. Those client devices 101A-101N may receive the details of the event (e.g., the lightweight cache work object), as indicated at Block 807, and may render the event details (e.g., the summary cache object) for display, as indicated at Block 808. Rendering the event (e.g., the lightweight cache work object may comprise rendering the event to appear as a native work object of the group-based communication platform 105). Such renders may appear as objects disseminated to the user, which may provide certain data regarding the work object for the user of the client device 101A-101N.

Moreover, the operation servers 107A-107N disseminate the event (e.g., as a summary cache object, as the full event, and/or the like) to intended recipients accessing the communication exchange via validated external resources 112A-112N as shown at Blocks 809-811. As discussed herein, the group-based communication platform may identify specific rules for disseminating events to various validated external resources, and accordingly dissemination may be performed in accordance with rules retrieved while parsing the event.

Recipients reachable via one or more validated external resources 112A-112N may receive events disseminated from the group-based communication platform 105 by receipt at the applicable validated external resource 112A-112N (as indicated at Block 809), which may then disseminate the events to client devices 102 (e.g., with an appropriate style guide applicable to work objects common to the validated external resource 112A-112N). The client device 102 may then receive the event and render the event for display, as indicated at Blocks 810-811.

Because the validated external resources 112A-112N may utilize separate style guides for work object display, the group-based communication platform 105 may be configured to transmit the events to the validated external resources 112A-112N via one or more formatting agnostic data transmission protocols. For example, the group-based communication platform 105 may pass event data to validated external resources 112A-112N via one or more APIs, via one or more proxy endpoints providing event data in a format discernable to the validated external resource 112A-112N to automatically identify various components of the event data (e.g., XML formatting providing various labeled containers of data), and/or the like. The validated external resource 112A-112N may then apply self-imposed formatting guides to the events and/or may automatically omit various portions of the event data, as needed to comply with the self-imposed formatting.

As shown at Blocks 812-813, client devices 101A-101N, 102 participate in the call, hosted by the validated external resource 112 (or alternatively hosted by the group-based communication platform 105), as indicated at Block 814. As noted, the call may be a video call, an audio call, and/or the like, and may constitute real-time communication between participants of the call. The call may be hosted through a modal accessible within the group-based communication interface accessible via client devices 101A-101N, and/or the call may be accessible via other applications accessible via client devices 101A-101N, 102.

During and/or after the call, the validated external resource 112 may generate a recording of the call (e.g., a video recording, an audio recording, a transcript of the call, and/or the like), as indicated at Block 815. Although not shown, the recording may be disseminated to participants of the call (e.g., by transmitting the recording to client devices 101A-101N, 102 of participants of the call) based on dissemination rules. The recording may be passed to the group-based communication platform 105, which may parse the call recording, as indicated at Block 816. Recordings are treated as other call context data in accordance with certain embodiments, and may be parsed as discussed herein to identify aspects of the call usable for indexing the event. As shown at Blocks 817-818, the recording may be passed to the database storage areas 108A-108N, which may add and/or modify the supplemental metadata associated with the call (e.g., to reflect additional topics, to remove previous topics selected based on metadata associated with the call, and/or the like). The supplemental metadata associated with the call may thus be updated to reflect discussions actually occurring during the call.

Figure 9:
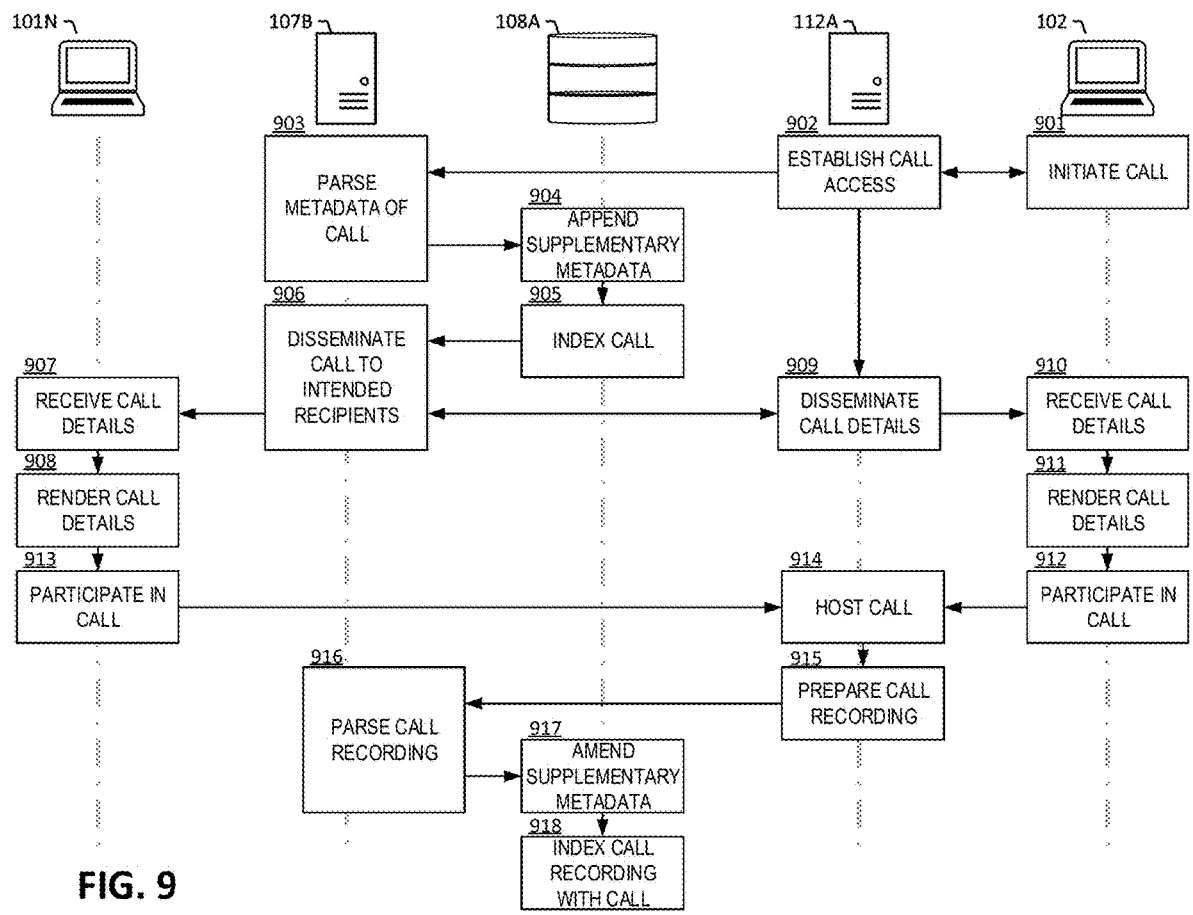
Figure 10A:
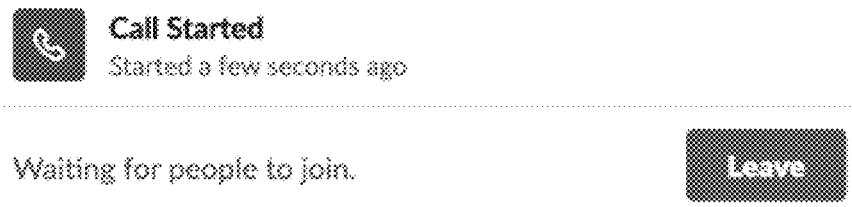
FIGS. 10A-10G show example cache objects attributable to calls in accordance with various embodiments.
Figure 10B:
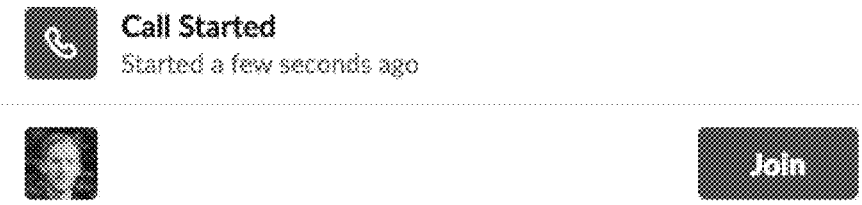
Figure 10C:
Figure 10D:
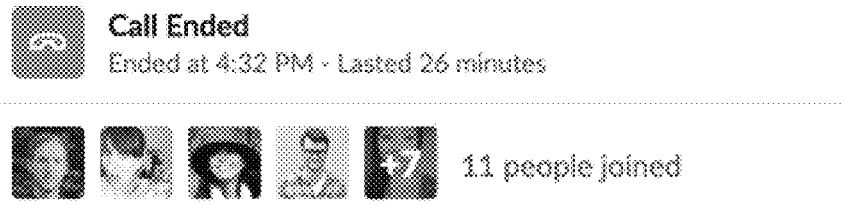
Figure 10E:
Figure 10E:
Figure 10F:
Figure 10F:
Figure 10G:
Figure 10G:
Figure 10G:
Figure 10G:
Figure 10G:

FIG. 9 illustrates an example process for intake processing of events into the group-based communication platform 105 for calls originating at a client device 102, which is in communication with the group-based communication platform 105 through a validated external resource 112, as discussed herein.

As shown in FIG. 9, the client device 102 initiates a call as shown at Block 901. Initiating a call may entail generating a calendar object within a native calendaring application on the client device 102 for initiating a meeting, and/or establishing that the generated meeting is to be conducted via a particular call provider (e.g., Zoom®, WebEx®, and/or the like). Such calls are considered external work objects. The user of the client device 102 may enter such details as a call title, one or more requested participants (and may designate such participants as "required," "optional," or some other designation). The user may additionally select a call date and time (both start day/time and end day/time).

As shown at Block 902, the client device 102 may communicate with a validated external resource 112 corresponding to the call provider to establish details necessary for enabling the call to proceed at the scheduled day time. For example, the validated external resource 112 may establish a secure real-time communication protocol to be utilized for the call, to prevent unauthorized access to the call. Details of the call, as established at the validated external resource 112, may be communicated to the client device 102 and/or the group-based communication platform 105.

Once the user is ready to disseminate the call, the client device 101 (and/or the validated external resource 105) transmits call details (including details as provided by the user and/or details generated and provided by the external computing entity 112) to the group-based communication platform 105, to be received by the operation servers 107A-107N. The validated external resource may disseminate the call data directly to all intended recipients, or the validated external resource may rely on the group-based communication platform 105 to disseminate the call to at least a portion of the intended recipients. For example, if a channel is indicated as an intended recipient of the event (e.g., based on a channel email utilized to provide the event to the group-based communication platform 105, or based on another communication pathway utilized to provide the event to the group-based communication platform 105), the call details are disseminated to one or more members of the identified channel by the group-based communication platform 105.

The group-based communication platform 105 (e.g., via the operation servers 107A-107N) parses the context data of the event work object corresponding to the call, as indicated at Block 903, and provides the event to the database storage areas 108A-108N. While parsing the event, the operation servers 107A-107N identifies content of the event (e.g., based on data provided by the user at the client device 101), and may identify one or more other characteristics of the event that may be integrated with the messaging configuration of the group-based communication platform 105. Such identified characteristics may be utilized when disseminating the event to client devices 101A-101N as a part of the group-based communication platform (e.g., as summary cache objects discussed herein).

When parsing the event, the group-based communication platform retrieves the substantive content of the event (if applicable), which may be utilized for searching and/or classification of the event. Moreover, the group-based communication platform 105 parses various portions of the metadata included with the event to identify relevant characteristics of the event usable for indexing the event, for classifying the event, and/or otherwise for providing the event to various intended recipients. For example, characteristics unique to events may inform how to integrate newly received events with an existing user calendar, including whether any alerts should be provided to one or more users based on existing calendar conflicts with the newly received event.

In certain embodiments, the group-based communication platform 105 identifies a sender/generator of an event by parsing the metadata received with the event. The sender may be identified by a sending email address, a sending user identifier (particularly applicable for internal work objects), and/or a validated external resource identifier. The group-based communication platform may then determine whether the sender matches any profiles or other user-identifying data stored at the group-based communication platform 105, if not already identified based on the user identifier (e.g., stored within databases 108A-108N). Determining whether the sender matches existing user profiles may be utilized to identify a sender's expertise, which may be relevant for establishing appropriate topics for the event.

Moreover, the group-based communication platform 105 identifies intended recipients/participants of the event. The intended recipients may be identified as members of a particular communication channel identified as an intended recipient and/or as other recipients (e.g., identified by validated external resource identifiers) identified as intended recipients of the event. In certain embodiments, the group-based communication platform 105 is configured to cross-reference specifically enumerated intended recipients (e.g., identified by validated external resource identifiers) against intended recipients within a particular communication channel to identify duplicate recipients. As noted above in identifying whether a sending user matches any user profiles within the group-based communication platform 105, the group-based communication platform 105 determines whether any intended recipient validated external resource identifiers match user profiles known to the group-based communication platform 105. If a particular intended recipient is identified as matching a known user profile, the group-based communication platform 105 determines whether the known user profile is reflected as a member of a communication channel also indicated as an intended recipient of the event. If a match is identified, the group-based communication platform 105 determines the recipient is a duplicate. The group-based communication platform 105 may then take one or more remedial measures upon identifying a duplicate recipient, such as refraining from delivering the event to the duplicate user identifier, if it is determined that the event would show up in a user's calendar based on receipt of the event based on the validated external resource identifier. In other embodiments, the group-based communication platform 105 does not take any remedial actions.

In certain embodiments, the group-based communication platform 105 determines how distribution to validated external resources should be handled. In certain embodiments, the group-based communication platform 105 parses the event to identify various characteristics of the event that may be utilized to retrieve appropriate distribution rules stored within the databases 108A-108N for distribution of the particular event. In certain embodiments, the group-based communication platform 105 may utilize discrete distribution rules for events based on event type, and accordingly the group-based communication platform 105 is configured to identify the event type, and utilize the identified event type to retrieve applicable rules for disseminating the event to various intended recipients. As just one example, events generated to rely on certain real-time communication protocols (e.g., utilizing calls with a particular call provider) may be disseminated automatically through the real-time communication protocol, and accordingly separate distribution processes are not needed by the group-based communication platform 105; however, events generated utilizing other real-time communication protocols may not have automatic dissemination features through the real-time communication protocol, and accordingly the group-based communication platform 105 may separately disseminate events to intended participants.

In certain embodiments, due to the time-specific nature of certain events, the group-based communication platform 105 may establish various time-based delivery, reminder, alert, or other configurations for providing information to users identified as intended recipients of the events. For example, the group-based communication platform 105 may be configured to generate delayed delivery messages for dissemination to one or more of the intended recipients at established times (e.g., a specified time prior to the start of a scheduled event). Characteristics of these delayed delivery messages (or other alerts, reminders, and/or the like) may be generated in accordance with various characteristics of the event, such as a defined start time, start date, and/or the like for the event.

The group-based communication platform 105 may be further configured to add various events to calendars of intended recipients (at least for those recipients for which calendars are accessible to the group-based communication platform 105). Such processes may comprise inserting data reflective of the event within calendar data existing for a particular user. Moreover, the group-based communication platform 105 may be configured to compare timing aspects of the event against timing data of existing events within a user's calendar to determine whether any timing conflicts exist. In various embodiments, based on identified timing conflicts (e.g., the newly added event at least partially overlaps in time with an existing event on a user's calendar), the group-based communication platform 105 may be configured to generate messages (or other work objects) to the receiving user's client device 101A-101N and/or the sending user's client device 101A-101N informing the user(s) of the potential timing conflict. In certain embodiments, the group-based communication platform 105 may further review calendars of intended recipients to identify alternative times available (with no conflicts or minimal conflicts) for the event.

The group-based communication platform 105 may further determine whether there are any security and/or sharing concerns applicable to the event while parsing the same. The group-based communication platform 105 determines what client devices 101A-101N, users, groups, and/or the like may access the event, which may dictate how the event is utilized and/or indexed (e.g., the security and/or sharing determination may establish which work object corpus the event is to be added to).

Moreover, the group-based communication platform may determine whether any other characteristics exist that are unique to the event. For example, particular event-based validated external resources may provide specific metadata content in events that may be utilized by the group-based communication platform 105 in establishing supplemental metadata for the event (as discussed herein). For example, specific formatting data may be utilized for identifying appropriate formatting corollaries for use with the cache objects.

Moreover, while parsing the event, the operation servers 107A-107N may generate a lightweight summary cache object representative of the event for rendering within visual containers by client devices 101A-101N that ultimately receive the event as a work-object via the group-based communication platform 105. The summary cache object may be constructed from portions of the context data of the event, which may be inserted into a summary cache object template. Other portions of the template may be selected and/or populated with data generated by the group-based communication platform 105. The summary cache object may comprise at least a portion of the content of the event (e.g., the title, time, location/call platform, and/or the like). In certain embodiments, the summary cache object may be configured to remind a user to join the scheduled event (e.g., via the validated external resource), as a passive reminder, or the summary cache object may be an active reminder configured to facilitate the user joining the scheduled event, for example, with interactive portions to enable the user to directly join the event. In certain embodiments the summary cache objects may include an interactive element to interact with the underlying calendar event in real-time. For example, the interactive element may be utilized to open lines of communication associated with the event, to provide data back to a validated external resource, and/or the like. For example, the interactive element may be utilized to join the scheduled call. In certain embodiments, the interactive element for joining the scheduled call may only be available during the scheduled time for the call (and/or shortly before and/or shortly after the scheduled call time). Interactive elements for accepting or ignoring a call may only be available while another user is calling the user, and interactive elements for ending a call may only be available while a call is ongoing. During other time periods, the summary cache object may only include information about the call.

Moreover, the operation servers 107A-107N may generate an expanded cache object having additional detail of the event (e.g., the entirety of the event content, a listing of participants (together with RSVP details for each participant), attachments, and/or the like) to be associated with the event and the summary cache object. In certain embodiments, the expanded cache object may comprise an interactive portion with functionality similar to that described in relation to the summary object. In various embodiments, interactive elements for joining a call may only become available at or shortly before the scheduled start time of the call.

The summary cache object may then be configured to be interactive for the receiving client devices 101A-101N, such that clicking/selecting the summary cache object may cause the client device 101A-101N to request the expanded cache object from the group-based communication platform 105 for the event. Likewise, the expanded cache object may be similarly interactive, and clicking/selecting the expanded cache object may cause the client device 101A-101N to request the full event details from the group-based communication platform 105 (e.g., in a format native to the calendaring application initiating the event).

The databases may generate and append supplemental metadata to the event after review of the same, as indicated at Block 904. Such supplemental metadata may comprise metadata indicative of a topic assigned to the event. Moreover, such supplemental metadata may be generated in accordance with one or more artificial intelligence and/or machine-learning algorithms configured to review the context data, such as substantive contents of the event and/or the metadata associated with the event to determine an appropriate topic to be assigned to the event. Certain events from particular validated external resources may already include a corollary to topic data (e.g., event labels), which may be utilized as a factor in assigning a topic to the event work object. In certain embodiments, the topics available for assignment may be established manually by user input, and the database storage areas 108A-108N may be configured to select a most-appropriate topic (or multiple topics) from the established listing. In other embodiments, the artificial intelligence and/or machine learning algorithms may be configured for automatically generating a topic in instances in which previously generated topics are deemed too tenuous for description of the event.

As a specific example, the database storage areas 108A-108N may utilize context of the event, such as the event content (which may be reviewed utilizing a Tf-idf algorithm in light of a larger dataset of work objects to identify relevant topics), event metadata (e.g., reviewing topics assigned to threads in which the event is disseminated; identifying a sending user and determining the sending user's assigned subject matter expertise to weigh the potential topics that may be assigned to the event), and/or the like to determine an appropriate topic.

Ultimately, the database storage areas 108A-108N indexes the event, as shown at Block 905, which may make the event available for later search/retrieval (e.g., for queries satisfying email access requirements, such as meeting authorization prerequisites to view the message).

In certain embodiments, the operation servers 107A-107N may disseminate the event (e.g., as a summary cache object) to intended recipients, as indicated at Block 906. In various embodiments, the group-based communication platform may disseminate the summary cache object to client devices 101A-101N. Those client devices 101A-101N may receive the details of the event (e.g., the lightweight summary cache work object), as indicated at Block 907, and may render the event details (e.g., the summary cache object) for display, as indicated at Block 908. Rendering the event (e.g., the lightweight summary cache work object) may comprise rendering the event to appear as a native work object of the group-based communication platform 105. Such renders may appear as objects disseminated to the user, which may provide certain data regarding the work object for the user of the client device 101A-101N.

Moreover, the operation servers 107A-107N disseminate the event (e.g., as a summary cache object, as the full event, and/or the like) to intended recipients accessing the communication exchange via validated external resources 112A-112N as shown at Blocks 909-911. As discussed herein, the group-based communication platform may identify specific rules for disseminating events to various validated external resources, and accordingly dissemination may be performed in accordance with rules retrieved while parsing the event.

Recipients reachable via one or more validated external resources 112A-112N may receive events disseminated from the group-based communication platform 105 by receipt at the applicable validated external resource 112A-112N (as indicated at Block 909), which may then disseminate the events to client devices 102 (e.g., with an appropriate style guide applicable to work objects common to the validated external resource 112A-112N). The client device 102 may then receive the event and render the event for display, as indicated at Blocks 910-911. However, because the event is generated at the validated external resource 112A-112N, the client device 102 may receive the event directly from the generating validated external resource 112A-112N.

Because the validated external resources 112A-112N may utilize separate style guides for work object display, the group-based communication platform 105 may be configured to transmit the events to the validated external resources 112A-112N via one or more formatting agnostic data transmission protocols. For example, the group-based communication platform 105 may pass event data to validated external resources 112A-112N via one or more APIs, via one or more proxy endpoints providing event data in a format discernable to the validated external resource 112A-112N to automatically identify various components of the event data (e.g., XML formatting providing various labeled containers of data), and/or the like. The validated external resource 112A-112N may then apply self-imposed formatting guides to the events and/or may automatically omit various portions of the event data, as needed to comply with the self-imposed formatting.

As shown at Blocks 912-913, client devices 101A-101N, 102 participate in the call, hosted by the validated external resource 112 (or alternatively hosted by the group-based communication platform 105), as indicated at Block 914. As noted, the call may be a video call, an audio call, and/or the like, and may constitute real-time communication between participants of the call. The call may be accessible via a modal (or other container) displayable within the group-based communication interface, as discussed herein.

During and/or after the call, the validated external resource 112 may generate a recording of the call (e.g., a video recording, an audio recording, a transcript of the call, and/or the like), as indicated at Block 915. Although not shown, the recording may be disseminated to participants of the call (e.g., by transmitting the recording to client devices 101A-101N, 102 of participants of the call) based on determined dissemination rules. The recording may be passed to the group-based communication platform 105, which may parse the call recording, as indicated at Block 916. The call recording may be treated as additional context data, subject to parsing as discussed above. As shown at Blocks 917-918, the recording may be passed to the database storage areas 108A-108N, which may add and/or modify the supplemental metadata associated with the call (e.g., to reflect additional topics, to remove previous topics selected based on metadata associated with the call, and/or the like). The supplemental metadata associated with the call may thus be updated to reflect discussions actually occurring during the call.

Moreover, although not explicitly illustrated in FIGS. 7-8, it should be understood that calls (including video calls and/or audio calls) need not be scheduled prior to participation in the call. In such embodiments, a first user (e.g., a user of a client device 101) may call a second user (e.g., a user of a client device 102) via a particular validated external resource 112A. In instances in which the validated external resource has real-time communication established with the group-based communication platform 105, cache objects relating to the calls may be shared in real-time and provided to one or more client devices 101A-101N, 102 to indicate that a call is requested (e.g., "User X is calling you"), that a call is in progress (e.g., "Call in Progress with User X, User Y, and three more"), and/or that a call has ended. Information regarding the call may be passed between the one or more client devices 101A-101N, 102, the group-based communication platform 105 and/or one or more validated external resources 112A-112N, as applicable. Information regarding the call may be provided to users within visual containers providing summary data regarding the call, and which may include one or more interactive elements to initiate a call, to ignore an incoming call, to answer an incoming call, to end a current call, and/or the like.

It should be understood that in embodiments in which a call is not pre-scheduled, the group based communication platform 105 may be specifically configured to parse call recordings (e.g., transcripts, audio recordings, video recordings, and/or the like) together with other context data to make a first determination of relevant supplementary metadata to be appended to the call data. For example, the context data may be parsed to determine how the call is made (e.g., via what validated external resource is used for the call, if any), when the call was made (e.g., start time and date, and end time and date), whether metadata associated with the call indicates that the call was unscheduled, who was invited to the call (e.g., who was the call placed to), who placed the call, and/or the like. While parsing the unscheduled call, the group-based communication platform 105 may identify a sender/generator of an event by parsing the metadata received with the event. The sender may be identified by a sending email address, a sending user identifier (particularly applicable for internal work objects), and/or a validated external resource identifier. The group-based communication platform may then determine whether the sender matches any profiles or other user-identifying data stored at the group-based communication platform 105, if not already identified based on the user identifier (e.g., stored within databases 108A-108N). Determining whether the sender matches existing user profiles may be utilized to identify a sender's expertise, which may be relevant for establishing appropriate topics for the event.

Moreover, the group-based communication platform 105 may add the event to one or more calendars associated with participants of the call (e.g., the sending/generating user and/or the receiving users), as historical events that may be searched by those users. Such processes may comprise inserting data reflective of the event within calendar data existing for a particular user.

The group-based communication platform 105 may further determine whether there are any security and/or sharing concerns applicable to the event while parsing the same. The group-based communication platform 105 determines what client devices 101A-101N, users, groups, and/or the like may access the event, which may dictate how the event is utilized and/or indexed (e.g., the security and/or sharing determination may establish which work object corpus the event is to be added to).

Moreover, the group-based communication platform may determine whether any other characteristics exist that are unique to the event. For example, particular event-based validated external resources may provide specific metadata content in events that may be utilized by the group-based communication platform 105 in establishing supplemental metadata for the event (as discussed herein). For example, specific formatting data may be utilized for identifying appropriate formatting corollaries for use with the cache objects. The call may then be indexed based at least in part on the determined supplementary data, as discussed herein.

Figure 11:
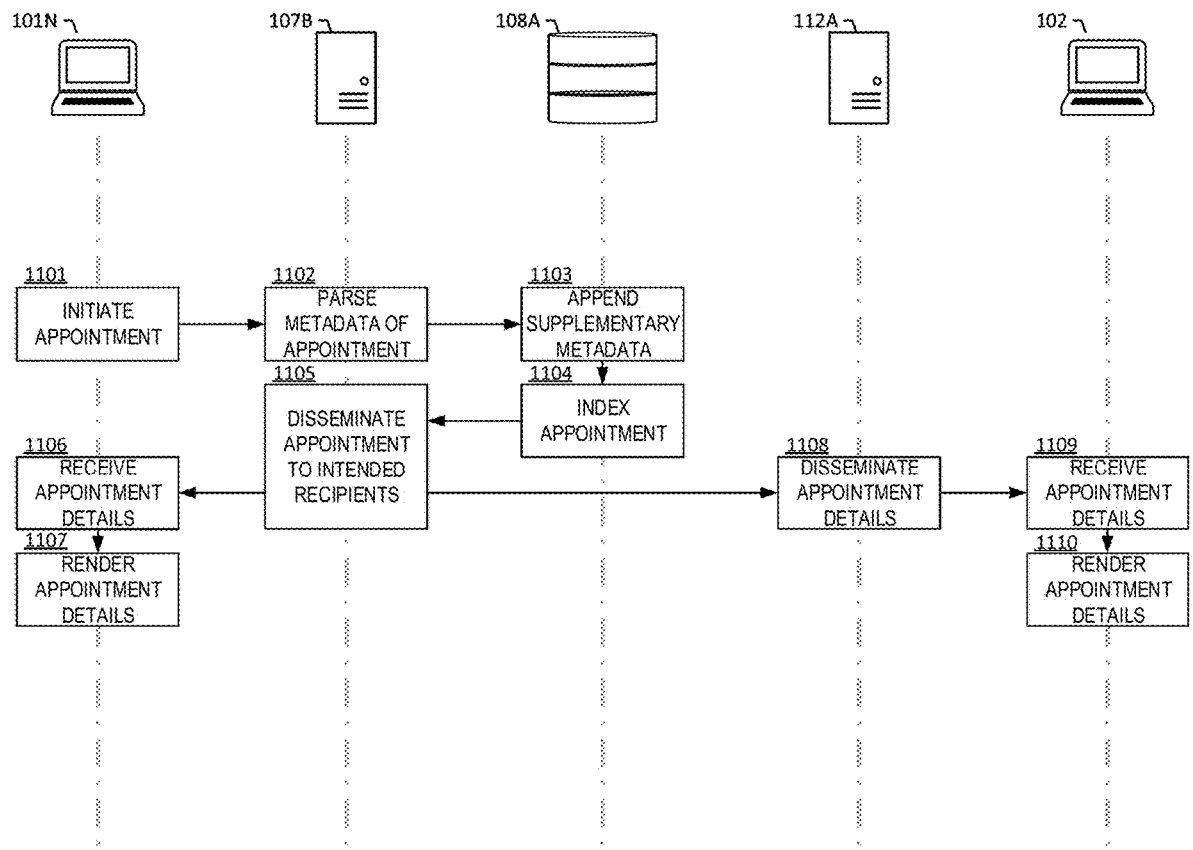
FIG. 11 shows an example data flow attributable to an appointment according to one embodiment.

FIG. 11 illustrates an example process for intaking processing of appointment related events (e.g., those events not encompassing a call performed through the group-based communication platform 105 or a validated external resource 112). These appointment events may be internal work objects or external work objects. These appointment events may constitute teleconferences (taking place over phone lines, for example, without integration with a cloud-based call service), in-person meetings, and/or individual appointments (private appointments of a particular individual). In accordance with certain embodiments, appoint related events are generated at one or more external (or internal) calendar applications, such as iCal, Google Calendar, Microsoft Outlook calendar, and/or the like. Such calendar applications include various features for enabling users to enter information regarding a scheduled calendar event, such as the title of the event, time and date of the event (both beginning and ending), location of the event, invited participants of the event, the event creator, and/or the like.

As shown in FIG. 11, a client device 101 initiates an appointment as shown at Block 1101 (it should be understood that similar processes may be performed via client device 102). Initiating an appointment may entail generating a calendar object within a native calendaring application on the client device 101 for initiating a meeting, and/or other appointment, generating an object having particular timing constraints (e.g., a workflow object, a task object, and/or the like). The user of the client device 101 may enter such details as an appointment title, one or more requested participants (and may designate such participants as "required," "optional," or some other designation). The user may additionally select an appointment date and time (both start day/time and end day/time).

Once the user is ready to disseminate the appointment (or to save the appointment with the group-based communication platform 105, even if no other participants are to be invited to the appointment), the client device 101 transmits appointment details to the group-based communication platform 105, to be received by the operation servers 107A-107N. Alternatively, a validated external resource 112 may provide appointment details to the group-based communication platform 105 if the event was generated at client device 102. Details of the event may be reflected within context data provided to the group-based communication platform 105 or may be generated at the group-based communication platform 105. For non-calendar objects with timing constraints (e.g., work flow objects specifically usable within a defined validated external resource), context data provided may be utilized to generate a calendar work object within the group-based communication platform 105.

The group-based communication platform 105 (e.g., via the operation servers 107A-107N) identifies what type of work object is reflected by the event. The group-based communication platform 105 need not conduct such an identification step if the type of work object is already known (e.g., where the internal event work object is generated locally at the group-based communication platform 105). The identity of the work object type may be utilized to determine an appropriate methodology for parsing the work object and/or for identifying data to be retrieved from the work object during parsing. Thereafter, the group-based communication platform 105 parses context data of the event work object corresponding to the appointment, as indicated at Block 1102, and provides the event to the database storage areas 108A-108N. While parsing the event, the operation servers 107A-107N identifies content of the event (e.g., based on data provided by the user at the client device 101), and may identify one or more other characteristics of the event that may be integrated with the messaging configuration of the group-based communication platform 105. Such identified characteristics may be utilized when disseminating the event to client devices 101A-101N as a part of the group-based communication platform (e.g., as summary cache objects discussed herein).

When parsing the event, the group-based communication platform 105 retrieves the substantive content of the event (if applicable), which may be utilized for searching and/or classification of the event. Moreover, the group-based communication platform 105 parses various portions of the metadata included with the event to identify relevant characteristics of the event usable for indexing the event, for classifying the event, and/or otherwise for providing the event to various intended recipients. For example, characteristics unique to events may inform how to integrate newly received events with an existing user calendar, including whether any alerts should be provided to one or more users based on existing calendar conflicts with the newly received event.

In certain embodiments, the group-based communication platform 105 identifies a sender/generator of an event by parsing the metadata received with the event. The sender may be identified by a sending email address, a sending user identifier (particularly applicable for internal work objects). The group-based communication platform may then determine whether the sender matches any profiles or other user-identifying data stored at the group-based communication platform 105, if not already identified based on the user identifier (e.g., stored within databases 108A-108N). Determining whether the sender matches existing user profiles may be utilized to identify a sender's expertise, which may be relevant for establishing appropriate topics for the event.

If applicable, the group-based communication platform 105 identifies intended recipients/participants of the event. However, it should be understood that in certain embodiments, the appointment event object need not have any intended recipients, as the generating user identifier may be the only participant in the event (e.g., a private event). The intended recipients may be identified as members of a particular communication channel identified as an intended recipient and/or as other recipients (e.g., identified by validated external resource identifiers) identified as intended recipients of the event. In certain embodiments, the group-based communication platform 105 is configured to cross-reference specifically enumerated intended recipients (e.g., identified by validated external resource identifiers) against intended recipients within a particular communication channel to identify duplicate recipients. As noted above in identifying whether a sending user matches any user profiles within the group-based communication platform 105, the group-based communication platform 105 determines whether any intended recipient validated external resource identifiers match user profiles known to the group-based communication platform 105. If a particular intended recipient is identified as matching a known user profile, the group-based communication platform 105 determines whether the known user profile is reflected as a member of a communication channel also indicated as an intended recipient of the event. If a match is identified, the group-based communication platform 105 determines the recipient is a duplicate. The group-based communication platform 105 may then take one or more remedial measures upon identifying a duplicate recipient, such as refraining from delivering the event to the duplicate user identifier, if it is determined that the event would show up in a user's calendar based on receipt of the event based on the validated external resource identifier. In other embodiments, the group-based communication platform 105 does not take any remedial actions.

In certain embodiments, due to the time-specific nature of certain events, the group-based communication platform 105 may establish various time-based delivery, reminder, alert, or other configurations for providing information to users identified as intended recipients of the events. For example, the group-based communication platform 105 may be configured to generate delayed delivery messages for dissemination to one or more of the intended recipients at established times (e.g., a specified time prior to the start of a scheduled event). Characteristics of these delayed delivery messages (or other alerts, reminders, and/or the like) may be generated in accordance with various characteristics of the event, such as a defined start time, start date, and/or the like for the event.

The group-based communication platform 105 may be further configured to add various events to calendars of intended recipients (at least for those recipients for which calendars are accessible to the group-based communication platform 105). Such processes may comprise inserting data reflective of the event within calendar data existing for a particular user. Moreover, the group-based communication platform 105 may be configured to compare timing aspects of the event against timing data of existing events within a user's calendar to determine whether any timing conflicts exist. In various embodiments, based on identified timing conflicts (e.g., the newly added event at least partially overlaps in time with an existing event on a user's calendar), the group-based communication platform 105 may be configured to generate messages (or other work objects) to the receiving user's client device 101A-101N and/or the sending user's client device 101A-101N informing the user(s) of the potential timing conflict. In certain embodiments, the group-based communication platform 105 may further review calendars of intended recipients to identify alternative times available (with no conflicts or minimal conflicts) for the event.

The group-based communication platform 105 may further determine whether there are any security and/or sharing concerns applicable to the event while parsing the same. The group-based communication platform 105 determines what client devices 101A-101N, users, groups, and/or the like may access the event, which may dictate how the event is utilized and/or indexed (e.g., the security and/or sharing determination may establish which work object corpus the event is to be added to).

Moreover, the group-based communication platform may determine whether any other characteristics exist that are unique to the event. For example, particular event-based validated external resources may provide specific metadata content in events that may be utilized by the group-based communication platform 105 in establishing supplemental metadata for the event (as discussed herein). For example, specific formatting data may be utilized for identifying appropriate formatting corollaries for use with the cache objects.

Moreover, while parsing the event, the operation servers 107A-107N may generate a lightweight summary cache object representative of the event for rendering within visual containers by client devices 101A-101N that ultimately receive the event as a work-object via the group-based communication platform 105. The summary cache object may be constructed from portions of the context data of the event, which may be inserted into a summary cache object template. Other portions of the template may be selected and/or populated with data generated by the group-based communication platform 105. The summary cache object may comprise at least a portion of the content of the event (e.g., the title, time, location, and/or the like).

Moreover, the operation servers 107A-107N may generate an expanded cache object having additional detail of the event (e.g., the entirety of the event content, a listing of participants (together with RSVP details for each participant, if applicable), attachments, and/or the like) to be associated with the event and the summary cache object.

The summary cache object may then be configured to be interactive for the receiving client devices 101A-101N, such that clicking/selecting the summary cache object may cause the client device 101A-101N to request the expanded cache object from the group-based communication platform 105 for the event. Likewise, the expanded cache object may be similarly interactive, and clicking/selecting the expanded cache object may cause the client device 101A-101N to request the full event details from the group-based communication platform 105 (e.g., in a format native to the calendaring application initiating the event).

The databases may generate and append supplemental metadata to the event after review of the same, as indicated at Block 1103. Such supplemental metadata may comprise metadata indicative of a topic assigned to the event. Moreover, such supplemental metadata may be generated in accordance with one or more artificial intelligence and/or machine-learning algorithms configured to review the context data, such as substantive contents of the event and/or the metadata associated with the event to determine an appropriate topic to be assigned to the event. Certain events from particular validated external resources may already include a corollary to topic data (e.g., event labels), which may be utilized as a factor in assigning a topic to the event work object. In certain embodiments, the topics available for assignment may be established manually by user input, and the database storage areas 108A-108N may be configured to select a most-appropriate topic (or multiple topics) from the established listing. In other embodiments, the artificial intelligence and/or machine learning algorithms may be configured for automatically generating a topic in instances in which previously generated topics are deemed too tenuous for description of the event.

As a specific example, the database storage areas 108A-108N may utilize context data of the event, such as the event content (which may be reviewed utilizing a Tf-idf algorithm in light of a larger dataset of work objects to identify relevant topics), event metadata (e.g., reviewing topics assigned to threads in which the event is disseminated; identifying a sending user and determining the sending user's assigned subject matter expertise to weigh the potential topics that may be assigned to the event), and/or the like to determine an appropriate topic.

Ultimately, the database storage areas 108A-108N index the event, as shown at Block 1104, which may make the event available for later search/retrieval (e.g., for queries satisfying email access requirements, such as meeting authorization prerequisites to view the message).

In instances in which the event is a private appointment or is otherwise only applicable to the creating user, the process may end here. In certain embodiments, the operation servers 107A-107N may provide event details back to the originating client device 101 (e.g., as a summary cache object; as an expanded cache object; and/or the like) for display on the originating client device 101 only. However, in other embodiments, no further activity may occur.

However, for meetings and other multi-person appointments, the operation servers 107A-107N may disseminate the event (e.g., as a summary cache object) to intended recipients, as indicated at Block 1105. As discussed herein, the group-based communication platform may identify specific rules for disseminating events to various validated external resources, and accordingly dissemination may be performed in accordance with rules retrieved while parsing the event. In various embodiments, the group-based communication platform may disseminate the summary cache object to client devices 101A-101N. Those client devices 101A-101N may receive the details of the event (e.g., the lightweight cache work object), as indicated at Block 1106, and may render the event details (e.g., the summary cache object) for display, as indicated at Block 1107. Rendering the event (e.g., the lightweight cache work object may comprise rendering the event to appear as a native work object of the group-based communication platform 105). Such renders may appear as objects disseminated to the user, which may provide certain data regarding the work object for the user of the client device 101A-101N.

Figure 12:
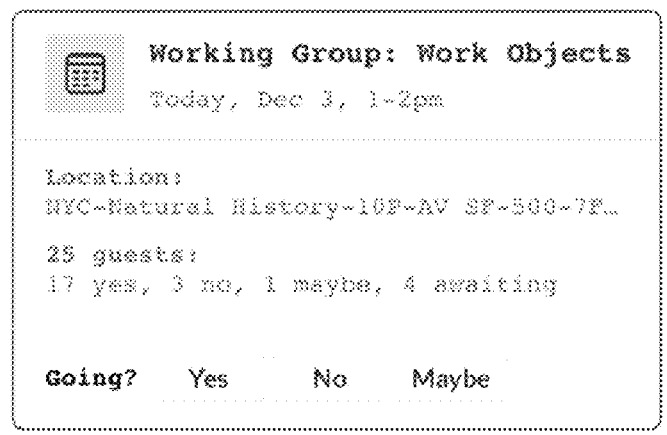
FIG. 12 shows an example cache object attributable to an appointment work object according to one embodiment.

As shown in FIG. 12, a summary cache object displayable for a particular appointment-style event may be configured for display with one or more interactive portions. As shown therein, an appointment summary cache object may comprise one or more optional interactive portions configured to receive user input indicative of whether a user intends on attending the event. As shown in FIG. 12, the summary cache object to be displayed to a user may comprise an "are you attending?" or a "going?" portion, accompanied with three buttons, "yes," "no," and "maybe." When a user selects one of the buttons associated with the summary cache object, data is transmitted back to the group-based communication platform 105, and the work object and associated metadata is updated to reflect the received attendance data from the user. For example, the total number of invitees who have selected a particular attendance status may be updated, and metadata associated with the particular user (stored in association with the event) may be updated to indicate that the particular user has selected an attendance option. For example, the metadata associated with the event work object may be updated to reflect the total number of invitees who have indicated they plan to attend, the total number of attendees who have indicated that they do not plan to attend, the total number of attendees who have indicated they may attend, and the total number of attendees who have not provided an attendance response. Moreover, metadata associated with each invitee may be updated to reflect how the invitee has responded to the event work object.

Moreover, the operation servers 107A-107N disseminate the event (e.g., as a summary cache object, as the full event, and/or the like) to intended recipients accessing the communication exchange via validated external resources 112A-112N as shown at Blocks 1108-1110.

Recipients reachable via one or more validated external resources 112A-112N may receive events disseminated from the group-based communication platform 105 by receipt at the applicable validated external resource 112A-112N (as indicated at Block 1108), which may then disseminate the events to client devices 102 (e.g., with an appropriate style guide applicable to work objects common to the validated external resource 112A-112N). The client device 102 may then receive the event and render the event for display, as indicated at Blocks 1109-1110.

Because the validated external resources 112A-112N may utilize separate style guides for work object display, the group-based communication platform 105 may be configured to transmit the events to the validated external resources 112A-112N via one or more formatting agnostic data transmission protocols. For example, the group-based communication platform 105 may pass event data to validated external resources 112A-112N via one or more APIs, via one or more proxy endpoints providing event data in a format discernable to the validated external resource 112A-

112N to automatically identify various components of the event data (e.g., XML formatting providing various labeled containers of data), and/or the like. The validated external resource 112A-112N may then apply self-imposed formatting guides to the events and/or may automatically omit various portions of the event data, as needed to comply with the self-imposed formatting.

In certain embodiments, context data of events may contain data indicative of the status of the underlying event (e.g., a reminder may be cleared upon completion of the underlying task/event). Accordingly, the group-based communication platform 105 may be configured to periodically update the status of various events, and may mark various events as complete, if applicable. By marking an event as complete, the underlying context data of the event may be updated within various calendars of the intended recipients/participants of the event.

Files

Files are a type of external work object for which other type-specific processes are not employed for distribution of those work objects. Typically, files are distributed together with another work object (e.g., as an attachment to a message, as an attachment to an email, as an attachment to an event, and/or the like), however it should be understood that files may be disseminated alone in certain instances. Files may be executable by any of a variety of applications operating on a client device 101A-101N, 102, as may be determined based at least in part on a file extension provided with each file. For example, files having an extension of ".doc" or ".docx" may be executable by word processing applications (e.g., Microsoft Word® or Google Docs); files having an extension of ".html" or ".php" may be executable by browsers of a client device; and/or the like. Other file extensions, such as the non-limiting examples of ".stp", ".zip", ".rar", ".exe", and/or the like may similarly be exchanged in accordance with various embodiments.

Files may comprise content data accessible via specially configured programs (also referred to herein as "apps" or "applications"), and metadata indicative of various characteristics of the file. Metadata such as the creating user identifier, one or more editing user identifiers, creation date/time, edit date(s)/time(s), file size, file name, encryption, and/or the like may be reflected within the metadata accompanying the file.

Files may be generated at client devices 101A-101N, 102. As mentioned, files may be disseminated as attachments to messages, emails, events, and/or the like. Accordingly, files may be disseminated in accordance with the various processes discussed herein in instances in which those files are attached to another work object.

Examples of files that may be disseminated as work objects comprise: audio, video, presentations, vectors, spreadsheets, disk images, zip files, executable files, media archives, CAD files, 3D graphics, database instances, binary files, markdowns, HTML, code, CSS, PHP, Word® documents, Excel® spreadsheets, PowerPoint® presentations, Illustrator® files, Photoshop® files, LightRoom® files, InDesign® files, Flash, iPhone apps, Android apps, Dropbox® files, Box® files, Origami® files, Sketch® files, and/or the like. However, it should be understood that this listing of files is merely a listing of examples, and other file types may be disseminated in accordance with various embodiments hereof.

File Intake and Dissemination

As discussed above, files may be disseminated independently, or files may be disseminated as attachments to other work objects disseminated in accordance with one or more methodologies, such as those discussed herein. Once the file and its related work object are received at the group-based communication platform 105, the file may be detached from the holding work object and indexed separately for later retrieval.

Figure 13:
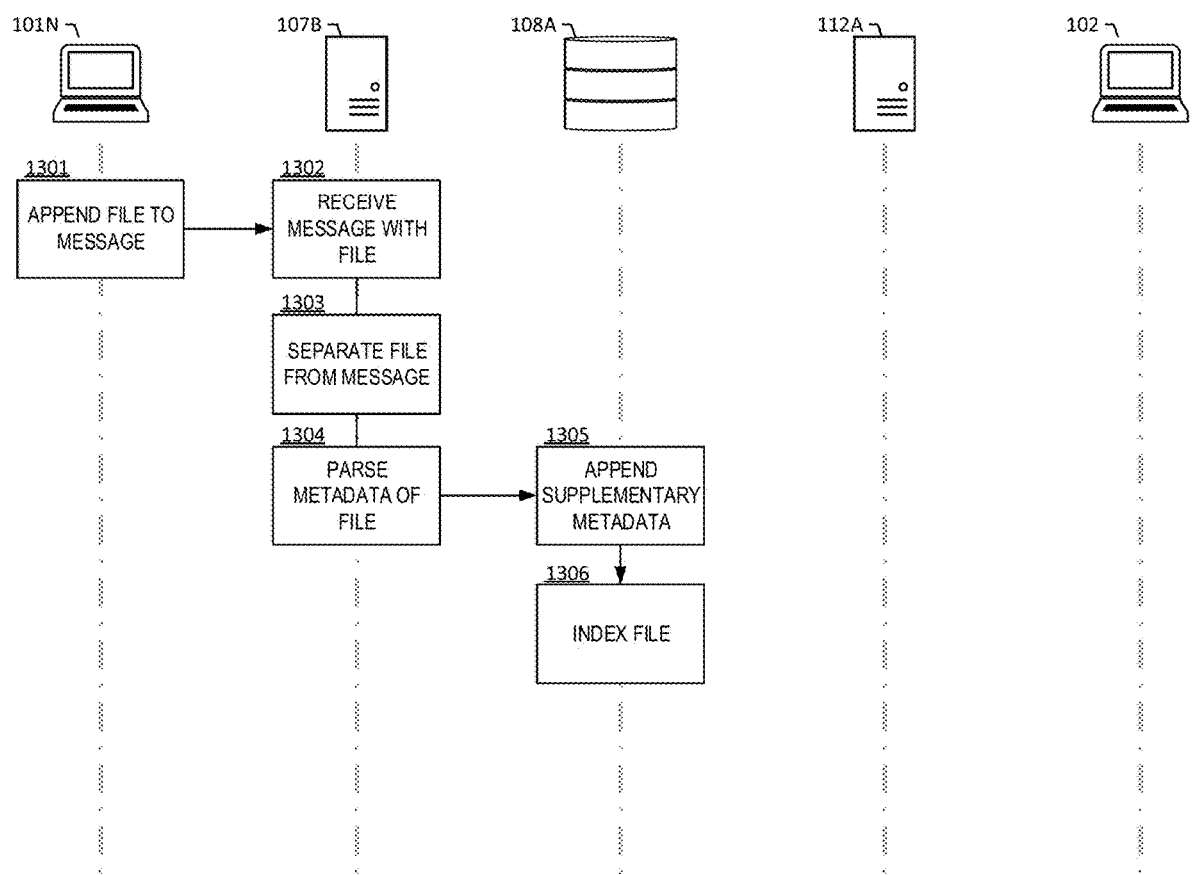
FIG. 13 shows an example data flow attributable to a file according to one embodiment.

FIG. 13 illustrates an example process for intake processing of files into the group-based communication platform 105. The process illustrated in FIG. 13 demonstrates how an example file may be transmitted with a message (one type of work object discussed herein) transmitted from a client device 101A-101N, however it should be understood that files may be disseminated with emails (or other work objects) originating from a client device 102 disseminated work objects through one or more validated external resources 112A-112N. Thus, the process shown in FIG. 13 merely shows steps for intaking files for indexing, and does not provide additional detail of dissemination processes, which are performed in a manner consistent with those discussed above for messages, emails, and/or events (the messages may be disseminated as attachments to other work objects).

As shown at Block 1301, a file may be generated and/or otherwise appended to a message for dissemination among a plurality of client devices 101A-101N, 102. As mentioned above, this illustration is just one example, as files may be disseminated as an attachment to an email, an event, or another work object, or files may be disseminated independently under certain circumstances.

As shown at Block 1302, the message (or other work object) with the attached file is received at the group based communication platform 105 (specifically, at the operation servers 107A-107N). The operation servers 107A-107N (or another component of the group based communication platform 105) separate the file from the message (or other work object), as indicated at Block 1303, such that the files may be parsed and indexed separately for later retrieval.

The operation servers 107A-107N identify what type of work object is reflected by the file. The identity of the work object type may be utilized to determine an appropriate methodology for parsing the work object and/or for identifying data to be retrieved from the work object during parsing. Thereafter, the group-based communication platform 105 parses context data of the file, as shown at Block 1304, and provide the file to the database storage areas 108A-108N. While parsing the file, the operation servers 107A-107N identify content of the file (if possible), and may identify one or more other characteristics of the file that may be extracted from the file. For example, the operation servers 107A-107N may identify one or more appropriate applications to execute the particular file and/or to provide preview functionality for the file, and may, in certain circumstances, utilize the application (if directly available to the group-based communication platform) to generate a visual preview of the file contents.

In certain embodiments, parsing the file may comprise extracting and reviewing context data, such as metadata provided together with the file. The metadata provided with the file may be indicative of what type of file is represented therein. In certain embodiments, certain file types may be characterized by the metadata provided in accordance with the particular file type. Document files may be characterized by metadata indicative of the file type (e.g., identified by a file extension), file title, content, creation date, and author. Spreadsheet files may be characterized by metadata indicative of the file type (e.g., identified by a file extension), file title, content, creation date, and author. Presentation files may be characterized by metadata indicative of the file type (e.g., identified by a file extension), file title, content, preview data, creation date, and author. Image files may be characterized by metadata indicative of the file type (e.g., identified by a file extension, such as .jpg, .png, .gif, and/or the like), file title, image, size (Ko, Mo), and preview data. Video files may be characterized by metadata indicative of the file type (e.g., identified by a file extension, such as .mpg, .mp4, and/or the like), file title, video, thumbnail data, length, and size (Ko, Mo). Audio files may be characterized by metadata indicative of the file type (e.g., identified by a file extension (e.g., .mp3, .wav, and/or the like), file title, audio, length, and size (Ko, Mo). Task files may be characterized by metadata indicative of the file type (e.g., identified by a file extension), file title, description, assignee, and due date. Other files may be characterized by metadata indicative of the file type (e.g., identified by a file extension), file name, size, and preview.

In certain embodiments, the group-based communication platform 105 retrieves the substantive content of the file (if applicable), which may be utilized for searching and/or classification of the file. Moreover, the group-based communication platform 105 parses various portions of the metadata included with the file to identify relevant characteristics of the file usable for indexing the event, for classifying the file, and/or otherwise for providing the file to various intended recipients. For example, characteristics unique to files, such as programs usable for executing those files, may inform whether a file should be presented to a searching user (e.g., a file may not be presented to a client device 101A-101N, 102 that does not include capabilities of utilizing the file.

In certain embodiments, the group-based communication platform 105 identifies a sender/generator of a file by parsing the metadata received with the file (and/or the metadata associated with a work object that contained the file, if applicable). The sender may be identified by a sending email address, a sending user identifier (particularly applicable for internal work objects), a validated external resource identifier, and/or the like. The group-based communication platform may then determine whether the sender matches any profiles or other user-identifying data stored at the group-based communication platform 105, if not already identified based on the user identifier (e.g., stored within databases 108A-108N). Determining whether the sender matches existing user profiles may be utilized to identify a sender's expertise, which may be relevant for establishing appropriate topics for the file.

The group-based communication platform 105 may further determine whether there are any security and/or sharing concerns applicable to the file while parsing the same. The group-based communication platform 105 determines what client devices 101A-101N, users, groups, and/or the like may access the file, which may dictate how the file is utilized and/or indexed (e.g., the security and/or sharing determination may establish which work object corpus the file is to be added to).

Moreover, the group-based communication platform may determine whether any other characteristics exist that are unique to the file. For example, particular event-based validated external resources may provide specific metadata content in files that may be utilized by the group-based communication platform 105 in establishing supplemental metadata for the file (as discussed herein). For example, specific formatting data may be utilized for identifying appropriate formatting corollaries for use with the cache objects.

Moreover, while parsing the file, the operation servers 107A-107N may generate a lightweight summary cache object representative of the file for rendering within visual containers by client devices 101A-101N that ultimately receive the file as a work object via the group-based communication platform 105. The summary cache object may comprise at least a portion of the file (e.g., the file name and/or the file extension), and may include an icon representative of the file extension. As determined based at least in part on the results of the parsing process, a plurality of icons may be identified as applicable to a particular file (e.g., each correlating to a particular application capable of utilizing the file). These multiple icons may be provided to the client device 101A-101N when providing the summary cache object to the client device 101A-101N, which may then select an appropriate icon based on a default program installed and utilized by the client device 101A-101N to utilize the file type. In other embodiments, the icon need not be selected at all at the group-based communication platform 105, and instead the summary cache object may be provided to the client device 101A-101N with an executable portion configured to query the client device 101A-101N to determine an icon applicable to the particular file type.

Moreover, the operation servers 107A-107N may generate an expanded cache object having additional detail of the file to be associated with the file and the summary cache object. In certain embodiments, the operation servers 107A-107N may be configured to generate the expanded cache object for only a subset of all files, for which the operation servers 107A-107N are configured to (or are configured to operate in association with an application that is configured to) execute and view the contents of the file itself. As just one example, the expanded cache object for a file may comprise a visual preview of the contents of the file (e.g., an image of a first page of a .pdf file; an image of a three-dimensional object reflected within a Computer-Aided Drafting (CAD) file, an image showing a select number of lines of code within a coding file, an image showing a webpage reflected within a .html file, and/or the like). The visual preview may be generated at the group-based communication platform 105 and/or together with a validated external resource 112A-112N capable of utilizing the file. The visual preview may, in certain embodiments, be generated by an emulation software program stored within the database 108A-108N (if available). In other embodiments, the visual preview may be generated locally at the client device 101A-101N by providing the entire work object to the client device 101A-101N, and enabling one or more programs executable on the client device 101A-101N to generate a preview of the work object to be displayed within the container of the group-based communication interface.

The summary cache object for the file may be configured to be interactive for the receiving client devices 101A-101N, such that clicking/selecting the summary cache object may cause the client device 101A-101N to request an expanded cache object from the group-based communication platform 105, if available. Likewise, the expanded cache object may be similarly interactive, and clicking/selecting the expanded cache object may cause the client device 101A-101N to launch an appropriate program/application (e.g., a client-device specified default program) to execute the file. In instances in which an expanded cache object is not available for a file, clicking/selecting the summary cache object may cause the client device 101A-101N to launch an appropriate program/application to execute the file.

With reference again to FIG. 13, the database storage areas 108A-108N may generate and append supplemental metadata to the file after review of the same, as indicated at Block 1305. Such supplemental metadata may comprise metadata indicative of a topic assigned to the file. Moreover, such supplemental metadata may be generated in accordance with one or more artificial intelligence and/or machine-learning algorithms configured to review the substantive contents of the file (if accessible) and/or other metadata associated with the file to determine an appropriate topic to be assigned to the file. In certain embodiments, the topics available for assignment may be established manually by user input, and the database storage areas 108A-108N may be configured to select a most-appropriate topic (or multiple topics) from the established listing. In other embodiments, the artificial intelligence and/or machine learning algorithms may be configured for automatically generating a topic in instances in which previously generated topics are deemed too tenuous for description of the file.

As a specific example, the database storage areas 108A-108N may utilize context data of the file, such as the file content (if accessible), file metadata (e.g., reviewing topics assigned to messages, files, events, message threads, and/or the like in which the file is exchanged; identifying a sending user and determining the sending user's assigned subject matter expertise to weigh the potential topics that may be assigned to the file), and/or the like to determine an appropriate topic for the file.

Ultimately, the database storage areas 108A-108N index the file, as shown at Block 1306, which may make the file available for later search/retrieval (e.g., for queries satisfying file access requirements, such as meeting authorization prerequisites to view the message). In certain embodiments, only the metadata and supplemental metadata of the file may be searchable, if the contents of the file itself are not directly searchable (e.g., if the group-based communication platform 105 is incapable of rendering the contents of the file).

As stated above, the file may be disseminated as an attachment to a message, email, event, or as an independent file, in accordance with those configurations relating to message, email, and event dissemination, discussed above. The summary cache objects and/or expanded cache objects corresponding to the file may be rendered within visual containers displayed on receiving client devices 101A-101N.

Tasks

In some embodiments of an exemplary group-based communication platform 105, a task, task list, or other internal work object may be transmitted from a client device 101A-101N to a group-based communication platform 105. In yet other embodiments, a task or task list may be embodied as an external work object usable with a validated external resource 112A-112N configured for managing a user's task list. In the latter embodiments, the validated external resource 112A-112N may provide tasks, tasks lists, and/or the like as external work objects for indexing within a database storage areas 108A-108N of the group-based communication platform 105. In either embodiment, tasks or task lists are sent to the group-based communication platform 105 over communication network 103 directly by one or more of the client devices 101A-101N, or by one or more validated external resources 112A-112N. Like other work objects discussed above, tasks or task lists may be transmitted to the group-based communication platform 105 via an intermediary. In one implementation, a task may include data such as a task identifier, a user identifier associated with the task (e.g., a user generating the task), a delegate identifier (e.g., another user identifier associated with a user to whom the task is delegated), a task description, a task location, a task start date (and/or time), a task due date (and/or time), one or more task reminder dates and/or times, a completion status of the task, and/or the like. Task lists may comprise one or more tasks (each task comprising data as noted above), and may comprise additional data such as a user identifier associated with the task list, a task list identifier, and/or the like.

In certain embodiments, tasks and/or task lists may be embodied as personal work objects to a particular user. These work objects are not shared with users beyond the user associated with the task or task list. However, as discussed in greater detail herein, such work objects may be indexed by the group-based communication platform 105 such that characterizations of other, public or non-personal work objects and/or determined relationships and similarities with the personal work objects may be utilized to characterize the personal work objects. As discussed herein, such characterizations may facilitate search queries and retrieval of these personal work objects by the associated user. For example, personal work objects embodied as tasks or task lists may be added to work graph data structures for establishing links with other (potentially non-personal work objects). Although the personal work objects remain inaccessible to other users, these established links may provide additional characterization data for the personal tasks or task lists, which may facilitate later search and retrieval of the task or task list by users having access to the task or task list (specifically, access to the content of the task or task list). Moreover, as noted above, personal work objects such as tasks or task lists may be represented within work graph data structures as encrypted data, thereby further preventing unauthorized access to the underlying content of the personal work object by unauthorized users.

In certain embodiments, attachments may be included with a task. These attachments may, as discussed above, constitute separate work objects (e.g., files, events, messages, emails, and/or the like), which may be received and processed by operation servers 107A-107N in accordance with their respective work object type.

As discussed herein, work object context data, such as metadata and/or other contents of the task or task list may be used to index the task or task list, to facilitate various facets of searching (i.e., search queries that return results from the operation servers 107A-107N), and/or to otherwise establish relationships with other work objects (e.g., messages, other tasks, emails, events, and/or the like). Metadata associated with the task or task list may be determined and the task may be indexed in the database storage areas 108A-108N. In one embodiment, the task or task list may be indexed such that the task or task list associated with particular users are stored separately. In one implementation, tasks or task lists may be indexed at a plurality of separate distributed repositories (e.g., to facilitate scalability). If there are attachments associated with task or task list, file contents of the associated files may be used to index such files and tasks in the operation servers 107A-107N to facilitate searching. Moreover, as discussed herein, because certain tasks and task lists are inherently personal to a user, those tasks and task lists may be indexed and rendered searchable only to the user(s) to which the tasks or task lists are assigned. In certain embodiments, the contents of tasks or task lists may be usable to establish a particular user's expertise in a subject (and accordingly such tasks and task lists may be represented within a work graph), although the underlying tasks and task lists may not themselves be searchable and/or accessible to other users.

Task Intake and Distribution

Figure 14:
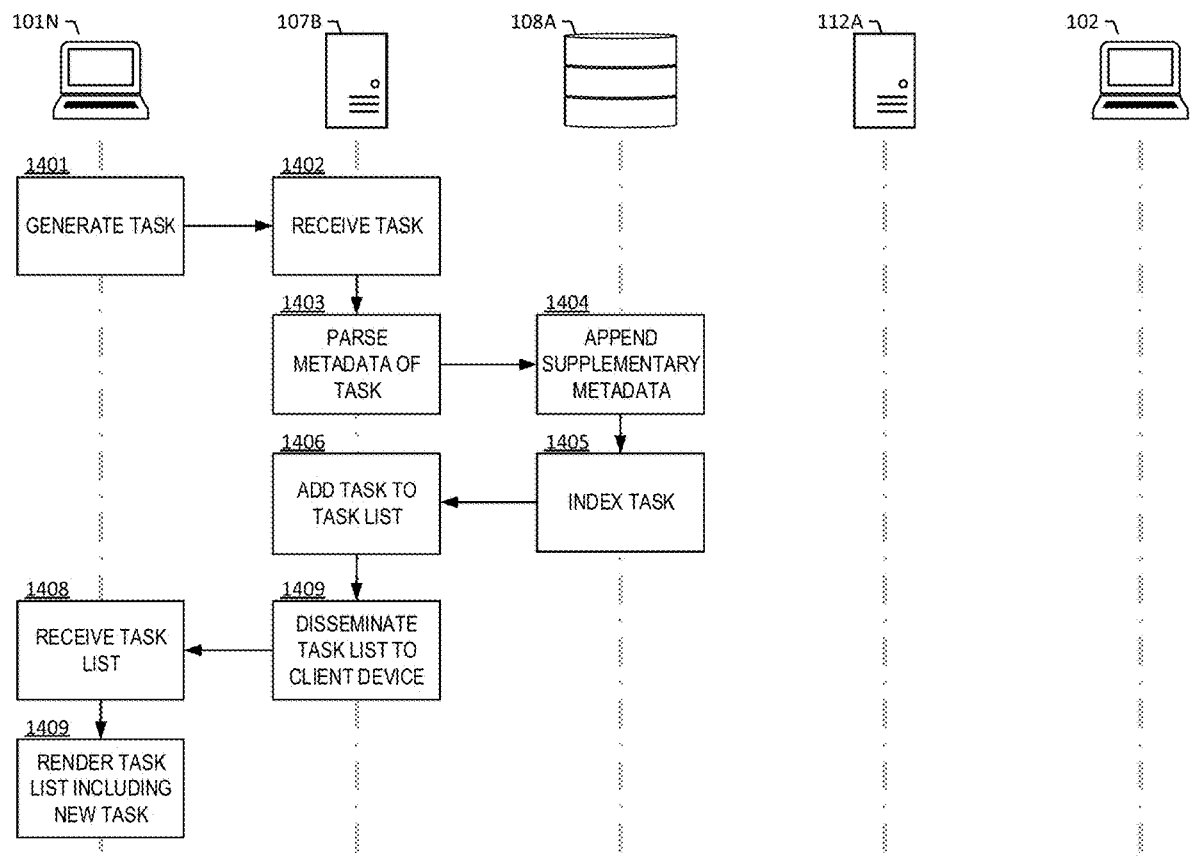
FIG. 14 shows an example data flow attributable to a task according to one embodiment.

In the illustrated embodiment of FIG. 14, which shows an example flow of data relating to the generation and indexing of tasks, tasks are generated by and received from client devices 101A-101N interactive directly with the group-based communication platform 105. However, it should be understood that in certain embodiments, tasks and task lists may be maintained by one or more validated external resources 112A-112N (e.g., dedicated task management validated external resources), and accordingly tasks may be provided from client devices 102, to validated external resources 112A-112N before being provided to the group-based communication platform 105 in accordance with certain embodiments.

As mentioned, tasks and task lists are initially generated at client devices 101A-101N, as shown at Block 1401. Tasks and task lists are generated in response to user input received at the generating client device 101A-101N, and are indicative of the content that the user intended to be reflected in a task by way of the generated task or task list. For example, a user may maintain a task list for all tasks relating to starting a new business (and in such a case, the task list may be characterized by a task list identifier of "New Business Tasks"). The user's New Business Tasks, task list may include a number of individual tasks, each having their own task identifier, completion status, description, and other data as discussed above. For example, one task may have a task identifier of "apply for new business license," with a start date of January 1, a due date of June 1, a description of "file paperwork with secretary of state," and a completion status of "Not Started." The task may also include data indicative of a delegate of the user's assistant (identified based on the assistant's user identifier). Moreover, the task may also include an attachment, such as a document including the blank paperwork that must be completed and submitted to the secretary of state.

As should be understood, various portions of the task may contain alphanumeric text, emojis, and/or other input provided by the user. The content generated by the user (e.g., via user input) is combined with other context data generated by and/or relating to the client device 101A-101N and applicable to the task. This context data includes metadata to enable the task to be appropriate parsed, disseminated, and/or displayed via the client device 101A-101N and/or group-based communication platform 105.

The generated task or task list is passed to the group-based communication platform 105, specifically to one or more of the operation servers 107A-107N. The operation servers 107A-107N receive the generated task or task list (as shown at Block 1402) and prepare the task or task list for storage and/or distribution for access by the appropriate users.

The operation servers 107A-107N identify what type of work object is reflected by the task or task list. The identity of the work object type may be utilized to determine an appropriate methodology for parsing the work object and/or for identifying data to be retrieved from the work object during parsing. Thereafter, the operation servers 107A-107N determine various characteristics of the task or task list by parsing the task or task list metadata, as indicated at Block 1403. While parsing the task or task list, the operation servers 107A-107N identifies content of the task or task list, and may identify one or more other characteristics of the task or task list that may be integrated with various configurations of the group-based communication platform 105. Moreover, in the event that the task or task list was generated by a client device 102 interacting with a validated external resource 112A-112N, the operation servers 107A-107N identifies a generator of the task/task list based on a validated external identifier. The group-based communication platform may then determine whether the generator matches any profiles or other user-identifying data stored at the group-based communication platform 105 (e.g., stored within databases 108A-108N). Determining whether the generator matches existing user profiles may be utilized to identify the generator's expertise, which may be relevant for establishing appropriate topics for the task or task list. Similar processes may be utilized to determine whether an identifier corresponding to a delegate of a task or task list matches any profiles or user-identifying data stored at the group-based communication platform 105. Similarly, such data may be utilized to establish an expertise of the delegate.

Moreover, the group-based communication platform may determine whether any other characteristics exist that are unique to the task or task list. For example, particular task-based validated external resources 112A-112N may provide specific metadata contents in tasks that may be utilized by the group-based communication platform 105 in establishing supplemental metadata for the task or task list (as discussed herein).

Moreover, while parsing the task or task list, the operation servers 107A-107N may generate a lightweight summary cache object representative of the task or task list for rendering within visual containers by client devices 101A-101N that ultimately receive the task or task list as a work-object via the group-based communication platform 105. The summary cache object may be constructed from portions of the context data of the task or task list, which may be inserted into a summary cache object template. Other portions of the template may be selected and/or populated with data generated by the group-based communication platform 105. The summary cache object may comprise at least a portion of the content of the task or task list (e.g., the title/identifier, the due date, and/or the like). In certain embodiments, the summary cache object may omit formatting data, and may instead rely on local formatting mechanisms stored locally on the client devices 101A-101N for rendering the summary cache object.

Moreover, the operation servers 107A-107N may generate an expanded cache object having additional detail of the task or task list (e.g., the entirety of the task or task list content), certain formatting characteristics, attachments, and/or the like) to be associated with the task or task list and the summary cache object. The summary cache object may then be configured to be interactive for the receiving client devices 101A-101N, such that clicking/selecting the summary cache object may cause the client device 101A-101N to request the expanded cache object from the group-based communication platform 105. Likewise, the expanded cache object may be similarly interactive, and clicking/selecting the expanded cache object may cause the client device 101A-101N to request the full task or task list from the group-based communication platform 105.

Moreover, in certain embodiments, the operation servers 107A-107N pass the task or task list to one or more database storage areas 108A-108N for indexing. The databases may generate and append supplemental metadata to the task or task list after review of the context data, as indicated at Block 1404. Such supplemental metadata may comprise metadata indicative of a topic assigned to the task or task list. Moreover, such supplemental metadata may be generated in accordance with one or more artificial intelligence and/or machine-learning algorithms configured to review the context data, such as the substantive contents of the task or task list and/or the metadata associated with the task to determine an appropriate topic to be assigned to the task or task list. Particularly for task lists, metadata associated with individual tasks stored within the task list may be utilized to determine an appropriate topic for assignment to the task list. In certain embodiments, the topics available for assignment may be established manually by user input, and the database storage areas 108A-108N may be configured to select a most-appropriate topic (or multiple topics) from the established listing. In other embodiments, the artificial intelligence and/or machine learning algorithms may be configured for automatically generating a topic in instances in which previously generated topics are deemed too tenuous for description of the task or task list.

As a specific example, the database storage areas may utilize context data of a task, such as the task description, task identifier, and/or the like (which may be reviewed utilizing a Tf-idf algorithm in light of a larger database of tasks to identify relevant topics), task metadata, and/or the like to determine an appropriate topic.

Ultimately, the database storage areas 108A-108N index the message, as shown at Block 1405, which may make the message available for later search/retrieval. As mentioned above, tasks and task lists may be made available to a limited number of users (e.g., the generating user and/or a delegate of the task), and accordingly these tasks and task lists may be searchable by only the generating user and the delegate of the task.

For tasks embodied as internal work objects of the group-based communication platform 105, the operation servers 107A-107N may append the task to an assigned task list, if applicable, and as indicated at Block 1406. It should be understood that similar procedures may be executed by validated external resources 112A-112N with respect to tasks implemented as external work objects. Such processes may comprise inserting data indicative of the task within task list data existing for a particular user.

If applicable, the task or task list may be disseminated to one or more client devices 101A-101N, as indicated at Block 1409. Tasks or task lists delegated to particular users may be disseminated to client devices 101A-101N associated with the delegated users. In other embodiments, tasks and task lists kept private to a particular user may be delegated to one or more client devices 101A-101N associated with the particular user. Moreover, although not shown, various embodiments may further disseminate one or more tasks or task lists to validated external resources 112A-112N to update tasks or task lists stored thereon.

Due to the time-specific nature of certain events, the group-based communication platform 105 may establish various time-based delivery, reminder, alert, and/or other configurations for providing information to users identified as associated with (or delegated to) a particular task. For example, the group-based communication platform 105 may be configured to generate delayed delivery messages for dissemination to one or more of the intended recipients at established times (e.g., at a specified time prior to the due date of a task). Characteristics of these delayed delivery messages (or other alerts, reminders, and/or the like) may be generated in accordance with various characteristics of the task, such as a defined due time, due date, and/or the like for the task.

Recipient client devices 101A-101N receive the task or task list (which may include a newly added task) as indicated at Block 1408 and may render those tasks or task lists (e.g., using style guides stored locally on those client devices 101A-101N) as indicated at Block 1409.

Example Implementation

Work objects in accordance with various embodiments may be disseminated between and among a plurality of client devices 101A-101N, 102 in accordance with the various embodiments discussed above. These embodiments thereby enable one or more work objects to be shared among one or more client devices 101A-101N, 102, thereby allowing users to share content, ideas, and/or the like in any format deemed most convenient to the users. Moreover, users are not limited to communicating within the restrictive confines of a particular communication platform, which may be limited to particular communication characteristics, such as non-real-time communications, size-restricted communications, attachment-restricted communications, and/or the like.

Caching and Reformatting

Various configurations facilitate the exchange of various work objects between client devices 101A-101N, 102 through processes for generating relatively lightweight (small file size) cache objects that may be passed directly to and stored within the memory of receiving client devices 101A-101N, 102 without immediately and in real-time passing larger, original work objects to client devices 101A-101N, 102 unless explicitly requested. For example, the group-based communication platform 105 may be configured to generate a summary cache object for each of one or more work objects, which includes a minimal amount of information regarding the related work object (e.g., a title and a small snippet of the contents of the work object). The summary cache object, which is described in various forms throughout this description, may be transmitted in real-time to intended recipients of a particular work object, thereby enabling those intended recipients to identify when a work object is received and generally what the work object is. These summary cache objects may be indexed together with the underlying work object itself, such that when a particular work object is uncovered as a result of a search query (discussed herein), the search results may be provided to a requesting client device 101A-101N, 102 in the form of a listing of summary cache objects, rather than providing large work objects directly to a client device in response to a query.

Moreover, the group-based communication platform 105 may generate expanded cache objects and indexed together with the underlying work objects. These expanded cache objects may be considered to be intermediate in size, having more detail than the respective summary work objects, but still lacking some of the detail of the complete work object. In certain embodiments, the expanded cache objects (various forms of which are discussed herein) encompass additional detail regarding the contents of a particular work object. These expanded cache objects may be provided to client devices 101A-101N, 102 in response to specific requests. For example, requesting additional detail for a particular summary cache object may cause the client device 101A-101N, 102 to generate and transmit a request for a related expanded cache object to the group-based communication platform 105, which may include data sufficient to identify the underlying work object and an indicia that the expanded cache object is requested. The group-based communication platform 105 may then identify a relevant expanded cache object and may transmit the relevant expanded cache object to the client device 101A-101N, 102, which may replace the displayed summary cache object with the expanded cache object (e.g., graphically, the client device 101A-101N, 102 may cause the displayed summary cache object to graphically expand to encompass the additional data included within the expanded cache object).

It should be understood that the expanded cache object may not include duplicate data of that included within the summary cache object, beyond a minimal amount of identifying data needed to match the summary cache object, the expanded cache object, and the underlying work object together. In such embodiments, providing the expanded cache object to the client devices 101A-101N, 102 may encompass providing additional, expansive data to the client devices 101A-101N, 102 regarding the particular work object, and the client device may then match the newly received expansive data with the already stored summary cache data to locally generate the complete expanded cache object for display to a user.

Ultimately, as discussed herein, a client device 101A-101N, 102 may further request the full work object to be provided to the client device (e.g., in response to a user interaction) in a manner similar to requesting the expanded cache object, for example, by identifying the underlying work object and providing an indicia that the full work object is requested. The group-based communication platform 105 may then retrieve the requested work object and may transmit the same to the requesting client device 101A-101N, 102. The client device 101A-101N may then use a relevant locally executable application for executing/utilizing the full work object, and the relevant locally executable application may be selected based at least in part on the work object type.

In certain embodiments, the group-based communication platform 105 is further configured to reformat various work objects and/or cache objects to visually fit naturally within the group-based communication interface. For example, while parsing the work object and/or while generating cache objects to be associated with the work object, the group-based communication platform 105 may be configured to identify formatting attributes of content of the underlying work object.

For example, the group-based communication platform 105 may identify a formatting style sheet, may identify particular formatting attributes of metadata associated with the work object, and/or the like. The group-based communication platform 105 may then identify formatting corollaries within a group-based communication platform-specific style sheet, such that those correlated styles may be applied to the work object (or cache object) for display to a user. In certain embodiments, identifying style corollaries may be performed via a matching algorithm, having known formatting attributes of various work objects mapped to formatting corollaries of the group-based communication platform (e.g., a formatting indication of bold within a .css file may be mapped within an applicable formatting data table stored within the database storage areas 108A-108N to a corresponding bold formatting provided within the group-based communication platform-specific formatting guide). Alternatively, style corollaries may be identified via one or artificial intelligence and/or machine learning algorithms trained via an existing formatting corollaries data table, such that formatting may be configured to accommodate new work object types generated in the future.

Formatting corollaries may be identified based at least in part on the work object type. Different matching, machine learning, and/or artificial intelligence may be utilized for different work object types. For example, internal work objects may bypass formatting algorithms entirely, because such internal work objects may be generated to have a suitable formatting structure for use with the group-based communication platform 105. In other embodiments, the internal work objects may utilize specifically configured algorithms for preparing those work objects for distribution to one or more validated external resources. Accordingly, the one or more algorithms utilized for generating formatting corollaries for internal work objects may be selected based at least in part on the one or more validated external resources to receive the work object.

Moreover, one or more algorithms for formatting one or more external work objects may utilize locally stored (at the group-based communication platform 105) copies of style sheets applicable to various external work objects that may be received at the group-based communication platform 105 from one or more validated external resources 112A-112N. These style sheets may be utilized to establish formatting corollaries between work objects usable by the group-based communication platform 105 and work objects provided by various validated external resources 112A-112N. In certain embodiments, various algorithms, such as machine learning algorithms, artificial intelligence algorithms, matching algorithms, and/or the like may be built automatically at the group-based communication platform 105 based at least in part on these style sheets.

Moreover, it should be understood that different portions (e.g., different fields) of work objects may be subject to different formatting requirements, different formatting corollaries, and/or the like. Thus, formatting of work objects to be provided to various client devices 101A-101N and/or for providing to various validated external resources 112A-112N may utilize a plurality of formatting algorithms, formatting corollaries, and/or the like.

Generating Supplementary Metadata

The group-based communication platform 105 of certain embodiments is configured to generate and append supplementary metadata to work objects to facilitate the generation of a work graph demonstrating relationships between various work objects and to facilitate later search queries (e.g., topic-based search queries). As just one example, topics for certain work objects may be assigned based on user input, such as users self-assigning particular topics to certain work objects. Topics may be assigned manually by users placing a hashtag phrase within the work object (e.g., "#patents"). The group-based communication platform 105 may be configured to provide a high level of deference to manually-assigned topics, such that these topics are deemed the primary topic of the associated work object.

In other embodiments, the contents and/or metadata of a particular work object may be reviewed by the group-based communication platform (e.g., via one or more artificial intelligence and/or machine learning algorithms) to identify an underlying topic of the work object. An appropriate model for generating an underlying topic for a work object may be selected based at least in part on the work object type. Topic source data (e.g., indicative of available topics) and data utilized by the model for learning topic assignment concepts, may be shared across work-object-specific models, as the source data may be retrieved from a complete work object corpus. The topics may be determined based on a single work-object alone, or may be determined based on context surrounding a particular work object, such as based on other work objects exchanged within a common thread (e.g., a plurality of messages collectively defining a conversation surrounding the work object in question) and/or other work objects existing within a common task list (e.g., a plurality of tasks collectively defining a task list encompassing the work object in question). In certain embodiments, a model utilized to establish a work object topic may determine applicability of certain aspects of a work object to historical data. The group-based communication platform 105 may be configured to identify similar types of context data (even if not identical) utilized to establish similarities between work objects. For example, a user associated with a particular work object (e.g., a participant in an event; a recipient of an email; a recipient of a message) may be utilized to establish similarities between work objects. The group-based communication platform 105 reviews context data of various work objects and applies one or more algorithms to give appropriate weight to various portions of the work object in assigning an applicable topic.

In certain embodiments, a plurality of topics may be assigned to a particular work object, and these topics may be ranked by relevance to the work object. The most relevant topics (e.g., those manually assigned topics and/or the most relevant automatically assigned topics) may be given greater weight in establishing whether a particular work object is related to a particular topic than topics deemed the least relevant to a particular work object.

In various embodiments, the group-based communication platform 105 may be configured to automatically generate a summary for a particular work object, to be indexed together with the underlying work object itself. This summary may then be presented within a search results listing in which the work object is a part of, such that a user may gain a general understanding of the contents of the work object without requesting the work object or a corresponding cache object associated with the work object. The summary may be presented in a natural language format describing the type of work object and the content of the work object. These summaries may be generated automatically, for example, based at least in part on one or more artificial intelligence and/or machine learning algorithms configured to self-learn sentence structure and related topical relationships to self-generate summaries of various work objects. As just one example, a summary of a particular email may be generated to read "An email from Amy to Sue discussing document display after unfurling."

Generating a Work Graph of Work Objects

Work objects may be stored in one or more database storage areas 108A-108N during applicable indexing procedures as discussed herein. Moreover, such work objects may be stored as entries of a graphical database (or a relational database providing similar functionality for illustrating relationships between work objects, or any of a variety of other database storage structures for providing similar data storage configurations), providing data illustrative of generated relationships between various work objects. Those relationships between work objects may be generated based at least in part on the supplemental metadata generated and appended to various work objects, and collectively the relationships between work objects define a work graph illustrating relationships among a plurality of work objects, which may be usable by one or more artificial intelligence-based search systems for identifying a plurality of inter-related work objects to be presented in response to a particular search query. In certain embodiments, work objects stored within a work graph are each characterized by their own access credentials/requirements. Accordingly, some work objects within the work graph may only be accessible to a select group of users (e.g., a single user), whereas other work objects within the same work graph may be accessible to a larger/different group of users (e.g., all users associated with a particular group). Despite these differences in accessibility between various work objects within a common work graph, relationships established between various work objects may be usable to establish topics for various work objects, for establishing a particular user's expertise, to determine relatedness of work objects for search queries, and/or the like.

For each work object, the database storage areas 108A-108N, the operation servers 107A-107N, or other components of the group-based communication platform 105 may perform an analysis of the contents and/or metadata (e.g., metadata provided with the work object) and/or supplemental metadata generated by the group-based communication platform 105 to determine other work objects deemed sufficiently relevant to illustrate a connection within the work graph).

Figure 15:
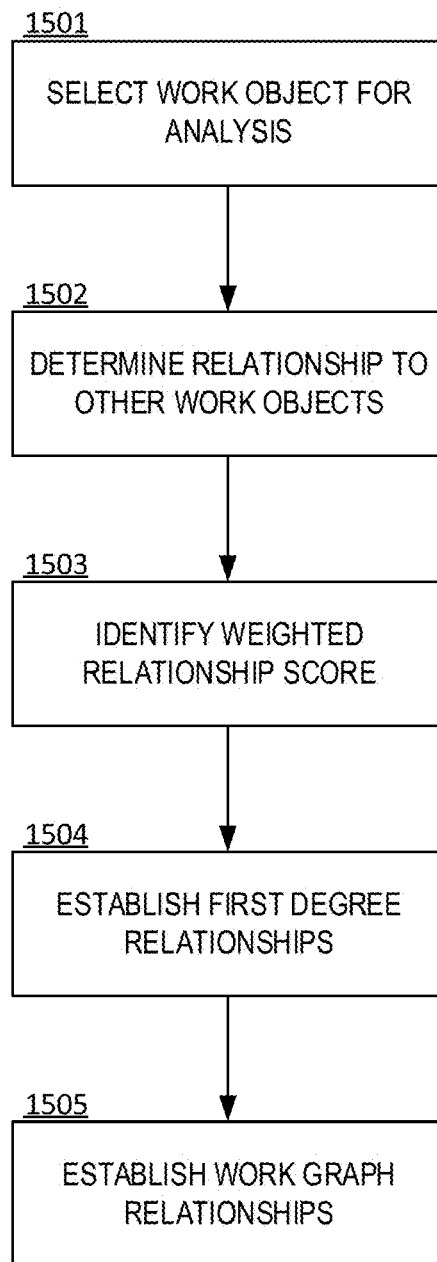
FIG. 15 is a flowchart showing an example process for generating a work graph according to one embodiment.

An example process is shown in the flowchart of FIG. 15. As shown therein, the process may begin by selecting a work object for analysis, as shown at 1501. The work object's relationship to other work objects may then be determined at 1502. In certain embodiments, the group-based communication platform 105 may identify shared topics within metadata of the work object and other work objects; identify common sending user identifiers; identify common participants (a greater number or percentage of shared participants may provide a stronger indicated relationship); identify common work object types; identify common intended recipients; identify temporal relationships between generation/transmission of work objects; and/or the like.

As shown at Block 1503, the group-based communication platform may establish weighted relationship scores between each of the other work objects identified at step 1502. For example, stronger relationships (e.g., a higher number of shared characteristics), or certain types of relationships (e.g., as identified via a machine learning algorithm) may result in a higher relationship score between the analyzed work object and one or more other work objects. These relationship scores may be ranked (e.g., by direct comparison of relationship scores, by normalization of comparison scores on a shared scale (e.g., 0-1), and/or the like). In certain embodiments, those relationship scores satisfying a first degree score criteria (e.g., exceeding a score threshold) may be utilized to establish direct relationships between the analyzed work object and those other work objects having a sufficient relationship score, as suggested at Block 1504. Those first degree scores may then be mapped within the work graph, as shown at Block 1505 (e.g., by establishing edges between data indicative of work objects within a graphical database, by providing data indicative of related work objects within data of a particular work object database entry within a relational database, and/or the like). The process of FIG. 15 may then be repeated for each work object, while accommodating those relationships that have already been established from prior iterations. It should be understood that, in accordance with certain embodiments, relationships between various work objects may be symmetrical (e.g., the degree of relatedness of a first work object to a second work object is identical to the degree of relatedness of the second work object to the first work object). However, it should be understood that in other embodiments, the relationships between various work objects may be asymmetrical (e.g., the degree of relatedness of a first work object to a second work object is not identical to the degree of relatedness of the second work object to the first work object).

Figure 16:
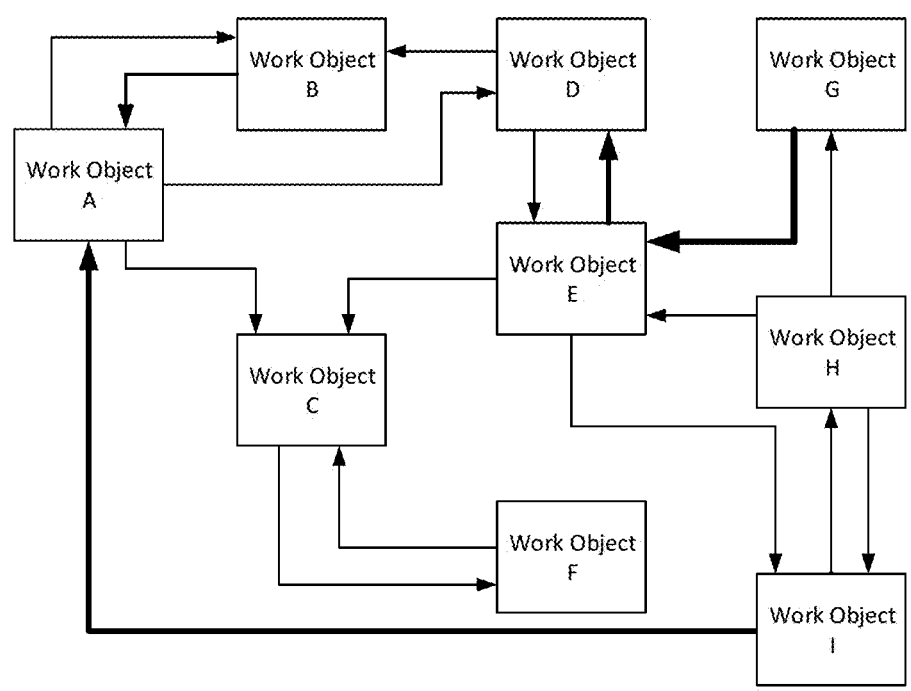
FIG. 16 is an example illustration of relationships between work objects as may be represented by a work graph in accordance with one embodiment.

A graphical depiction of an example work object is shown at FIG. 16, which illustrates relationships (indicated by lines) between various work objects (depicted as blocks).

As is evident from the illustration of FIG. 16, the work graph provides an indication of direct, first degree relationships between various work objects, as well as indirect relationships established between work objects through intermediate work objects. These indirect relationships may be indicated as second degree relationships, third degree relationships, and/or the like, indicative of the number of degrees of separation between work objects within the work graph. As discussed herein, these indirect relationships may be reflected within (or otherwise influence, through characteristics of artificial intelligence models) search results provided to a user in response to a query for work objects. In other configurations, indirect relationships may be accessible to users via a browsing-like functionality, in which a user may click through a plurality of work objects, wherein data indicative of other, related work objects may be presented for each viewed work object, such that the user may click and browse through to any of those identified related work objects.

Moreover, through the work graph's illustration of relationships between various work objects, the work graph may also be utilized to determine relationships between users, between users and channels, between users and topics, between channels and topics, between channels, between topics, between users and work objects, between channels and work objects, between topics and work objects, and/or the like. Thus, the work graph may be configured to establish relationships between work objects, and those relationships may be further utilized to identify relationships between other aspects of data utilized with the group-based communication platform 105 (such as data indicative of particular users, channels, groups, and/or the like).

In certain embodiments, through identified relationships between particular users and certain work objects, a topic expertise may be established for the particular user (and assigned to a user identifier associated with the user), based at least in part on relationships established and mapped within the work graph. As a part of the determination of a particular user's expertise in a particular topic, the group-based communication platform 105 may be configured to determine the recency with which a particular user interacted with a particular object having an established topic, the mechanism through which the user interacted with the particular object (e.g., did the user generate/send the work object, was the user an intended recipient of the work object, and/or the like), the number of work objects having a defined topic with which the user is related, and/or the like.

The group-based communication platform 105 (e.g., via the database storage areas 108A-108N, via the operation servers 107A-107N, and/or the like) utilizes the work graph to generate a machine learning structure (e.g., a neural network) that may be utilized for executing search queries for users. For example, the group-based communication platform may implement an unsupervised learning structure, a supervised learning structure, a reinforcement learning structure, a deep learning structure, and/or the like for utilizing relationships established via the work graph to generate search results for various work objects.

In certain embodiments, a global machine learning algorithm may be utilized for all work objects stored at or accessible via the group-based communication platform 105. In such embodiments, access to particular work objects (e.g., via a search query utilizing the machine-learning algorithm) may be limited based at least in part on access privileges of the searching user (e.g., a user may only be able to access work objects associated with a particular group, of which the user is a member). In other embodiments, machine learning algorithms may be established independently for each of a plurality of groups, such that training of the machine learning algorithm is based on work objects exchanged within the particular group alone.

The machine learning algorithms may be generated and/or updated periodically, to reflect changes within the work graph that result from the addition and/or aging of work objects within the work graph. Moreover, the machine learning parameters (including those parameters indicative of the underlying neural network of the machine learning algorithm) may be stored within one or more database storage areas 108A-108N.

Executing a Query via the Machine Learning Algorithm and Work Graph

A user of the group-based communication platform 105 (e.g., accessing/exchanging work objects via a client device 101A-101N, 102) may utilize a query functionality of the group-based communication platform 105 to identify and/or retrieve work objects deemed relevant to the user. In certain embodiments, the query functionality is accessible via a client device 101A-101N, and provides users with one or more options for searching for relevant work objects. The query functionality may be visually embodied in the group-based communication interface as a single user-fillable field, or the query functionality may have a more advanced search interface with a plurality of fields corresponding to particular attributes of a work object to be retrieved. In either configuration (whether through natural language processing and parsing of information provided within the single-field search configuration, or through parsing of data provided in one or more fields of an advanced search configuration, the query functionality may identify relevant portions of the query to be utilized to identify relevant work objects. For example, a user may only provide a particular keyword of interest (such as "fortran"), which the client device 101A-101N and/or the group-based communication platform 105 may determine should be used to search for relevant topics, relevant work object titles, and/or the like. In other embodiments, a user may provide a keyword of interest together with other narrowing information, such as information identifying a work object type, a time/date of generation of a work object of interest, one or more involved users, a location (if applicable), and/or the like. As a non-limiting example, a search within a single-field search bar may encompass a query such as "February 2019 Fortran history meeting in Compiler Room with Bob Smith" (similar queries may be provided with a multi-field search configuration, entering a date into the date field, a work object type into a "type" field (or selecting a work object type from a listing of available work object types), a keyword search into a keyword field, a location identifier into a location field, and a user name into a user field). The search may then be conducted using the provided search limitations to retrieve data relevant to the selected meeting, as well as any additional work objects deemed relevant to the searched meeting.

In certain embodiments, client devices 101A-101N may access the query functionality via the group-based communication interface displayable on the client device 101A-101N. In certain embodiments, the query functionality may be embodied as a search bar accessible via the group-based communication interface. A user may provide a query as user input into the search bar, which may cause the client device 101A-101N to generate a query request to the group-based communication platform 105. In certain embodiments, the search bar may be characterized by autocomplete functions (e.g., suggesting complete words that a user may desire to enter as a search term based on letters already typed by the user) that continually updates search suggestions as the user types. In other embodiments, the query functionality may be configured to generate and transmit query requests to the group-based communication platform 105 in real-time, as the user types. Thus, the search bar may continuously update predicted results for a particular search as the user types additional letters for the search.

Certain embodiments may additionally enable users of client devices 102 to access limited query functionality, for example, by enabling users to send query requests to the group-based communication platform 105 via one or more validated external resources 112A-112N. In such embodiments, the group-based communication platform 105 may be configured to provide query results back to the user in the form of a responsive work object (e.g., an email generated by the group-based communication platform 105) including results of a query.

Regardless of the source of the query request, once received at the group-based communication platform 105, the group-based communication platform 105 may provide the query as input into a machine learning algorithm. Moreover, the group-based communication platform 105 may provide one or more search parameters to accompany the query, such as types of work objects to search for, whether the search should extend to encompass searches for relevant users, channels, topics, and/or the like, or other parameters as deemed relevant by the user.

The group-based communication platform 105 may then execute the search query via the applicable machine learning model. As a part of the search query, the group-based communication platform 105 may establish a similarity ranking between the search term and the one or more work objects, to identify work objects deemed most relevant to the search query. Such ranking may be performed in accordance with the machine learning algorithm of the search query. Results satisfying applicable criteria may be provided to the user (e.g., results deemed to have a relevance score higher than an established threshold; the top defined number of results, such as the most relevant 3 results). It should be understood that results may be provided in a mixed format, such that results are provided in a list to the user based on relevance score, regardless of work object type. In other embodiments, results may be organized based on work object type, with the most-relevant work objects within each work object type being presented to the user.

In still other embodiments, the group-based communication platform 105 may be further configured to utilize work objects identified as relevant to further identify one or more users, channels, and/or topics deemed relevant to the query as well. As noted above, various characteristics of a particular work object (e.g., metadata) may be utilized to associate a particular user, a particular channel, a particular topic, and/or the like with the work object. Thus, the group-based communication platform 105 may utilize such relationships to identify users, channels, and topics deemed relevant to the provided search query. These additional identified data may be provided to the user (e.g., within a dedicated portion of the search results display).

In certain embodiments, the search query functionality may enable the user to quickly select a particular work object from within a search results listing. In various embodiments, the search results listing may comprise a listing of cache objects (e.g., summary cache objects) relating to the work objects identified for inclusion within the search. These summary cache objects may be passed to the client device 101A-101N that initiated the search for display within the search query results display.

Moreover, the search results display may be configured for quickly moving search results (e.g., selecting a particular summary cache object) into one or more communications (e.g., a new message, a communication channel, and/or the like), such that work objects may be quickly reshared by a user if/when deemed relevant.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A group-based communication platform configured for generating cache objects for local storage and local access by a client device, the group-based communication platform comprising:
    one or more memory storage areas; and
    one or more processors collectively configured to:
        receive one or more work objects from a validated external resource for distribution to one or more client devices via a group-based communication channel, wherein the one or more work objects comprise metadata and body content data;
        generate, based at least in part on the metadata, supplemental metadata identifying the group-based communication channel and the one or more client devices;
        extract the body content data from the one or more work objects;
        generate one or more cache objects each comprising at least a portion of the body content data and at least a portion of the supplemental metadata for a corresponding work object; and
        disseminate the one or more cache objects to the one or more client devices identified based at least in part on the supplemental metadata for storage and access by the one or more client devices.

2. The group-based communication platform of claim 1, wherein generating one or more cache objects comprises:
    identifying, for each of the one or more work objects and based at least in part on the metadata for a corresponding work object, a cache object template applicable to the corresponding work object; and
    populating at least a portion of the cache object template with at least a portion of the body content data and the at least a portion of the supplemental metadata for the corresponding work object.

3. The group-based communication platform of claim 2, wherein generating one or more cache objects comprises:
    generating a summary cache object comprising a first quantity of data associated with the work object, wherein the summary cache object is disseminated to the one or more client devices in real time; and
    generating an expanded cache object comprising a second quantity of data associated with the work object, wherein the expanded cache object is disseminated to the one or more client devices in response to a request received from a client device of the one or more client devices.

4. The group-based communication platform of claim 1, wherein the one or more processors are further configured to index each of the one or more work objects within a database storage area.

5. The group-based communication platform of claim 4, wherein the one or more processors are further configured to execute a query function based at least in part on a query request received from a client device of the one or more client devices, wherein the query function comprises:
   querying indexed content data, metadata, and supplemental data for a plurality of work objects based at least in part on the query request;
   ranking one or more work objects based on relevance to the query request; and
   transmitting cache objects to the requesting client device indicative of the ranked work objects identified from the querying.

6. The group-based communication platform of claim 1, wherein generating supplemental metadata comprises assigning a topic to each of the one or more work objects.

7. The group-based communication platform of claim 1, wherein disseminating the one or more cache objects comprises:
   providing the one or more cache objects to a validated external resource for distribution to one or more client devices via communication mechanisms of the validated external resource.

8. The group-based communication platform of claim 7, wherein providing the one or more cache objects to a validated external resource for distribution to one or more client devices comprises providing an email comprising the one or more cache objects to an email platform for disseminating as individual emails to the one or more client devices.

9. The group-based communication platform of claim 1, wherein the one or more work objects comprise event work objects received from a validated external resource.

10. The group-based communication platform of claim 9, wherein body content data of the one or more event work objects comprises recording data.

11. A computer-implemented method for generating cache objects for local storage and local access by a client device, the method comprising:
   receiving one or more work objects from a validated external resource for distribution to one or more client devices via a group-based communication channel, wherein the one or more work objects comprise metadata and body content data;
   generating, based at least in part on the metadata, supplemental metadata identifying the group-based communication channel and the one or more client devices;
   extracting the body content data from the one or more work objects;
   generating one or more cache objects each comprising at least a portion of the body content data and at least a portion of the supplemental metadata for a corresponding work object; and
   disseminating the one or more cache objects to the one or more client devices identified based at least in part on the supplemental metadata for storage and access by the one or more client devices.

12. The computer-implemented method of claim 11, wherein generating one or more cache objects comprises:
   identifying, for each of the one or more work objects and based at least in part on the metadata for a corresponding work object, a cache object template applicable to the corresponding work object; and
   populating at least a portion of the cache object template with at least a portion of the body content data and the at least a portion of the supplemental metadata for the corresponding work object.

13. The computer-implemented method of claim 12, wherein generating one or more cache objects comprises:
   generating a summary cache object comprising a first quantity of data associated with the work object, wherein the summary cache object is disseminated to the one or more client devices in real time; and
   generating an expanded cache object comprising a second quantity of data associated with the work object, wherein the expanded cache object is disseminated to the one or more client devices in response to a request received from a client device of the one or more client devices.

14. The computer-implemented method of claim 11, further comprising: indexing each of the one or more work objects within a database storage area.

15. The computer-implemented method of claim 14, further comprising: executing a query function based at least in part on a query request received from a client device of the one or more client devices, wherein the query function comprises:
   querying indexed content data, metadata, and supplemental data for a plurality of work objects based at least in part on the query request;
   ranking one or more work objects based on relevance to the query request; and
   transmitting cache objects to the requesting client device indicative of the ranked work objects identified from the querying.

16. The computer-implemented method of claim 11, wherein generating supplemental metadata comprises assigning a topic to each of the one or more work objects.

17. The computer-implemented method of claim 11, wherein disseminating the one or more cache objects comprises:
   providing the one or more cache objects to a validated external resource for distribution to one or more client devices via communication mechanisms of the validated external resource.

18. The computer-implemented method of claim 17, wherein providing the one or more cache objects to a validated external resource for distribution to one or more client devices comprises providing an email comprising the one or more cache objects to an email platform for disseminating as individual emails to the one or more client devices.

19. The computer-implemented method of claim 11, wherein the one or more work objects comprise event work objects received from a validated external resource.

20. The computer-implemented method of claim 19, wherein body content data of the one or more event work objects comprises recording data.

21. A computer program product comprising at least one non-transitory computer-readable storage medium having computer-readable program code portions stored therein, the computer-readable program code portions comprising an executable portion configured to cause a computer processor to:
   receive one or more work objects from a validated external resource for distribution to one or more client devices via a group-based communication channel, wherein the one or more work objects comprise metadata and body content data;

generate, based at least in part on the metadata, supplemental metadata identifying the group-based communication channel and the one or more client devices;

extract the body content data from the one or more work objects;

generate one or more cache objects each comprising at least a portion of the body content data and at least a portion of the supplemental metadata for a corresponding work object; and disseminate the one or more cache objects to the one or more client devices identified based at least in part on the supplemental metadata for storage and access by the one or more client devices.

22. The computer program product of claim 21, wherein generating one or more cache objects comprises:

identifying, for each of the one or more work objects and based at least in part on the metadata for a corresponding work object, a cache object template applicable to the corresponding work object; and populating at least a portion of the cache object template with at least a portion of the body content data and the at least a portion of the supplemental metadata for the corresponding work object.

23. The computer program product of claim 22, wherein generating one or more cache objects comprises:

generating a summary cache object comprising a first quantity of data associated with the work object, wherein the summary cache object is disseminated to the one or more client devices in real time; and generating an expanded cache object comprising a second quantity of data associated with the work object, wherein the expanded cache object is disseminated to the one or more client devices in response to a request received from a client device of the one or more client devices.

24. The computer program product of claim 21, wherein the executable portion is further configured to cause the processor to index each of the one or more work objects within a database storage area.

25. The computer program product of claim 24, wherein the executable portion is further configured to cause the processor to execute a query function based at least in part on a query request received from a client device of the one or more client devices, wherein the query function comprises:

querying indexed content data, metadata, and supplemental data for a plurality of work objects based at least in part on the query request;

ranking one or more work objects based on relevance to the query request; and transmitting cache objects to the requesting client device indicative of the ranked work objects identified from the querying.

26. The computer program product of claim 21, wherein generating supplemental metadata comprises assigning a topic to each of the one or more work objects.

27. The computer program product of claim 21, wherein disseminating the one or more cache objects comprises:

providing the one or more cache objects to a validated external resource for distribution to one or more client devices via communication mechanisms of the validated external resource.

28. The computer program product of claim 27, wherein providing the one or more cache objects to a validated external resource for distribution to one or more client devices comprises providing an email comprising the one or more cache objects to an email platform for disseminating as individual emails to the one or more client devices.

29. The computer program product of claim 21, wherein the one or more work objects comprise event work objects received from a validated external resource.

30. The computer program product of claim 29, wherein body content data of the one or more event work objects comprises recording data.

* * * * *